US009547692B2

(12) United States Patent
Poulsen

(10) Patent No.: US 9,547,692 B2
(45) Date of Patent: Jan. 17, 2017

(54) META-CONFIGURATION OF PROFILES

(71) Applicant: Andrew S. Poulsen, Fort Collins, CO (US)

(72) Inventor: Andrew S. Poulsen, Fort Collins, CO (US)

(*) Notice: Subject to any disclaimer, the term of this patent is extended or adjusted under 35 U.S.C. 154(b) by 0 days.

(21) Appl. No.: 14/724,743

(22) Filed: May 28, 2015

(65) Prior Publication Data

US 2015/0261827 A1     Sep. 17, 2015

Related U.S. Application Data

(60) Continuation of application No. 13/942,542, filed on Jul. 15, 2013, now Pat. No. 9,047,335, which is a division of application No. 12/972,876, filed on Dec. 20, 2010, now Pat. No. 8,489,563, which is a continuation of application No. 11/753,476, filed on May 24, 2007, now Pat. No. 7,873,610.

(60) Provisional application No. 60/803,306, filed on May 26, 2006, provisional application No. 60/820,870, filed on Jul. 31, 2006.

(51) Int. Cl.
*G06F 17/00* (2006.01)
*G06F 7/00* (2006.01)
*G06F 17/30* (2006.01)
*G06F 3/048* (2013.01)
*G06F 3/12* (2006.01)
*G06Q 90/00* (2006.01)

(52) U.S. Cl.
CPC ......... *G06F 17/30507* (2013.01); *G06F 3/048* (2013.01); *G06F 3/1255* (2013.01); *G06F 17/30371* (2013.01); *G06F 17/30864* (2013.01); *G06Q 90/00* (2013.01)

(58) Field of Classification Search
CPC .. G06F 17/30507; G06F 3/048; G06F 3/1255; G06F 17/30371; G06F 17/30864; G06Q 90/00
USPC ........................................................ 707/694
See application file for complete search history.

(56) References Cited

U.S. PATENT DOCUMENTS

| 4,477,874 | A   | 10/1984 | Ikuta et al.             |
| 4,577,647 | A * | 3/1986  | Fenster ............... A45D 2/18 132/219 |
| 4,707,788 | A   | 11/1987 | Tashiro et al.           |
| 5,051,930 | A * | 9/1991  | Kuwabara ............ G06T 11/60 715/205 |
| 5,091,856 | A   | 2/1992  | Hasegawa et al.          |
| 5,124,920 | A   | 6/1992  | Tamada et al.            |
| 5,247,440 | A   | 9/1993  | Capurka et al.           |

(Continued)

OTHER PUBLICATIONS

US 8,019,545, 09/2011, Miller et al. (withdrawn)

(Continued)

*Primary Examiner* — Pavan Mamillapalli

(57) ABSTRACT

Disclosed are methods for creating, applying, using and retrieving profile information that includes attributes that may be stored separately from, or with, the content to which the profiles are being applied. In this manner, profiles can be shared in various environments and across various applications. Attributes that have corresponding attributes in other content can be applied to the other content, as long as each of the attributes is valid. In vehicle applications, the profile can be generated in a first vehicle, stored in a profile repository, and subsequently applied to a second vehicle.

20 Claims, 27 Drawing Sheets

(56) References Cited

U.S. PATENT DOCUMENTS

| | | | |
|---|---|---|---|
| 5,255,389 A | 10/1993 | Wang | |
| 5,263,132 A * | 11/1993 | Parker | G06F 17/211 715/207 |
| 5,289,369 A | 2/1994 | Hirshberg | |
| 5,303,163 A | 4/1994 | Ebaugh et al. | |
| 5,379,219 A | 1/1995 | Ishibashi et al. | |
| 5,438,512 A * | 8/1995 | Mantha | G06F 17/211 704/1 |
| 5,446,659 A | 8/1995 | Yamawaki et al. | |
| 5,504,482 A | 4/1996 | Schreder | |
| 5,513,107 A | 4/1996 | Gormley et al. | |
| 5,524,201 A * | 6/1996 | Shwarts | G06F 17/30017 707/E17.009 |
| 5,528,739 A * | 6/1996 | Lucas | G06F 3/0483 704/270 |
| 5,532,690 A | 7/1996 | Hertel | |
| 5,581,464 A | 12/1996 | Woll et al. | |
| 5,675,820 A * | 10/1997 | Jurovics | G06F 17/243 715/205 |
| 5,686,765 A | 11/1997 | Washington | |
| 5,729,751 A * | 3/1998 | Schoolcraft | G06F 17/243 715/207 |
| 5,768,592 A | 6/1998 | Chang | |
| 5,812,070 A | 9/1998 | Tagami et al. | |
| 5,855,015 A | 12/1998 | Shoham | |
| 5,900,004 A | 5/1999 | Gipson | |
| 5,926,824 A | 7/1999 | Hashimoto | |
| 5,969,598 A | 10/1999 | Kimura | |
| 6,006,148 A | 12/1999 | Strong et al. | |
| 6,076,026 A | 6/2000 | Jambhekar et al. | |
| 6,122,580 A | 9/2000 | Autermann | |
| 6,173,231 B1 | 1/2001 | Chojnacki | |
| 6,195,101 B1 | 2/2001 | Ghislain Bossut et al. | |
| 6,232,874 B1 | 5/2001 | Murphy | |
| 6,236,909 B1 * | 5/2001 | Colson | G06F 8/24 123/357 |
| 6,256,565 B1 | 7/2001 | Yanagi et al. | |
| 6,275,231 B1 | 8/2001 | Obradovich | |
| 6,278,928 B1 | 8/2001 | Aruga et al. | |
| 6,332,148 B1 | 12/2001 | Paine et al. | |
| 6,332,168 B1 | 12/2001 | House et al. | |
| 6,343,287 B1 * | 1/2002 | Kumar | G06F 17/30557 707/999.002 |
| 6,430,488 B1 * | 8/2002 | Goldman | B60R 25/00 307/10.1 |
| 6,507,349 B1 | 1/2003 | Balassanian | |
| 6,609,082 B2 | 8/2003 | Wagner | |
| 6,701,234 B1 | 3/2004 | Vogelsang | |
| 6,731,925 B2 | 5/2004 | Naboulsi | |
| 6,741,920 B1 | 5/2004 | Otto | |
| 6,754,651 B2 | 6/2004 | Nanavati et al. | |
| 6,853,956 B2 | 2/2005 | Ballard, Jr. | |
| 6,898,493 B2 | 5/2005 | Ehrman et al. | |
| 6,952,156 B2 | 10/2005 | Arshad et al. | |
| 6,998,956 B2 | 2/2006 | Dix | |
| 7,003,522 B1 | 2/2006 | Reynar et al. | |
| 7,006,902 B2 | 2/2006 | Archer et al. | |
| 7,016,986 B2 | 3/2006 | Fasolt | |
| 7,042,333 B2 | 5/2006 | Dix et al. | |
| 7,072,745 B2 | 7/2006 | Pillar et al. | |
| 7,107,130 B2 | 9/2006 | Kondo et al. | |
| 7,127,331 B2 | 10/2006 | Pillar et al. | |
| 7,138,904 B1 | 11/2006 | Dutu | |
| 7,152,207 B1 | 12/2006 | Underwood et al. | |
| 7,165,040 B2 | 1/2007 | Ehrman et al. | |
| 7,171,381 B2 | 1/2007 | Ehrman et al. | |
| 7,184,866 B2 | 2/2007 | Squires et al. | |
| 7,188,009 B2 | 3/2007 | Hawthorne | |
| 7,254,468 B2 | 8/2007 | Pillar et al. | |
| 7,274,976 B2 | 9/2007 | Rowe et al. | |
| 7,289,611 B2 | 10/2007 | Iggulden et al. | |
| 7,302,320 B2 | 11/2007 | Nasr et al. | |
| 7,343,306 B1 | 3/2008 | Bates et al. | |
| 7,359,714 B2 | 4/2008 | Parupudi et al. | |
| 7,363,357 B2 | 4/2008 | Parupudi et al. | |
| 7,379,541 B2 | 5/2008 | Iggulden et al. | |
| 7,386,374 B1 | 6/2008 | Orf et al. | |
| 7,394,347 B2 | 7/2008 | Kady | |
| 7,412,307 B2 | 8/2008 | Pillar et al. | |
| 7,472,202 B2 | 12/2008 | Parupudi et al. | |
| 7,483,944 B2 | 1/2009 | Parupudi et al. | |
| 7,522,979 B2 | 4/2009 | Pillar | |
| 7,529,854 B2 | 5/2009 | Parupudi et al. | |
| 7,548,961 B1 | 6/2009 | Fernandez | |
| 7,555,369 B2 | 6/2009 | Pillar et al. | |
| 7,571,111 B2 | 8/2009 | Ahrens et al. | |
| 7,571,380 B2 | 8/2009 | Bodin et al. | |
| 7,599,995 B1 | 10/2009 | Fernandez et al. | |
| 7,620,656 B2 | 11/2009 | Dideriksen et al. | |
| 7,656,271 B2 | 2/2010 | Ehrman et al. | |
| 7,656,273 B2 | 2/2010 | Ehrman et al. | |
| 7,667,573 B2 | 2/2010 | Ehrman et al. | |
| 7,668,931 B2 | 2/2010 | Parupudi et al. | |
| 7,683,760 B2 | 3/2010 | Ehrman et al. | |
| 7,707,054 B2 | 4/2010 | Ehrman et al. | |
| 7,711,460 B2 | 5/2010 | Yakes et al. | |
| 7,715,962 B2 | 5/2010 | Rowe et al. | |
| 7,725,225 B2 | 5/2010 | Pillar et al. | |
| 7,747,483 B1 | 6/2010 | Puerini et al. | |
| 7,747,704 B2 | 6/2010 | Parupudi et al. | |
| 7,751,944 B2 | 7/2010 | Parupudi et al. | |
| 7,769,620 B1 | 8/2010 | Fernandez et al. | |
| 7,786,844 B2 | 8/2010 | Ehrman et al. | |
| 7,792,618 B2 | 9/2010 | Quigley et al. | |
| 7,812,712 B2 | 10/2010 | White et al. | |
| 7,822,514 B1 | 10/2010 | Erickson | |
| 7,835,838 B2 | 11/2010 | Pillar et al. | |
| 7,848,857 B2 | 12/2010 | Nasr et al. | |
| 7,859,392 B2 | 12/2010 | McClellan et al. | |
| 7,868,750 B2 | 1/2011 | Miller et al. | |
| 7,873,610 B2 | 1/2011 | Poulsen | |
| 7,876,197 B2 | 1/2011 | Ehrman et al. | |
| 7,876,205 B2 | 1/2011 | Catten et al. | |
| 7,898,388 B2 | 3/2011 | Ehrman et al. | |
| 7,899,610 B2 | 3/2011 | McClellan | |
| 7,899,938 B1 | 3/2011 | Fernandez et al. | |
| 7,911,320 B2 | 3/2011 | Ehrman et al. | |
| 7,912,625 B2 | 3/2011 | Cahoon | |
| 7,956,730 B2 | 6/2011 | White et al. | |
| 7,959,177 B2 | 6/2011 | Fiske et al. | |
| 7,975,229 B2 | 7/2011 | Parupudi et al. | |
| 7,999,670 B2 | 8/2011 | McClellan et al. | |
| 8,000,850 B2 | 8/2011 | Nasr et al. | |
| 8,046,501 B2 | 10/2011 | Gormley | |
| 8,050,815 B2 | 11/2011 | Perry et al. | |
| 8,090,504 B2 | 1/2012 | Long et al. | |
| 8,090,598 B2 | 1/2012 | Bauer et al. | |
| 8,095,422 B2 | 1/2012 | Hallowell et al. | |
| 8,103,412 B2 | 1/2012 | Miller et al. | |
| 8,106,759 B2 | 1/2012 | Miller et al. | |
| 8,120,467 B2 | 2/2012 | Ehrman et al. | |
| 8,139,109 B2 | 3/2012 | Schmiedel et al. | |
| 8,140,358 B1 | 3/2012 | Ling et al. | |
| 8,181,107 B2 | 5/2012 | Melnyk et al. | |
| 8,185,274 B2 | 5/2012 | Garg | |
| 8,188,887 B2 | 5/2012 | Catten et al. | |
| 8,229,630 B2 | 7/2012 | Klug et al. | |
| 8,237,554 B2 | 8/2012 | Miller et al. | |
| 8,250,097 B2 | 8/2012 | Rhodes | |
| 8,256,560 B2 | 9/2012 | Fiske et al. | |
| 8,258,939 B2 | 9/2012 | Miller et al. | |
| 8,280,580 B2 | 10/2012 | Miller et al. | |
| 8,290,659 B2 | 10/2012 | Asano | |
| 8,301,108 B2 | 10/2012 | Naboulsi | |
| 8,301,141 B1 | 10/2012 | Reeves et al. | |
| 8,305,189 B2 | 11/2012 | Miller et al. | |
| 8,306,728 B2 | 11/2012 | Miller et al. | |
| 8,311,858 B2 | 11/2012 | Everett et al. | |
| 8,315,921 B2 | 11/2012 | Hallowell et al. | |
| 8,344,849 B2 | 1/2013 | Larsson et al. | |
| 8,369,967 B2 | 2/2013 | Hoffberg et al. | |
| 8,370,268 B2 | 2/2013 | Ehrman et al. | |
| 8,384,535 B2 | 2/2013 | Miller et al. | |

(56) References Cited

U.S. PATENT DOCUMENTS

| | | |
|---|---|---|
| 8,407,586 B2 | 3/2013 | Niwa |
| 8,417,415 B2 | 4/2013 | Phelan |
| 8,452,674 B2 | 5/2013 | Puerini et al. |
| 8,457,608 B2 | 6/2013 | Wilkerson |
| 8,466,781 B2 | 6/2013 | Miller et al. |
| 8,467,933 B2 | 6/2013 | Miller et al. |
| 8,484,045 B1 | 7/2013 | Fernandez et al. |
| 8,489,563 B2 | 7/2013 | Poulsen |
| 8,548,730 B2 | 10/2013 | Miller et al. |
| 8,549,318 B2 | 10/2013 | White et al. |
| 8,576,061 B2 | 11/2013 | Miller et al. |
| 8,577,548 B2 | 11/2013 | Miller et al. |
| 8,577,703 B2 | 11/2013 | McClellan et al. |
| 8,595,034 B2 | 11/2013 | Bauer et al. |
| 8,630,768 B2 | 1/2014 | McClellan et al. |
| 8,666,590 B2 | 3/2014 | Follmer et al. |
| 8,666,748 B2 | 3/2014 | Dong et al. |
| 8,676,670 B2 | 3/2014 | Ehrman et al. |
| 8,682,529 B1 | 3/2014 | Church et al. |
| 8,688,180 B2 | 4/2014 | Catten |
| 8,694,328 B1 | 4/2014 | Gormley |
| 8,699,044 B2 | 4/2014 | Nakahara |
| 8,712,876 B2 | 4/2014 | Puerini et al. |
| 8,718,866 B2 | 5/2014 | Miller et al. |
| 8,725,596 B2 | 5/2014 | Ehrman et al. |
| 8,736,434 B2 | 5/2014 | Miller et al. |
| 8,738,472 B2 | 5/2014 | Hallowell et al. |
| 8,738,574 B2 | 5/2014 | Wilkerson |
| 8,775,020 B2 | 7/2014 | Miller et al. |
| 8,788,090 B2 | 7/2014 | Rothschild |
| 8,818,618 B2 | 8/2014 | Follmer et al. |
| 8,825,277 B2 | 9/2014 | McClellan et al. |
| 8,838,463 B2 | 9/2014 | Fernandez et al. |
| 8,881,058 B2 | 11/2014 | Ollivierre et al. |
| 8,890,673 B2 | 11/2014 | Catten et al. |
| 8,890,717 B2 | 11/2014 | McClellan et al. |
| 8,892,341 B2 | 11/2014 | McClellan |
| 8,892,451 B2 | 11/2014 | Everett et al. |
| 8,892,495 B2 | 11/2014 | Hoffberg et al. |
| 8,893,053 B1 | 11/2014 | Hyde et al. |
| 8,918,231 B2 | 12/2014 | Rovik |
| 8,922,357 B2 | 12/2014 | Miller et al. |
| 8,942,675 B2 | 1/2015 | Collins et al. |
| 8,947,531 B2 | 2/2015 | Fischer et al. |
| 8,948,926 B2 | 2/2015 | Erickson |
| 8,963,681 B2 | 2/2015 | Kady |
| 8,963,702 B2 | 2/2015 | Follmer et al. |
| 8,972,081 B2 | 3/2015 | Gersabeck et al. |
| 8,994,494 B2 | 3/2015 | Koenig et al. |
| 9,020,697 B2 | 4/2015 | Ricci et al. |
| 9,020,945 B1 | 4/2015 | Hollister et al. |
| 9,045,101 B2 | 6/2015 | Phelan |
| 9,047,170 B2 | 6/2015 | Naboulsi |
| 9,058,703 B2 | 6/2015 | Ricci |
| 9,067,565 B2 | 6/2015 | McClellan et al. |
| 9,071,568 B2 | 6/2015 | Church et al. |
| 9,082,238 B2 | 7/2015 | Ricci |
| 9,082,239 B2 | 7/2015 | Ricci |
| 9,085,270 B2 | 7/2015 | Rovik |
| 9,111,234 B2 | 8/2015 | Wallace et al. |
| 9,117,246 B2 | 8/2015 | McClellan |
| 9,117,318 B2 | 8/2015 | Ricci |
| 9,123,186 B2 | 9/2015 | Ricci |
| 9,129,460 B2 | 9/2015 | McClellan et al. |
| 9,135,764 B2 | 9/2015 | Ricci |
| 9,142,071 B2 | 9/2015 | Ricci |
| 9,142,072 B2 | 9/2015 | Ricci |
| 9,147,296 B2 | 9/2015 | Ricci |
| 9,147,297 B2 | 9/2015 | Ricci |
| 9,147,298 B2 | 9/2015 | Ricci |
| 9,150,154 B2 | 10/2015 | Miller et al. |
| 9,152,933 B2 | 10/2015 | Wellman |
| 9,153,084 B2 | 10/2015 | Ricci |
| 9,172,477 B2 | 10/2015 | Lawrence |
| 9,183,685 B2 | 11/2015 | Ricci |
| 9,189,615 B2 | 11/2015 | Tumanyan |
| 9,202,186 B2 | 12/2015 | Wellman et al. |
| 9,203,843 B2 | 12/2015 | Arasavelli et al. |
| 9,218,698 B2 | 12/2015 | Ricci |
| 9,225,679 B2 | 12/2015 | Church et al. |
| 9,230,074 B2 | 1/2016 | Hsieh et al. |
| 9,230,379 B2 | 1/2016 | Ricci |
| 9,235,941 B2 | 1/2016 | Ricci et al. |
| 9,238,450 B1 | 1/2016 | Kleve et al. |
| 2001/0037298 A1 | 11/2001 | Ehrman et al. |
| 2002/0004910 A1 | 1/2002 | Penzias et al. |
| 2002/0065852 A1 | 5/2002 | Hendrickson et al. |
| 2002/0084887 A1 | 7/2002 | Arshad et al. |
| 2002/0087345 A1 | 7/2002 | Bly et al. |
| 2003/0028451 A1* | 2/2003 | Ananian ............ G06F 17/30867 705/26.42 |
| 2003/0074209 A1 | 4/2003 | Tobin |
| 2003/0096593 A1 | 5/2003 | Naboulsi |
| 2003/0096594 A1 | 5/2003 | Naboulsi |
| 2003/0107470 A1 | 6/2003 | Kady |
| 2003/0120660 A1 | 6/2003 | Maritzen et al. |
| 2003/0130765 A1 | 7/2003 | Pillar et al. |
| 2003/0195825 A1 | 10/2003 | Ehrman et al. |
| 2003/0210128 A1 | 11/2003 | Dix |
| 2003/0216976 A1 | 11/2003 | Ehrman et al. |
| 2003/0225707 A1 | 12/2003 | Ehrman et al. |
| 2004/0015419 A1 | 1/2004 | Ehrman et al. |
| 2004/0015837 A1 | 1/2004 | Worthington et al. |
| 2004/0017281 A1 | 1/2004 | Dix |
| 2004/0024502 A1 | 2/2004 | Squires et al. |
| 2004/0039510 A1 | 2/2004 | Archer et al. |
| 2004/0090121 A1 | 5/2004 | Simonds et al. |
| 2004/0090346 A1 | 5/2004 | Simonds et al. |
| 2004/0092253 A1 | 5/2004 | Simonds et al. |
| 2004/0093154 A1 | 5/2004 | Simonds et al. |
| 2004/0093155 A1 | 5/2004 | Simonds et al. |
| 2004/0133319 A1 | 7/2004 | Pillar et al. |
| 2004/0139327 A1 | 7/2004 | Brown et al. |
| 2004/0158371 A1 | 8/2004 | Iggulden et al. |
| 2004/0158430 A1 | 8/2004 | Ballard, Jr. et al. |
| 2004/0209594 A1 | 10/2004 | Naboulsi |
| 2004/0215376 A1 | 10/2004 | Hawthorne |
| 2004/0215757 A1* | 10/2004 | Butler ............... H04L 67/18 709/223 |
| 2004/0217160 A1* | 11/2004 | Silverbrook ......... B41J 2/17503 235/375 |
| 2004/0249557 A1 | 12/2004 | Harrington et al. |
| 2004/0263316 A1 | 12/2004 | Dix et al. |
| 2005/0022229 A1* | 1/2005 | Gabriel ............. G06Q 20/3674 725/28 |
| 2005/0029872 A1 | 2/2005 | Ehrman et al. |
| 2005/0031100 A1 | 2/2005 | Iggulden et al. |
| 2005/0050201 A1 | 3/2005 | Parupudi et al. |
| 2005/0055430 A1 | 3/2005 | Parupudi et al. |
| 2005/0068569 A1* | 3/2005 | Hull ................... G06F 3/1206 358/1.15 |
| 2005/0071489 A1 | 3/2005 | Parupudi et al. |
| 2005/0080800 A1 | 4/2005 | Parupudi et al. |
| 2005/0099265 A1 | 5/2005 | Dix et al. |
| 2005/0107925 A1* | 5/2005 | Enigk .................. B60K 35/00 701/1 |
| 2005/0108089 A1 | 5/2005 | Ehrman et al. |
| 2005/0119807 A1 | 6/2005 | Kondo et al. |
| 2005/0187901 A1 | 8/2005 | Maritzen et al. |
| 2005/0188012 A1 | 8/2005 | Dideriksen et al. |
| 2005/0216331 A1 | 9/2005 | Ahrens et al. |
| 2005/0228736 A1* | 10/2005 | Norman ................ G06Q 40/04 705/37 |
| 2005/0286063 A1 | 12/2005 | Owen et al. |
| 2006/0208890 A1 | 9/2006 | Ehrman et al. |
| 2006/0208891 A1 | 9/2006 | Ehrman et al. |
| 2006/0229906 A1 | 10/2006 | Suhy et al. |
| 2006/0234758 A1 | 10/2006 | Parupudi et al. |
| 2007/0016493 A1 | 1/2007 | Kelly et al. |
| 2007/0016512 A1 | 1/2007 | Kelly et al. |
| 2007/0021885 A1 | 1/2007 | Soehren |
| 2007/0100513 A1 | 5/2007 | Asano |

(56) References Cited

U.S. PATENT DOCUMENTS

| | | | |
|---|---|---|---|
| 2007/0136658 A1* | 6/2007 | Feigenbaum | G06F 8/38 715/207 |
| 2007/0143662 A1* | 6/2007 | Carlson | G06F 9/4443 715/207 |
| 2007/0162474 A1 | 7/2007 | Parupudi et al. | |
| 2007/0192363 A1 | 8/2007 | Larsen | |
| 2007/0199987 A1 | 8/2007 | Takamura et al. | |
| 2007/0200663 A1 | 8/2007 | White et al. | |
| 2007/0209607 A1 | 9/2007 | Williams et al. | |
| 2007/0229251 A1 | 10/2007 | Ehrman et al. | |
| 2007/0239292 A1 | 10/2007 | Ehrman et al. | |
| 2007/0239992 A1 | 10/2007 | White et al. | |
| 2007/0250396 A1 | 10/2007 | Hallowell et al. | |
| 2007/0276795 A1 | 11/2007 | Poulsen | |
| 2007/0290847 A1 | 12/2007 | Harrington et al. | |
| 2008/0037051 A1 | 2/2008 | Otsubo | |
| 2008/0042875 A1 | 2/2008 | Harrington et al. | |
| 2008/0042881 A1 | 2/2008 | Harrington et al. | |
| 2008/0052292 A1 | 2/2008 | Hallowell et al. | |
| 2008/0059080 A1 | 3/2008 | Greiner et al. | |
| 2008/0068170 A1 | 3/2008 | Ehrman et al. | |
| 2008/0068171 A1 | 3/2008 | Ehrman et al. | |
| 2008/0086323 A1 | 4/2008 | Petrie et al. | |
| 2008/0122626 A1 | 5/2008 | Ehrman et al. | |
| 2008/0127102 A1 | 5/2008 | Anderson | |
| 2008/0136584 A1 | 6/2008 | Ehrman et al. | |
| 2008/0139191 A1 | 6/2008 | Melnyk et al. | |
| 2008/0140440 A1 | 6/2008 | Ehrman et al. | |
| 2008/0140482 A1 | 6/2008 | Ehrman et al. | |
| 2008/0140483 A1 | 6/2008 | Ehrman et al. | |
| 2008/0140543 A1 | 6/2008 | Hallowell et al. | |
| 2008/0140544 A1 | 6/2008 | Ehrman et al. | |
| 2008/0141122 A1 | 6/2008 | Niwa | |
| 2008/0183522 A1 | 7/2008 | Ehrman et al. | |
| 2008/0200209 A1 | 8/2008 | Cahoon | |
| 2008/0245598 A1 | 10/2008 | Gratz et al. | |
| 2008/0250050 A1 | 10/2008 | Cracchiolo et al. | |
| 2008/0252412 A1 | 10/2008 | Larsson et al. | |
| 2008/0255722 A1 | 10/2008 | McClellan et al. | |
| 2008/0262891 A1 | 10/2008 | Kothandaraman et al. | |
| 2008/0270074 A1 | 10/2008 | Horkavi et al. | |
| 2008/0312789 A1 | 12/2008 | Frankov | |
| 2009/0009363 A1 | 1/2009 | Orf et al. | |
| 2009/0018731 A1 | 1/2009 | Grenell et al. | |
| 2009/0037810 A1 | 2/2009 | Algreatly | |
| 2009/0119299 A1 | 5/2009 | Rhodes | |
| 2009/0132902 A1* | 5/2009 | Dutta | G06F 17/30905 715/207 |
| 2009/0143961 A1 | 6/2009 | Gaviani et al. | |
| 2009/0153311 A1 | 6/2009 | Lee | |
| 2009/0177357 A1 | 7/2009 | Long et al. | |
| 2009/0182460 A1 | 7/2009 | O'Neal et al. | |
| 2009/0195376 A1 | 8/2009 | Miller et al. | |
| 2009/0198410 A1 | 8/2009 | Miller et al. | |
| 2009/0198413 A1 | 8/2009 | Miller et al. | |
| 2009/0198445 A1 | 8/2009 | Miller et al. | |
| 2009/0204295 A1 | 8/2009 | Klug et al. | |
| 2009/0216935 A1 | 8/2009 | Flick | |
| 2009/0240395 A1 | 9/2009 | Garg | |
| 2009/0259968 A1 | 10/2009 | Hsieh et al. | |
| 2009/0284359 A1 | 11/2009 | Huang et al. | |
| 2009/0309697 A1 | 12/2009 | Miller et al. | |
| 2009/0312860 A1 | 12/2009 | Beucker et al. | |
| 2009/0312901 A1 | 12/2009 | Miller et al. | |
| 2009/0312902 A1 | 12/2009 | Miller et al. | |
| 2009/0312914 A1 | 12/2009 | Miller et al. | |
| 2010/0004818 A1 | 1/2010 | Phelan | |
| 2010/0010706 A1 | 1/2010 | Gormley | |
| 2010/0036560 A1 | 2/2010 | Wright et al. | |
| 2010/0087987 A1 | 4/2010 | Huang et al. | |
| 2010/0090797 A1 | 4/2010 | Koenig et al. | |
| 2010/0131642 A1 | 5/2010 | Chalikouras et al. | |
| 2010/0144323 A1 | 6/2010 | Collins et al. | |
| 2010/0152976 A1 | 6/2010 | White et al. | |
| 2010/0194604 A1 | 8/2010 | Ehrman et al. | |
| 2010/0214588 A1 | 8/2010 | Nakahara | |
| 2010/0217630 A1 | 8/2010 | Ehrman et al. | |
| 2010/0241313 A1 | 9/2010 | Fiske et al. | |
| 2010/0250403 A1 | 9/2010 | Puerini et al. | |
| 2010/0277273 A1 | 11/2010 | Miller et al. | |
| 2011/0004384 A1 | 1/2011 | Erickson | |
| 2011/0022489 A1 | 1/2011 | Hallowell et al. | |
| 2011/0063099 A1 | 3/2011 | Miller et al. | |
| 2011/0082625 A1 | 4/2011 | Miller et al. | |
| 2011/0087404 A1 | 4/2011 | Cieler et al. | |
| 2011/0093165 A1 | 4/2011 | Miller et al. | |
| 2011/0106643 A1 | 5/2011 | Berkowitz | |
| 2011/0121941 A1 | 5/2011 | Miller et al. | |
| 2011/0137520 A1 | 6/2011 | Rector et al. | |
| 2011/0155803 A1 | 6/2011 | Nieuwland et al. | |
| 2011/0162047 A1 | 6/2011 | Reeves et al. | |
| 2012/0046809 A1 | 2/2012 | Wellman | |
| 2012/0101855 A1 | 4/2012 | Collins et al. | |
| 2012/0144319 A1 | 6/2012 | Tan et al. | |
| 2012/0209454 A1 | 8/2012 | Miller et al. | |
| 2012/0232961 A1 | 9/2012 | Wellman et al. | |
| 2012/0254779 A1 | 10/2012 | Ollivierre et al. | |
| 2012/0265654 A1 | 10/2012 | Puerini et al. | |
| 2012/0296492 A1 | 11/2012 | Gusikhin et al. | |
| 2013/0059607 A1 | 3/2013 | Herz et al. | |
| 2013/0166104 A1 | 6/2013 | Creguer et al. | |
| 2013/0304709 A1 | 11/2013 | Poulsen | |
| 2014/0129301 A1 | 5/2014 | Van Wiemeersch et al. | |
| 2014/0303836 A1 | 10/2014 | Phelan | |
| 2014/0303837 A1 | 10/2014 | Tuukkanen | |
| 2014/0379168 A1 | 12/2014 | Spadoni | |
| 2015/0025705 A1 | 1/2015 | Burger | |
| 2015/0112512 A1 | 4/2015 | Fan et al. | |

OTHER PUBLICATIONS

One Space Designer Modeling 2006 Help Files; released Feb. 2006; CoCreate Software GmbH KG.

Non-Final Office Action, dated Jul. 23, 2009, in U.S. Appl. No. 11/753,476.

Final Office Action, dated Jan. 20, 2010, in U.S. Appl. No. 11/753,476.

Non-Final Office Action, dated Mar. 28, 2011, in U.S. Appl. No. 12/972,876.

Final Office Action, dated Oct. 12, 2011, in U.S. Appl. No. 12/972,876.

* cited by examiner

200 Recalling a Profile -- Selecting Content First

300 Recalling Profile by Selecting Profile First

400 Creating a New Profile for Multiple Views in a Single Document

600 Creating a New Profile for Multiple Documents in Multiple Applications

800 Recalling Video Playback Profile by Selecting Video File

900
Recalling Video Playback Profile by Selecting Profile

1000 Creating a New Profile for CAD Objects

1100 Recalling CAD Profile by selecting CAD Content

1300 Applying Profile from one source to data from other source

1400
Creating a New Profile for an Operating System user configuration

1500 Creating a New Profile for a vehicle based on Driver preferences

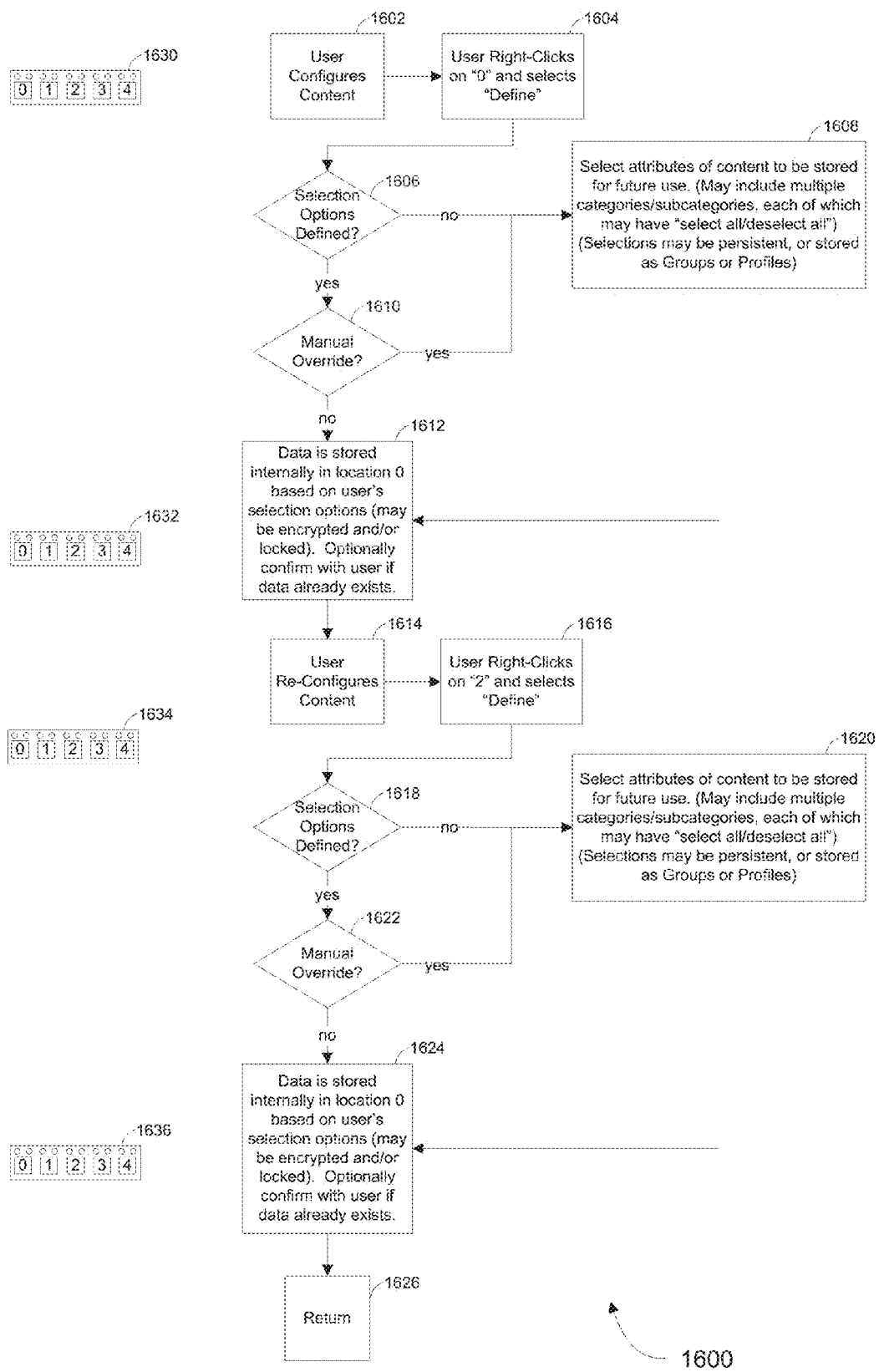

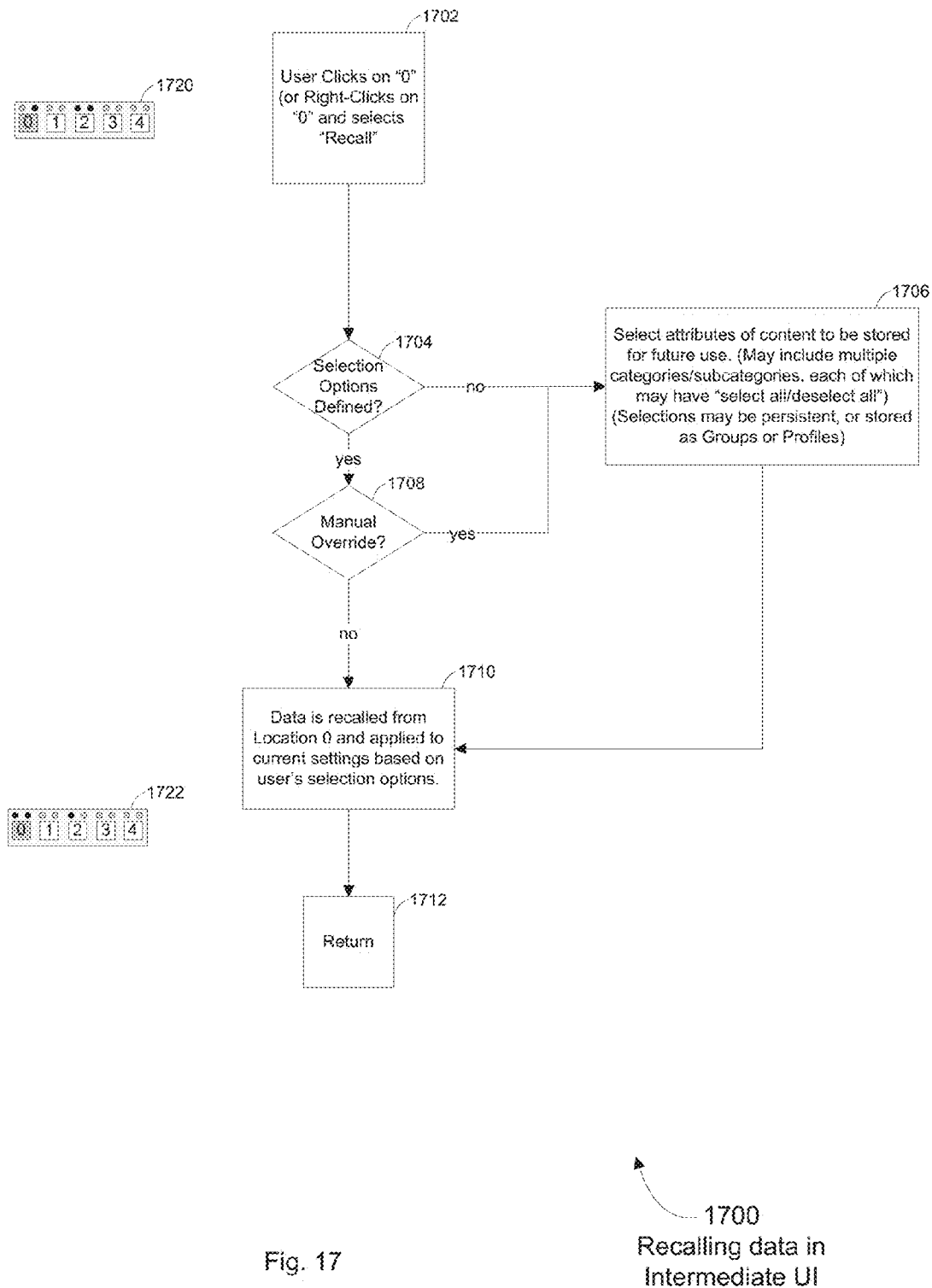

1800
Clearing Storage Location
in Intermediate UI

1900 Loading new profiles into Storage Locations in Intermediate UI

2000 Creating new sets of profile data and storing data using Enhanced Intermediate UI Detailed view of Enhanced Intermediate User interface 2100 Recalling/applying sets of profile data using Enhanced Intermediate UI Fig. 22   2200 Systems for connecting to profile servers

META-CONFIGURATION OF PROFILES

CROSS-REFERENCE TO RELATED APPLICATIONS

This application is a continuation of U.S. patent application Ser. No. 13/942,542, filed on Jul. 15, 2013, entitled "Meta-Configuration of Profiles," which is a divisional of U.S. patent application Ser. No. 12/972,876, filed Dec. 20, 2010, entitled "Meta-Configuration of Profiles," which is a continuation of U.S. application Ser. No. 11/753,476, filed May 24, 2007, entitled "Meta-Configuration of Profiles," which in turn claims priority to and benefit from U.S. provisional Application Ser. No. 60/803,306, filed May 26, 2006, entitled "Meta-Configuration of Profiles," and U.S. provisional Application Ser. No. 60/820,870, filed Jul. 31, 2006, entitled "Meta-Configuration of Profiles." The entire disclosures of each of the above-mentioned applications are herein specifically incorporated by reference in their entirety.

BACKGROUND OF THE INVENTION

The use of profiles is a convenient way to save time in performing various types of tasks. Default profiles provide desired preferences in advance for many different types of activities. For example, Microsoft Word may store a default profile such that when a new document is opened, the document uses 12 point type of a particular font such as Times Roman. As another example, profile buttons may be provided in an automobile that set the height, position and attitude of a car seat for several different drivers. Further, the default display in a computer aided design drawing application illustrates the devices being displayed in accordance with a default view. Each of these examples, as well as many other examples, constitutes profiles that can conform to a user's preferences or a default profile.

SUMMARY OF THE INVENTION

The present invention may therefore comprise a method of retrieving a profile that has a plurality of attributes and applying the profile to selected content comprising: defining the selected content to which the profile is to be applied; determining if the content includes an instruction to use the profile; retrieving the profile from a profile repository that is separate from and not embedded with the content; accessing the profile repository to load the profile; loading the profile from the profile repository; setting a current attribute pointer to a current attribute in the profile; applying the current attribute to the content; incrementing the current attribute pointer so that all attributes of the plurality of attributes in the profile are applied to the selected content.

The present invention may further comprise a method of applying a profile that has a plurality of attributes to selected content comprising: defining the selected content to which the profile is to be applied; setting a current attribute pointer to a current attribute of the plurality of attributes; applying the current attribute to the selected content when the current attribute has a corresponding attribute present in the selected content, and when the current attribute is valid for the content; incrementing the current attribute pointer so that the plurality of attributes in the profile are applied to the selected content whenever the attributes have a corresponding attribute present in the selected content, and when each attribute is valid for the selected content.

The present invention may further comprise a method of creating a profile for a Computer-Aided Design (CAD) application comprising: configuring attributes of the profile of the CAD application by applying the attributes to selected content of a CAD model for use with the CAD application; accessing a plurality of categories and subcategories of the attributes; selecting the attributes from the categories and subcategories to form the profile; applying a unique identifier to the profile; storing the profile in a profile repository embedded within the content of the CAD model.

The present invention may further comprise a method of using a profile controller to control the attributes of a profile to be used with selected content and other content comprising: accessing a plurality of categories and subcategories of the attributes; selecting the attributes from the categories and subcategories to form the profile; assigning a unique identifier to the profile; storing the profile in a profile repository for use with the selected content; retrieving the profile from the profile repository using the unique identifier; applying the profile to the selected content; sending a notification that the profile is available for use by the other content; allowing access to the profile by the other content.

BRIEF DESCRIPTION OF THE DRAWINGS

FIG. 16A is a flow diagram of an embodiment for defining and storing profiles using an intermediate user interface.

FIG. 17 is a flow diagram of an embodiment for recalling profiles using an intermediate user interface.

DETAILED DESCRIPTION OF EMBODIMENTS OF THE INVENTION

Figure 1A:
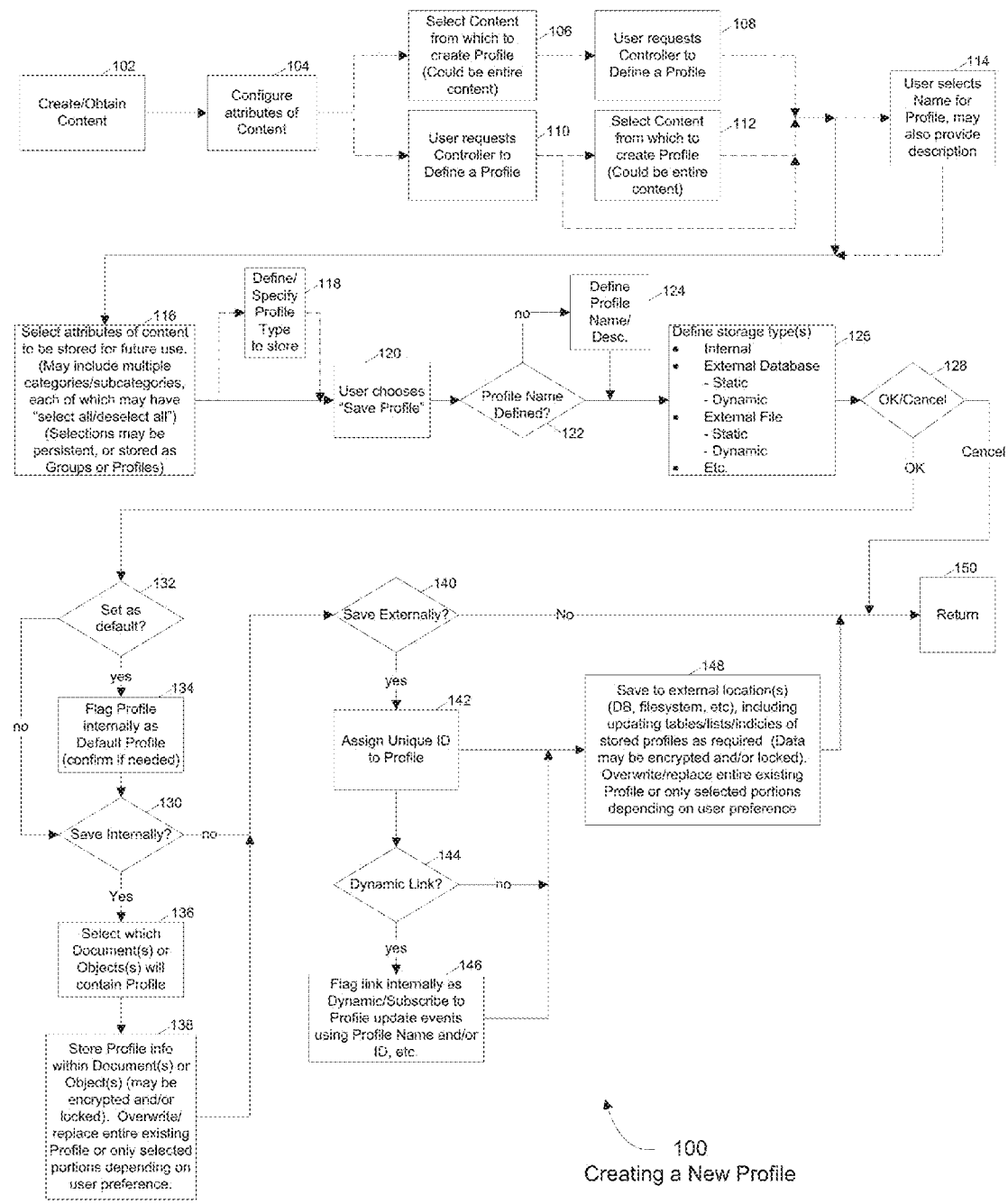
FIG. 1A is a flow diagram illustrating a process for creating a new profile.

FIG. 1A is a flow diagram of an embodiment of an overall process for creating a profile. At step 102, the content to which the profile will be applied is created or obtained from another source. For example, the user may wish to create a profile for a document such as a Word document. In that case, the user may create the Word document or retrieve a Word document from a source. Alternatively, it may be desirable to create a profile for a set of CAD drawings. The content of the CAD drawings may be created by the user or obtained from another source. At step 104, the user chooses or configures the desired attributes of the content. The attributes are the settings for items such as format, style, position, etc. for which settings are chosen by the user for the particular content. For example, in a Word document, the attributes may be the settings for font, font size, spacing, etc. In a CAD drawing, attributes may be the settings for the views, lighting, size, etc.

After step 104 is completed, the process can proceed either to step 106 or to step 110. If the process proceeds to step 106, the content is selected from which a profile is created. In other words, the user can select the content that is going to be used to create a profile. In the example of a Word document, the user may select one or more paragraphs of the document, or in a CAD drawing one or more objects of the CAD drawing. Also, the user may have the option "select all." The process then proceeds to step 108 where the user requests the controller to define a profile. In other words, the controller or processor of the system initiates the process for defining a profile at step 108.

Alternatively, after step 104, the process can proceed to step 110 where the user first requests the controller to define a profile. The process then proceeds to step 112 where the content is selected from which a profile is to be created. If the user desires to create a generic profile without selecting specific content, the user may effectively skip step 112 by not selecting any content. After step 108, or step 112, the process can optionally proceed to step 114 where the user selects a name for the profile and optionally provides a description of that profile. For example, if a user desires to select a profile for an automobile, such as seat settings, audio settings, engine performance settings, climate control settings, etc., the user may wish to use his or her name as the profile name. The process of selecting a name in accordance with step 114 can be performed at this point, or optionally can be performed at step 124, as disclosed below. In other words, the process can proceed directly to step 116 and selection of the name can occur at step 124.

The process then proceeds to step 116 where the user selects attributes of the content to be stored for future use. The attributes are the settings of the items that form the profile. For example, in a profile for an automobile, the attributes may include seat position, lumbar position, back rest tilt, seat height, audio volume, audio presets, climate control temperature, engine performance parameters, etc. For a Word document, the attributes may include the font, font size, line spacing, paragraph spacing, centering features, paragraph layout, etc. For a CAD drawing, the attributes may include the view, lighting, transparency, part color, wire frame, etc. For a computer desktop, the attributes may include open applications and their window sizes and associated open documents (including position within the document), power settings, screen resolutions, audio volume, etc.

Figure 1B:
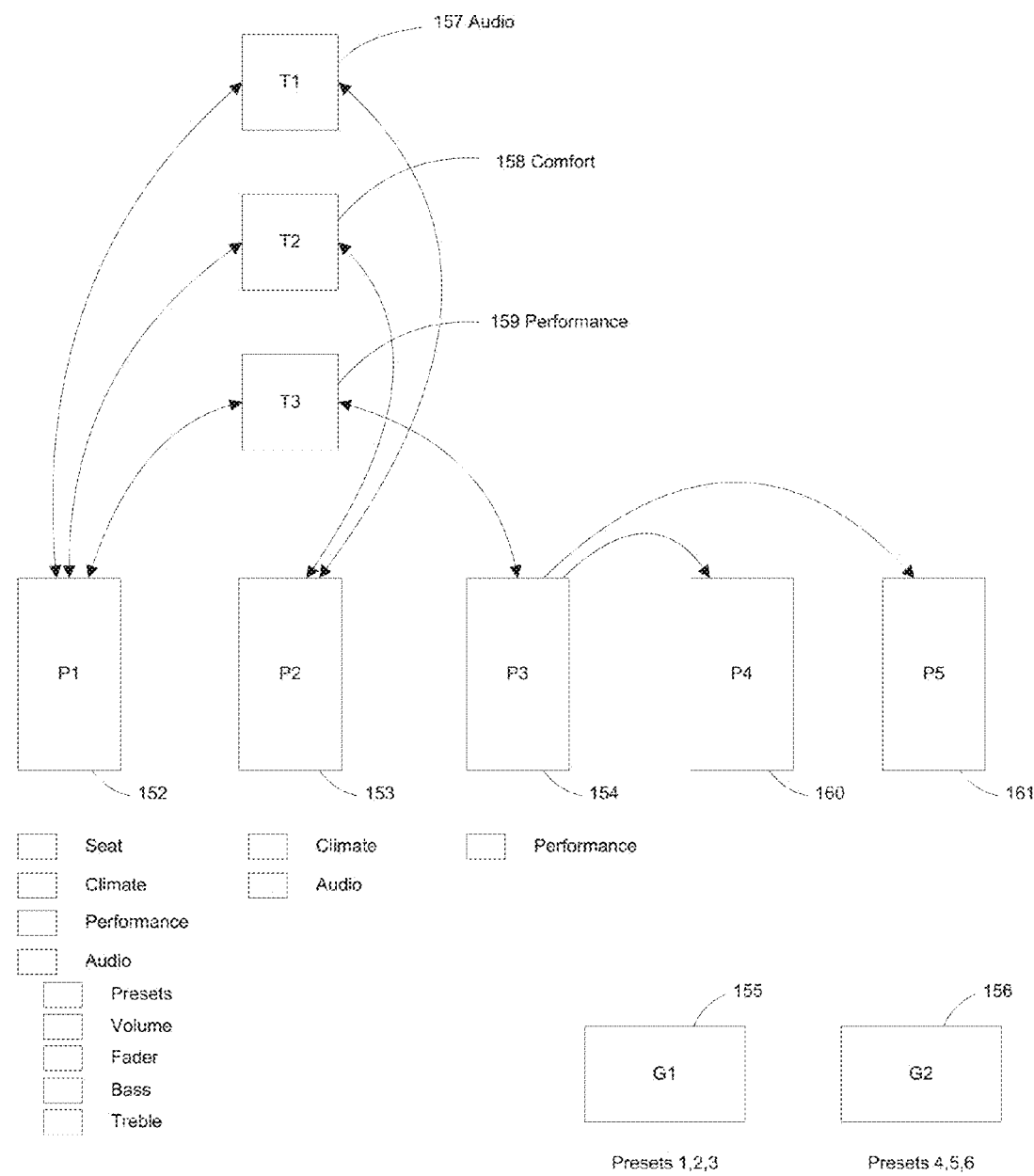
FIG. 1B is a diagram illustrating the linking of profile types with profiles.

One implementation of the process of selecting attributes in accordance with step 116 may be to display a series of categories and subcategories as menu check boxes which allow the user to check or uncheck each one of the attributes that is going to be saved as part of the profile. For example, in an automobile, the user may check an "audio" box category, which brings up subcategories as additional check boxes such as "Preset Buttons" and "Volume". The user can select "Preset Buttons," and additional check boxes may be displayed for the individual radio preset buttons, which allow selection of a particular frequency (radio station) for each of the preset buttons. Of course, a "select all" or "deselect all" option can be provided with the check list. In addition, the user may generate groups which can be a collection of attributes which may or may not be related. For example, a group may include the presets for buttons 1, 2 and 3 for the radio. Another group may include the presets for buttons 4, 5 and 6 of the radio. A third group may include all of the radio presets plus the climate control settings. The groups can be used to populate a profile in a simple and easy manner by importing the settings for the groups into a new profile. This aids the user in reducing the time required to populate a new profile. These groups and the profiles within the groups can be defined by the user and/or specified by the system (i.e. company-wide definitions, etc.) to greatly simplify configuration. For example, in the case of a Word document, if the user wants to define a set of profiles containing specific text formatting attributes such as font, size, line spacing, character adjustment setting, etc., the user may define a group containing the desired items and whether each item should be included or excluded, as well as (optionally) the settings of the items (attributes), (effectively creating a profile that can be used to define other profiles). Further, a profile can contain links to one or more additional profiles, along with information regarding which portion or portions of this linked profile data should be included and/or ignored, to provide further flexibility. For example, as illustrated in FIG. 1B, profile (P3) 154 may have its own data, and also has links to profiles (P4) 160 and (P5) 161. This allows profile (P3) 154 to have a simpler definition, as profile (P3) 154 will automatically include either the full profile information or a subset thereof (per user preference and configuration information) from profiles (P4) 160 and (P5) 161. Then, when defining the new profile or recalling an existing profile, rather than having to manually specify which attributes to include and/or exclude, the user can simply specify the group created above, and all settings will be automatically adjusted as specified in the group. If the user has chosen to link the current profile to one or more additional profiles, the current settings will be adjusted as if the profile information from the additional profile(s) were directly included in the current profile. The user, when specifying the group or profile, can optionally select, for example, "turn all in group ON" or "turn all in group OFF" (as well as other options) instead of simply applying the settings stored in the group, thereby further increasing the flexibility of the selection operation. These groups can be used in both storage and recall of profiles. Just as a profile definition may be simplified using groups, a profile definition may be very simple by allowing it to contain data from other profiles, as copies of the data and/or as links to the data to further simplify its definition. In fact, a profile definition may consist entirely of links to other profiles, the information of which will be processed as appropriate.

The process of FIG. 1A then optionally proceeds to step 118. At step 118, profile types are defined or specified by the user. For example, as illustrated in FIG. 1B, the user or multiple users may have multiple profiles defined in the system such as a first profile (P1) 152, second profile (P2) 153 and a third profile (P3) 154. The user may then wish to link a first type (T1) 156, which may be an audio profile type with profiles (P1) 152 and (P2) 153, since both profiles (P1) 152 and (P2) 153 include audio categories. However, the user can associate or link the first profile type (T1) 157 with any particular profile, even though that profile may not include audio attributes. It is strictly up to the user how the profile types will be linked to the particular profiles. For example, the user may link the comfort-related profile type (T2) 158 to climate control, seat position and audio profiles. Profile type (T3) 159, that relates to engine performance, is linked to profile (P1) 152 and profile (P3) 154 that both include performance attributes. Each profile may have multiple types. For example, a single profile could belong to both the "comfort" type and the "performance" type. The advantage of providing profile types is that the user may sort and/or filter the list of available profiles by type, thereby simplifying the selection process (such as showing only profiles that are flagged as "comfort" profiles). For example, if the user chooses to show only a particular profile type, such as the second profile type (T2) 158, which is a comfort profile type, the user will see only the profiles that are associated with that particular profile type so that during recall, as disclosed in FIG. 2, the user can more easily choose the desired profile to recall. The names of each of the profile types can be selected by the user and/or predefined names can be provided for the profile types. Groups (G1) 155 and (G2) 156 are also illustrated in FIG. 1B. As explained above, groups can include any desired collection of attributes and can be used to quickly and easily populate profiles.

Referring again to FIG. 1A, the process then proceeds to step 120 where the process of saving the profile that is defined by the chosen attributes is initiated. At step 122, it is determined by the controller whether a name for the profile, and optionally a description of the profile, have been selected at step 114. If not, the user selects the profile name and optionally a description of the profile at step 124.

The process of FIG. 1A then proceeds to step 126 for selection of the storage type or types for the profile. As disclosed in step 126, profiles can be stored internally in one or more files that the user is accessing, externally in a separate file, and/or externally in a database. For example, if the user generates profiles for a Word document, the profiles can be stored internally in the file of the Word document. Further, the user can store the profiles in another file that may be associated with the Word document. Still further, the user can store the profiles in an external database. External databases can include any desired type of volatile or non-volatile memory including RAM, USB plug-ins, flash media, memory cards, hard drives, removable hard drives, network storage (NAS, SAN, etc.), zip drives, an actual database or data management application, etc., that can be accessed either locally or over a wired or wireless network including LANs, WANs, the internet, etc. An identifier can be assigned to the profile so that when a particular file is opened, the file can identify and access the profile data that is stored in another file or in an external database. In the example of an automobile profile, the profiles may be stored in a plug-in USB drive. The user can simply plug the USB drive into a USB port in the automobile to provide the automobile with the user's profiles. Alternatively and/or additionally, a touch screen and/or any other interface or combination of interfaces, including keyboard, mouse/touchpad, audio, voice, SMS, text message, email, etc., may be provided in the automobile that allows the user to select his or her name that includes the stored profiles in a file associated with the user's name. These profiles can be stored on the hard drive or other non-volatile memory in the automobile computer for access by a number of different users. Profiles that are stored in external databases can also be accessed over a wired or wireless communication link or network such as a local area network, a wide area network or the Internet. For example, a user may prefer a certain font, line spacing, paragraph spacing, margins, centering and other layout parameters for a particular Word document. If the user creating the Word document, for example, desires to apply the same profiles, the user can access the profiles from another file over a network, download those profiles, and apply those profiles to the new Word document. Of course, the same principles apply to other uses of the disclosed system such as CAD drawings and other applications of the system. For example, profiles for a particular driver may be wirelessly downloaded in an automobile from an external database that is connected to a network.

Further, storage and usage of the profiles can be either static or dynamic. For static profiles, the user must manually update the profile if changes are made, and must also manually update any documents, etc. that use the profile information. For example, if a user is working on a document and has stored a profile in an external database with a static link, and the user modifies the controlling or defining aspects of the profile, the user must manually update the stored profile. Further, if another user modifies this stored profile, the initial user's document will only be reformatted or changed in accordance with the updated profile information if the initial user reloads the profile data. In contrast, dynamic storage may automatically update or change the stored profile(s) (with or without prompting the user, depending on configuration options) if a change is made to the controlling or defining aspects of the profile. Additionally, if a stored profile is modified, the dynamically linked profile may automatically update linked documents, etc. that use the profile information, or may prompt the user as to whether the user would like to apply the new profile information to the current document, etc. For example, if a user is working on a document and has stored a profile in an external database with a dynamic link, and another user modifies this profile, the initial user's document may be automatically updated with the new formatting, etc. included in the updated profile, or the user may be prompted as to whether the user would like to apply the new profile information to the current document. When the user is prompted whether to apply the new profile information, the system may provide a "preview" of the changes to enable the user to see what will occur before the changes are actually applied. Also, when a dynamic link is in use, the option regarding whether the user will be prompted to apply the new profile, as well as other preferences, including the option to ignore all changes to linked profiles, can be set as a user-level preference, as a system-level preference, and/or as one or more other levels of preference, depending on the behavior and level of flexibility desired.

Figure 1C:
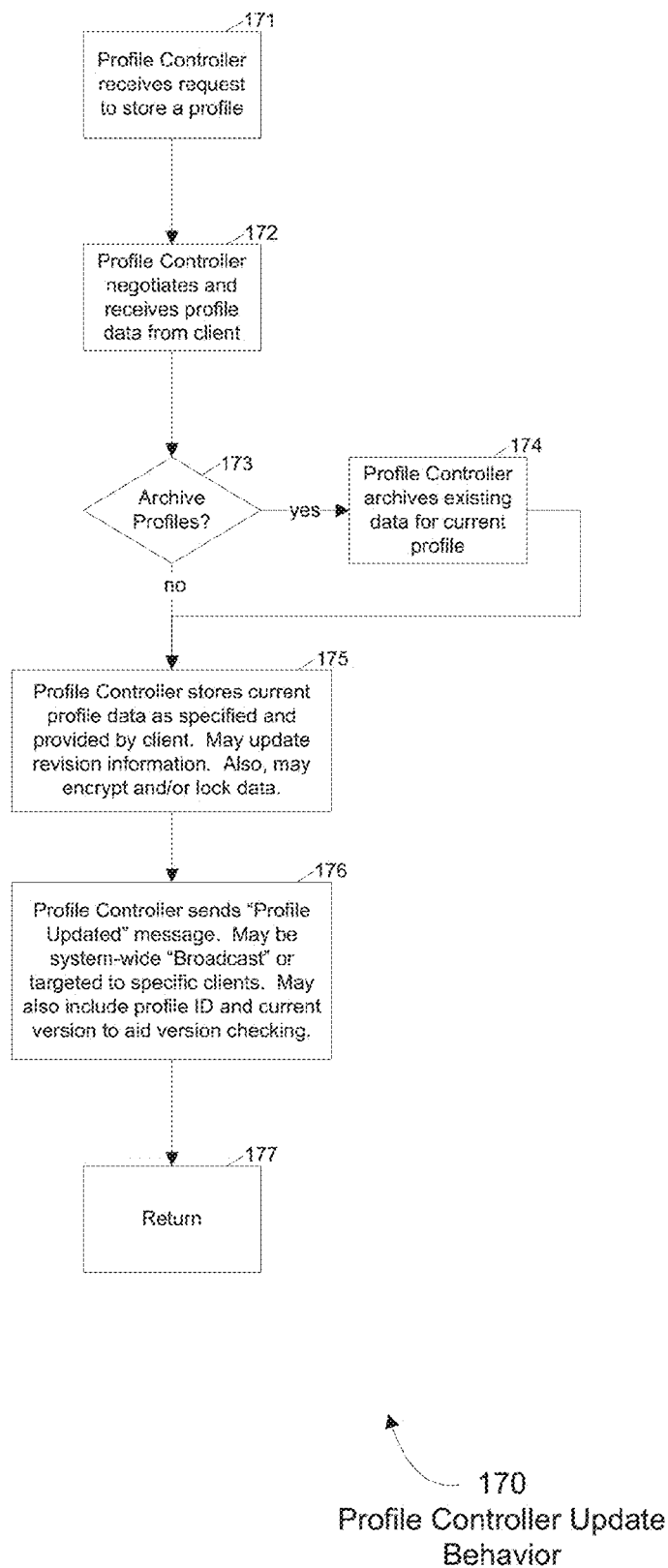
FIG. 1C is a diagram illustrating an embodiment of a process that might be followed by a profile controller.

FIG. 1C illustrates an embodiment of a process 170 that could be used by a profile controller to handle dynamic links, as described above. In step 171, the profile controller receives a request from a client to store a profile. The process then proceeds to step 172, in which the profile controller negotiates with the client to determine what profile needs to be stored and receives the current profile data from the client. This negotiation may include assigning a unique ID, if needed, to the profile, as well as other data manipulations and assignments. The process then proceeds to step 173. At step 173, the profile controller determines whether the current profile has been previously stored, and if so, if its existing profile data is to be archived. One reason for archiving profile data is to enable the user to restore a previously used profile. If the current profile has not been previously stored, or if the existing profile data is not to be archived, the process proceeds directly to step 175. If the existing profile data is to be archived, the process proceeds to step 174, where the profile controller archives the existing data for the current profile. This archival process can take many forms, including differential backup, compression, encryption and/or any other method for storing data. The process then proceeds to step 175. At step 175, the profile controller stores the current profile data as specified and provided by the client. Any method of storage may be used, and may include encryption, compression, etc., and the data may be stored in any appropriate location. The process then proceeds to step 176. In step 176, the profile controller sends a message indicating that an updated profile is available. This message may be sent for new profiles as well. This message may be a system-wide broadcast message or may be targeted to specific clients, and may be sent to local and/or remote destinations (such as over a network or the Internet). In the case of a broadcast message, the receiver can be configured to receive such messages, such as by "subscribing" to them. The receivers of these messages may be clients such as the one that initiated the request to store the profile, and may also include other profile controllers, which may be located remotely, thus enabling a distributed, redundant system of profile controllers. The "profile updated" message may include the profile's unique ID and current revision, as well as other information (including the complete profile, if desired). The receiver of the message will then determine the appropriate action, if any, to be taken. The process of FIG. 1C then proceeds to step 177 and ends.

The process of FIG. 1A then proceeds to step 128. At step 128, the user is prompted to cancel the storage of the profile or accept the profile for storage. If it is determined at step 128 to cancel the storage of a profile (for example, if the user desires to start over), the process proceeds directly to step 150. If not, the process proceeds to step 132. At step 132, it is determined whether the profile should be set as the default profile. If the profile should not be set as the default profile, the process then proceeds directly to step 130. If the profile is to be set as the default profile, the process proceeds to step 134 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 130, where the system determines, based upon the instructions provided at step 126, whether to store the profile internally to a particular file. The process then proceeds to step 136. At step 136, the documents or objects to which the profile will be stored are selected. With respect to specific objects, such as objects in a CAD drawing, one or more profiles can be associated with various objects in the data files, just as one or more profiles may be stored within each document or object. If the profile already exists within the documents or objects, the user may be prompted as to whether the existing profile should be updated, as well as to whether the profile should be completely overwritten or if only the attributes selected for storage should be updated (allowing the user to easily update a small number of settings without having to redefine the entire profile). At step 138, the system stores the profile within the selected document(s) or object(s). If desired, the stored profile can be encrypted and/or locked (such as with a password) when stored to prevent unauthorized or unintentional changes and/or usage. This security may include one or more authentication methods and technologies such as biometric identification (retinal scan, fingerprint, voice authentication, etc.), SmartCards, USB keys, etc. The process then proceeds to step 140. If it is determined at step 130 to not save the profile internally, the process proceeds directly to step 140.

At step 140 of FIG. 1A, the system determines if the profile is to be saved externally. If not, the process proceeds directly to step 150 and ends. If the profile is to be saved externally, the process proceeds to step 142 where a unique identifier (such as a serial number) is applied to the profile. If such an identifier has already been assigned to the profile, this step may be omitted. The process then proceeds to step 144 to determine if a dynamic link is to be established with the external profile. If so, the process proceeds to step 146 to internally flag the link as a dynamic link so as to optionally dynamically update the profile definition as changes are made. Flagging the link as dynamic also allows the existing (i.e. used for profile definition) content to be updated (either completely automatically or by optionally prompting the user) if the stored profile is updated. The optional features may be specified as user-level, system-level, and/or one or more other levels of preferences, depending upon the behavior and level of flexibility desired. Dynamic links and groups are more fully explained above. The process then proceeds to step 148. If it is determined that a dynamic link is not desired, the process proceeds directly to step 148.

At step 148 of FIG. 1A, the profile is saved to an external location such as an external database, an external file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated for the profiles as the profiles are changed. The process then proceeds to step 150 to end the process.

Figure 2:
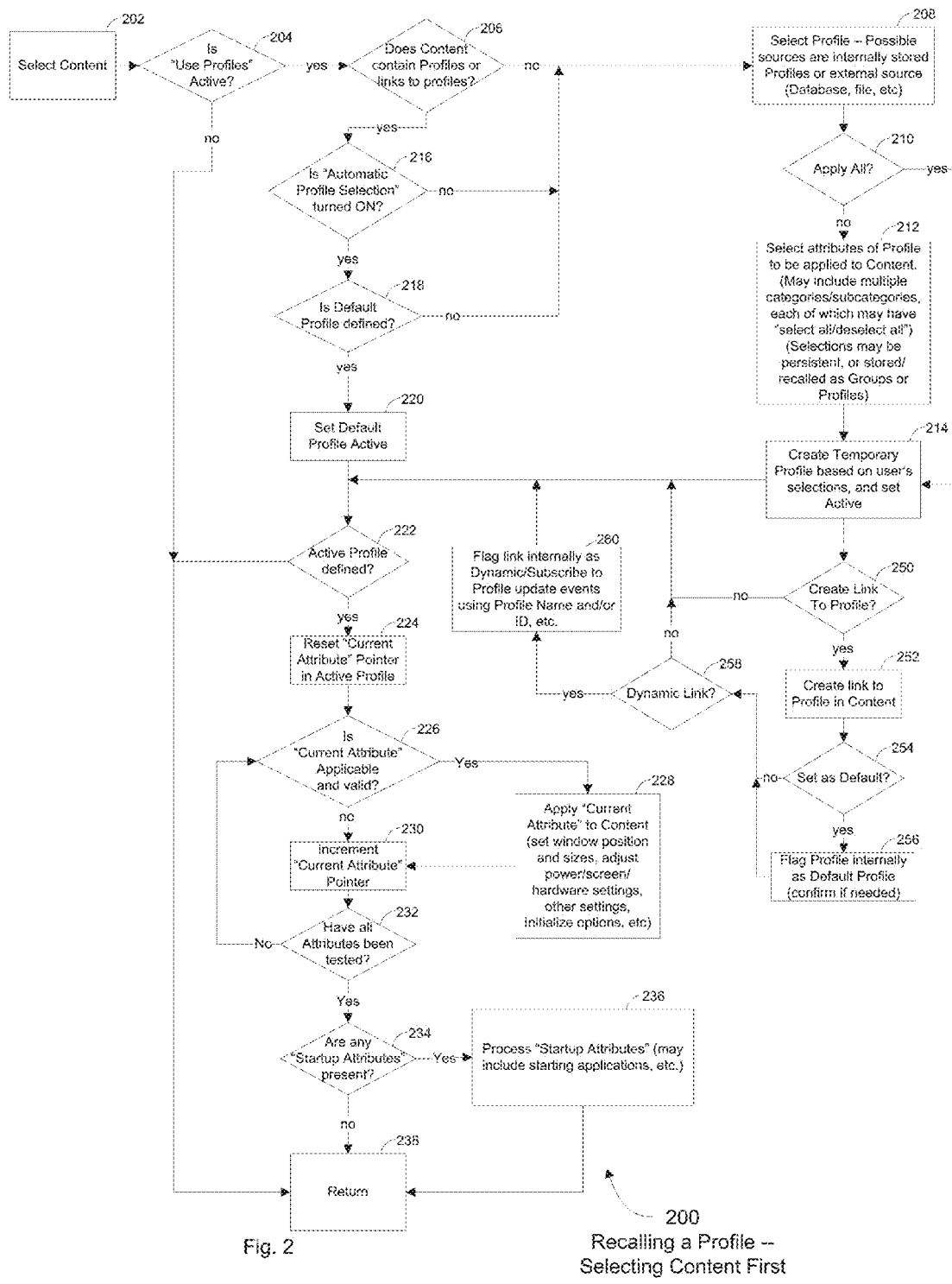
FIG. 2 is a flow diagram illustrating a process for recalling the profile by selecting the content.

FIG. 2 is an embodiment of a process 200 for recalling a profile by selecting the content. At step 202, the user selects the particular content such as a Word document, CAD file, etc. At step 204, the system determines if the content or controlling environment (such as the application containing the content) is configured to "use profiles." If the content is not programmed to use a profile at step 204, or if the user has chosen not to "use profiles," the process proceeds directly to step 238 to end the process. If the content is programmed with an instruction to "use profiles" and the controlling environment is configured to "use profiles," the process proceeds to step 206 to determine if the content contains profiles or links to profiles. If the content does not contain profiles or links to profiles, the process proceeds to step 208. If the content does contain profiles or links to profiles, the process proceeds to step 216 to determine if an automatic profile selection is activated. If the automatic profile selection is not activated, the process proceeds directly to step 208. If the automatic profile selection is activated, the process proceeds to step 218 to determine if a default profile has been defined. If a default profile has not been defined, the process proceeds to step 208. If a default profile, which may be a linked profile, has been defined, the process proceeds to step 220 to activate a default profile. The process then proceeds to step 222.

At step 208 of FIG. 2, a profile is selected by the user. Possible sources of profiles are internally stored profiles or an external source of profiles, such as databases, files and other sources. For the example of a Word document, profiles can be extracted and used from any other source, including other Word documents. The process then proceeds to step 210 where the user can decide whether to apply all of the profile or only a portion of the profile. If the entire profile is to be applied, the process proceeds directly to step 214. If only a portion of the profile or none of the profile is to be applied, the process proceeds to step 212. At step 212, the desired attributes of the profile are selected by the user. The attributes may be organized into multiple categories and subcategories. Categories are similar to groups as discussed above, but constitute a collection of related attributes. The multiple categories and subcategories allow the user to "select all" or "deselect all" for increased efficiency and flexibility when configuring a profile. The selections may be persistent, i.e., settings may be remembered between reboots/restarts, and may be stored and recalled as groups or profiles as described above.

The process of FIG. 2 then proceeds to step 214 where the system creates a temporary profile based on user selections and sets the profile active. The process may then optionally proceed, depending on configuration options, to step 250 where the user is prompted whether to create a link to the profile. If the user chooses not to create a link, the process then proceeds directly to step 222. If the user chooses to create a link, the process then proceeds to step 252 where a link to the profile is created in the content. At step 254, it is determined whether the profile should be set as the default profile. If it is determined as step 254 that the profile should be set as the default profile, the process proceeds to step 256 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 258. If it is determined at step 254 that the profile is not to be saved as the default profile, the process proceeds directly to step 258. At step 258 it is determined if a dynamic link is to be established with the profile. If so, the process proceeds to step 260 to internally flag the link as a dynamic link so as to optionally dynamically update the profile definition as changes are made. Flagging the link as dynamic also allows the content to be updated (either completely automatically or by optionally prompting the user) if the stored profile is updated. The process then proceeds to step 222. If it is determined that a dynamic link is not desired, the process proceeds directly to step 222. At step 222, the system determines if an active profile has been defined. If an active profile has not been defined, or in other words, if the temporary profile was not successfully created or if the default profile is not present or is corrupted, the process proceeds directly to step 238 and the process ends. If an active profile has been defined, the process proceeds to step 224 to reset the current attribute pointer in the active profile. In other words, a pointer is set in the profile to point to the current attribute in the profile. The process then proceeds to step 226 to determine if the current attribute is applicable and valid. This verification enables profiles to be applied to various types of content that may not be identical to the content from which the original profile was generated, such as recalling an automobile profile in an automobile different from the automobile in which the profile was defined, i.e., there may be different numbers of radio presets, no seat height adjustment, etc. The verification operation determines if the current attribute can be applied to the content, i.e., if the current attribute has a corresponding attribute in the content, and if so, if the attribute data is valid for the content, i.e., if the attribute data can be applied to the content. For the example of an automobile profile, a profile attribute for a radio station preset may be applicable if the automobile has configurable radio preset buttons, but may only be valid if the attribute's preset button number exists in the automobile. An additional example is the case of applying an automobile profile to a home theater system, in which the radio preset attributes in the profile may have corresponding attributes in the home theater system, but other profile attributes may not. If the current attribute is applicable and valid, the process proceeds to step 228 to apply the current attribute to the content. For the example of an automobile profile, seat positions, climate controls settings, engine performance settings, sun/moon-roof settings, and audio settings can all be set, as well as other settings such as display brightness, mirror positions and other initializing options. The process then proceeds to step 230. If it is determined at step 226 that the current attribute is not applicable and valid, such as an attribute for audio radio station preset button 6 when the current vehicle only has 5 radio station preset buttons, the process proceeds directly to step 230. At step 230, the current attribute pointer is incremented, meaning that the next attribute is accessed. The process then proceeds to step 232 to determine if all of the attributes have been accessed and applied to the content. If not, the process loops back to step 226. If all of the attributes have been processed and either applied or skipped, the process proceeds to step 234 to determine if any startup attributes are present. If startup attributes are present, the process proceeds to step 236 to process the startup attributes which may include starting applications, etc. The process then ends at step 238. If it is determined at step 234 that there are no startup attributes present, the process ends at step 238.

Figure 3:
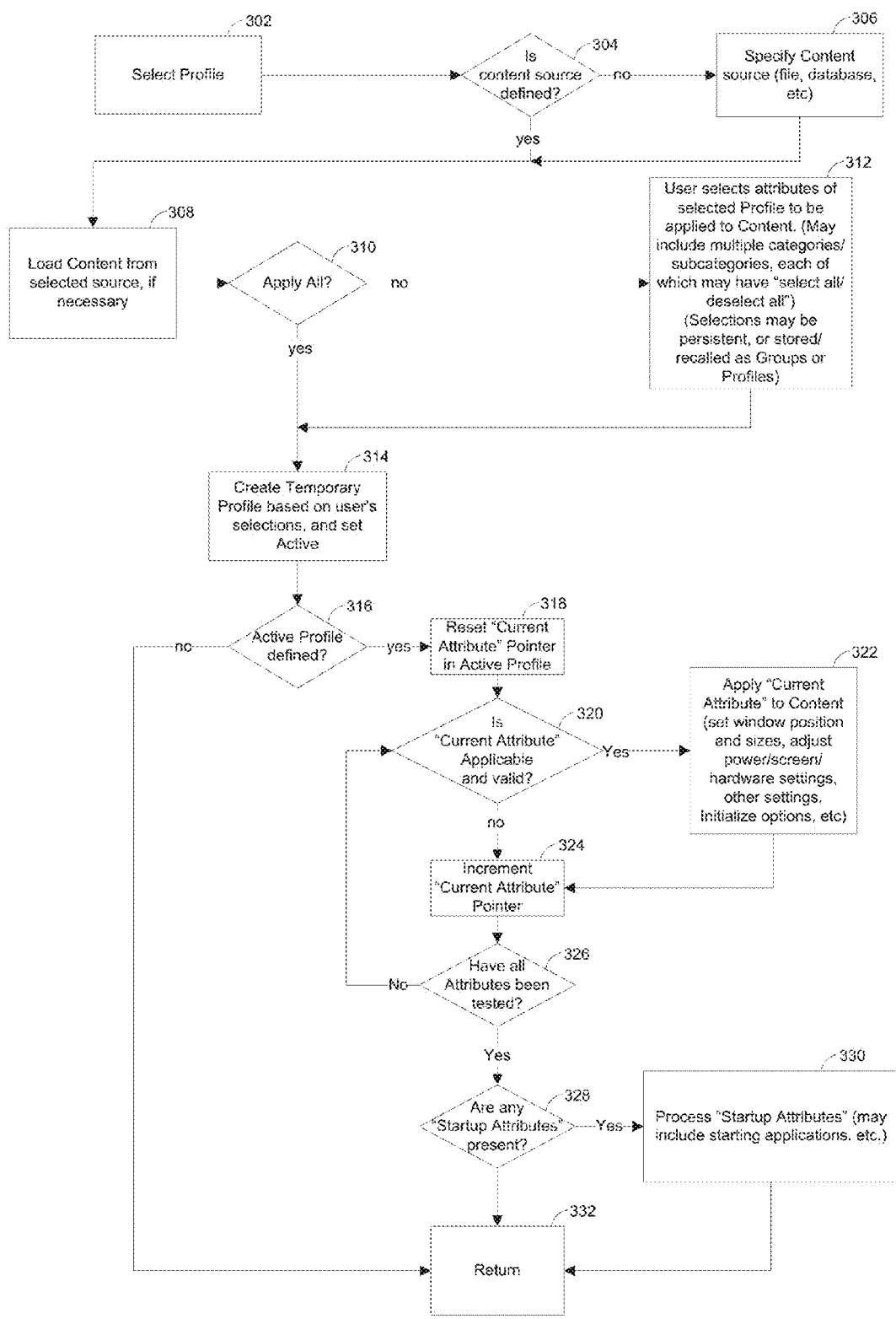
FIG. 3 is a flow diagram illustrating a process for recalling the profile by selecting the profile.

FIG. 3 is an embodiment of a process 300 for recalling a profile by selecting the profile. At step 302, the profile is selected. The process then proceeds to step 304 to determine if a content source has been defined. If the content source has been defined, the process proceeds to step 308. If the content source has not been defined, the process proceeds to step 306 to specify the content source such as a document or portion of a document, file, database, etc. At step 308, content is loaded from the selected source, if necessary. The process then proceeds to step 310 to determine if the entire profile should be applied to the content. If so, the process proceeds directly to step 314. If the entire profile is not to be applied to the content, the process proceeds to step 312 where the user selects attributes of the selected profile to be applied to the content. The user may use categories and subcategories each of which may have a "select all" and a "deselect all." The selections may be persistent and may be stored and recalled as groups or profiles. These groups and/or profiles can be defined by the user and/or specified by the system (i.e. company-wide definitions, etc.) to greatly simplify configuration options. For example, in the case of a Word document, if the user wants to define a set of profiles containing specific text formatting attributes such as font, size, line spacing, character adjustment setting, etc., the user may define a group containing the desired items and whether each item should be included or excluded, as well as (optionally) the setting of the item (attribute), effectively creating a profile that can be used to define other profiles. Then, when defining the new profile, rather than having to manually specify which attributes to include and/or exclude, the user can just specify the group created above, and all settings will be automatically adjusted as specified in the group. The user, when specifying the group, can optionally select, for example, "turn all in group ON" or "turn all in group OFF" instead of simply applying the settings stored in the group, thereby further increasing the flexibility of the selection operation. The process then proceeds to step 314 where the system creates a temporary profile using the selections of the user and sets the temporary profile active. The process then proceeds to step 316 where the system determines if an active profile has been defined. If an active profile has not been defined, or in other words, if the temporary profile was not successfully created, the process proceeds to step 332 and ends. If it is determined at step 316 that an active profile has been defined, the process proceeds to step 318 where the system resets the current attribute pointer in the active profile. The process then proceeds to step 320 to determine if the current attribute is applicable and valid. This verification enables profiles to be applied to various types of content that may not be identical to the content from which the original profile was generated, such as recalling a computer desktop profile on a computer different from the computer on which the profile was defined, i.e. the desired screen resolution may not be available, the desired applications may not be available for use, etc. The verification operation determines if the current attribute can be applied to the content, and if so, if the attribute data is valid for the content. If the current attribute is not applicable and valid, such as an attribute to start an application that is not installed on the destination computer, the process proceeds to step 324. If the current attribute is applicable and valid, the process proceeds to step 322 where the current attribute is applied to the content. For the example of a computer desktop, attributes can specify application and operating system options and settings, application window positions and sizes, power, screen and hardware settings, as well as other options and settings. The process then proceeds to step 324 to increment the current attribute pointer. At step 326, it is determined if all of the attributes have been processed. If not, the process loops back to step 320. If all of the attributes have been processed and either applied to the content or skipped, the process proceeds to step 328 to determine if any startup attributes are present. If no startup attributes are present, the process ends at step 332. If startup attributes are present, the process proceeds to step 330 where the system processes the startup attributes. The startup attributes may include starting applications with specific options, data files, window positions and sizes, etc., as well as other startup activities, operations, etc. The process then ends at step 332.

Figure 4:
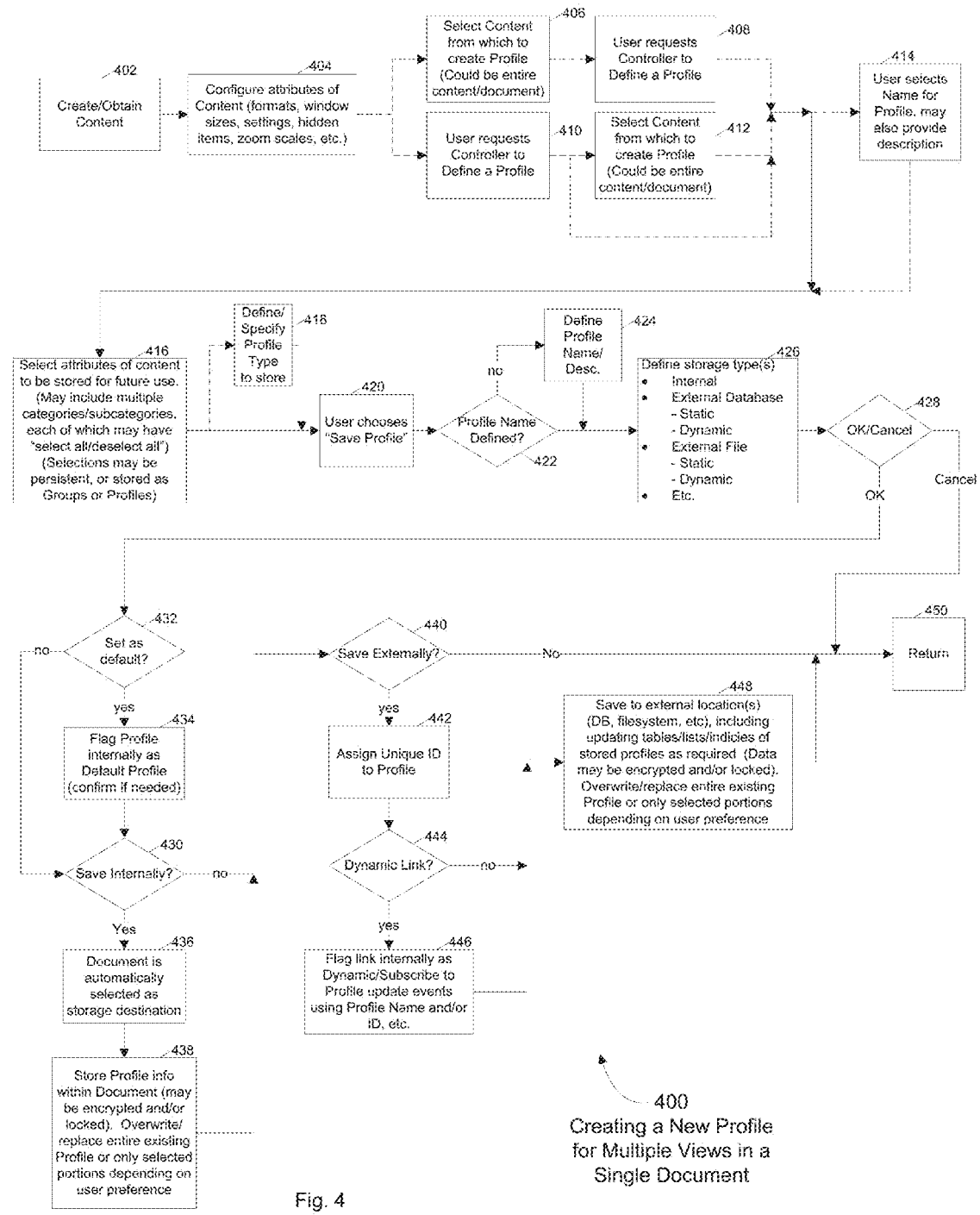
FIG. 4 is a flow diagram illustrating a process for creating a new profile for multiple views in a single document.

FIG. 4 illustrates an embodiment of the process 400 for creating a new profile for multiple views in a single document. Multiple views into a single document can be useful for a wide variety of applications, including the simple examples of looking at multiple sections of a Word document in multiple windows simultaneously, viewing multiple sections of an Excel workbook simultaneously, or viewing multiple regions (perhaps at different zoom levels) of a digital photograph simultaneously in a photo-editing program. The new profile can save the complete layout, including which document is open, the associated window sizes, positions, zoom scales, etc., along with other settings such as position(s) within the document, if desired. This will allow the user to re-create the desired environment very quickly and easily. At step 402, the content is either created or obtained. At step 404, the user configures the attributes of the content such as formatting, window size, settings, hidden items, zoom scales, etc. At this point, the process can either proceed to step 406 or step 410. If the process proceeds to step 406, the user selects content from which to create a profile. The content could be, for example, the entire content of the document and its associated windows or one or more selected portions of the document. The process then proceeds to step 408 where the user requests the controller to define a profile. Alternatively, rather than proceeding to step 406, the process can proceed to step 410 where the user requests the controller to define a profile. The process then proceeds to step 412 to select the content from which to create the profile. Again, this could be the entire content for the entire document and its associated windows or one or more selected portions of the document. If the user desires to create a generic profile without selecting specific content, the user may effectively skip step 412 by not selecting any content. The process then may optionally proceed to step 414 to select a name for the profile and, if desired, a description of the profile.

The process of FIG. 4 then proceeds to step 416 where the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. In the case of multiple views into a single document, the user might typically select items in categories dealing with window configuration and sizes, document positions (such as current page in a text document), zoom scales (perhaps on a per-window basis), etc., as well as any other desired attributes. The process may then optionally proceed to step 418 to define the profile type to store. Again, the profile types are defined by the user. For example, one or more profiles may have already been created and stored in the system. As described in FIG. 1B, a user or multiple users may have multiple profiles which can be classified into profile types. The creation of profile types and the use of these profile types are described above with respect to FIG. 1B. As illustrated in FIG. 1B, the user or multiple users may have multiple profiles such as first profile (P1) 152, second profile (P2) 153, and a third profile (P3) 154. The user may then wish to link the first type (T1) 157, which may be an audio profile with profiles (P1) 152 and (P2) 153, since both profiles (P1) 152 and (P2) 153 include audio categories. However, the user may associate or link the first profile type (T1) 157 with any particular profile, even though the profile may not include audio attributes. It is strictly up to the user how profile types will be linked to the particular profiles.

The process of FIG. 4 then proceeds to step 420 where the user is prompted to save the profile. At step 422, it is determined whether a profile name has been defined. If not, the user defines a profile name and (optional) description at step 424. If a profile name has been defined, the process proceeds directly to step 426. At step 426 of FIG. 4, the user defines the storage type or types for the profile. For example, the profile may be stored internally in the document file and may be retrieved when the document file is opened. Further, the profile may be stored in an external file that may be linked to the document file. Still further, the profile may be stored in an external database, as described above, with respect to FIG. 1A. The process then proceeds to step 428 where the user accepts storage of the profile or cancels that storage. If the user cancels storage, the process ends at step 450. If the user accepts the storage of the profile, as the user defines that storage in step 426, the process proceeds to step 432. At step 432, it is determined whether the profile should be set as the default profile. If the profile should not be set as the default profile, the process then proceeds directly to step 430. If the profile is to be set as the default profile, the process proceeds to step 434 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 430. At step 430, the system determines if the profile is to be internally stored. If the profile is not to be internally stored, the process proceeds to directly to step 440. If the profile is to be internally stored, the process proceeds to step 436, where the system automatically selects the document as the storage destination. In other words, the profile attributes are stored as part of the document file. The process then proceeds to step 438 where the system stores the profile information within the document. If the selected profile has previously been stored within the document, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage. The process then proceeds to step 440 to determine if the profile should be externally saved. If it is determined that the profile is not to be externally stored, the process proceeds to step 450 and ends. If it is determined that the profile is to be externally stored, the system assigns a unique ID to the profile at step 442. At step 444, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 448. If a dynamic link has been requested, the process proceeds to step 446 where the system internally flags the link as a dynamic link that is accessed using the profile name and/or identifier. At step 448, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 450.

Figure 5:
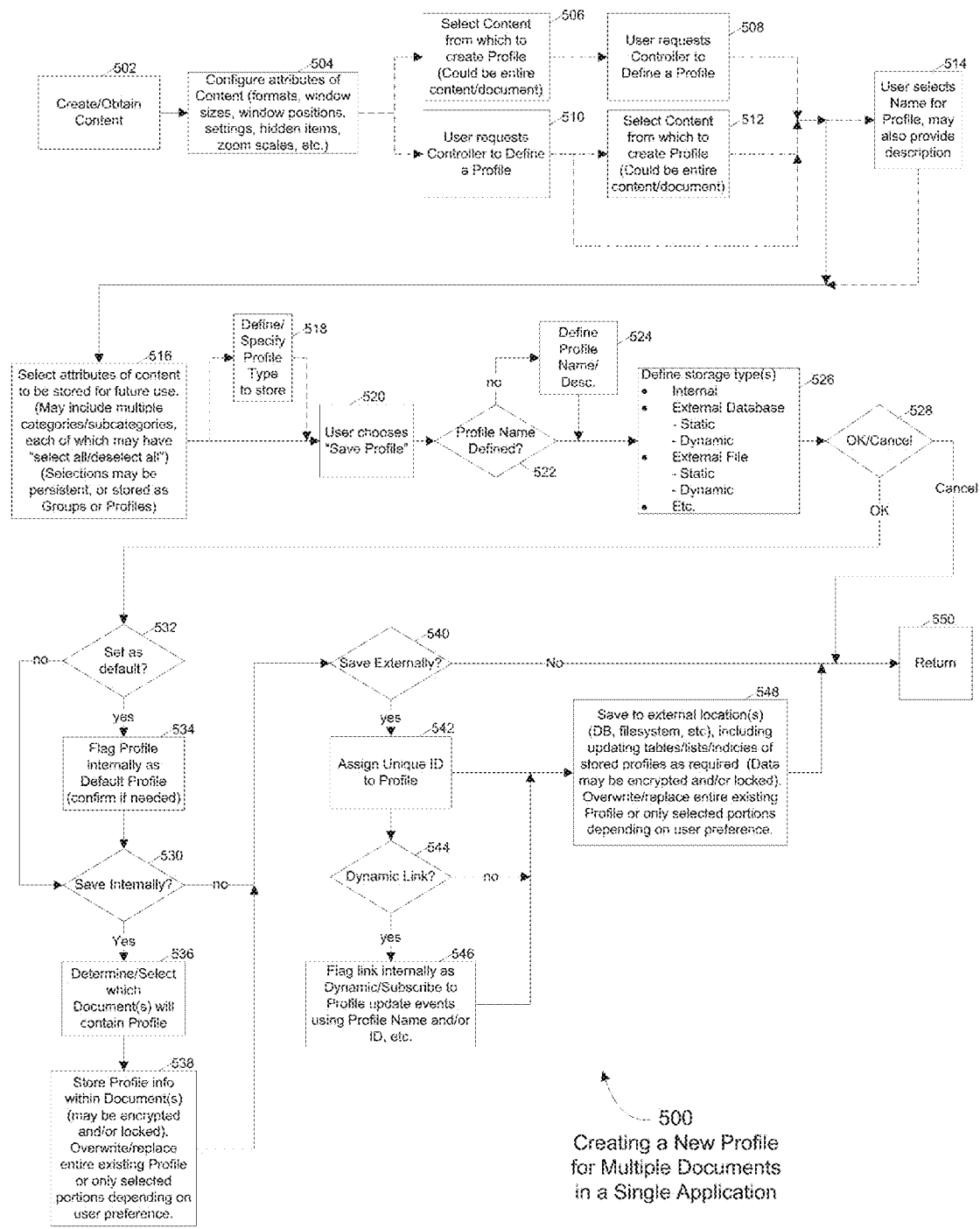
FIG. 5 is a flow diagram illustrating a process for creating a new profile for multiple documents in a single application.

FIG. 5 illustrates an embodiment of a process 500 for creating a new profile for multiple views into multiple documents in a single application. Multiple views into multiple documents in a single application can be useful for a wide variety of purposes, including the simple examples of editing, viewing and/or comparing multiple sections of multiple Word documents in multiple windows simultaneously, editing, viewing and/or comparing multiple sections of multiple Excel workbooks simultaneously, or editing, viewing and/or comparing multiple regions (perhaps at different zoom levels) of digital photographs simultaneously in a photo-editing program. The new profile can save the complete layout, including which documents are open, the associated window sizes, positions, zoom scales, etc., along with other settings such as position(s) within each document, if desired. This will allow the user to re-create the desired environment very quickly and easily. At step 502, the content is either created or obtained. At step 504, the user configures the attributes of the content such as formatting, window size, settings, hidden items, zoom scales, etc.

After step 504 of FIG. 5, the process can either proceed to step 506 or step 510. If the process proceeds to step 506, the user selects content from which to create a profile. The content could be the entire content of the documents and the associated windows or one or more selected portions or the documents. The process then proceeds to step 508 where the user requests the controller to define a profile. Alternatively, rather than proceeding to step 506, the process can proceed to step 510 where the user initially requests the controller to define a profile. The process then proceeds to step 512 to select the content from which to create the profile. Again, this could be the entire content for the entire document or a selected portion, such as one or more paragraphs of a document. If the user desires to create a generic profile without selecting specific content, the user may effectively skip step 512 by not selecting any content. The process then may optionally proceed to step 514 to select a name for the profile and, if desired, a description of the profile. The process then proceeds to step 516 where the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. In the case of multiple views into multiple documents in a single application, the user would typically select items in categories dealing with window configuration and sizes, document positions, zoom scales (perhaps on a per-window basis), etc., as well as any other desired attributes. The process may then optionally proceed to step 518 to define the profile type that the user desires to store. Again, the profile types are defined by the user. For example, one or more profiles may have already been created and stored in the system. As described in FIG. 1B, a user or multiple users may have multiple profiles which can be classified into profile types. The creation of profile types and the use of these profile types are described above with respect to FIG. 1B.

The process of FIG. 5 then proceeds to step 520 where the user is prompted to save the profile. At step 522, it is determined whether a profile name has been defined. If not, the user defines a profile name and (optional) description at step 524. If a profile name has been defined, the process proceeds directly to step 526. At step 526 of FIG. 5, the user defines the storage type or types for the profile. For example, the profile may be stored internally in one or more of the document files and may be retrieved when one of the document files containing the profile is opened. Further, the profile can be stored in an external file that may be linked to the document file. Still further, the profile may be stored in an external database, as described above, with respect to FIG. 1A. The process then proceeds to step 528 where the user accepts storage of the profile or cancels that storage. If the user cancels storage, the process ends at step 550. If the user accepts the storage of the profile, as the user defines that storage in step 526, the process proceeds to step 532. At step 532, it is determined whether the profile should be set as the default profile. If the profile should not be set as the default profile, the process then proceeds directly to step 530. If the profile is to be set as the default profile, the process proceeds to step 534 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 530. At step 530, the system determines if the profile is to be internally stored. If the profile is not to be internally stored, the process proceeds to directly to step 540. If the profile is to be internally stored, the process proceeds to step 536, where the destination document(s), or in other words, the documents which are to contain the profile information, are selected based on configuration options. In this case, the profile attributes are stored as part of the document file(s). The process then proceeds to step 538 where the system stores the profile information within the selected document(s). For each selected document, if the selected profile has previously been stored within the document, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage. The process then proceeds to step 540 to determine if the profile should be externally saved. If it is determined that the profile is not to be externally stored, the process proceeds to step 550 and ends. If it is determined that the profile is to be externally stored, the system assigns a unique ID to the profile at step 542.

The process of FIG. 5 then proceeds to step 544. At step 544, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 548. If a dynamic link has been requested, the process proceeds to step 546 where the system internally flags the link as a dynamic link that is accessed using the profile name and/or identifier. At step 548, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 550.

Figure 6:
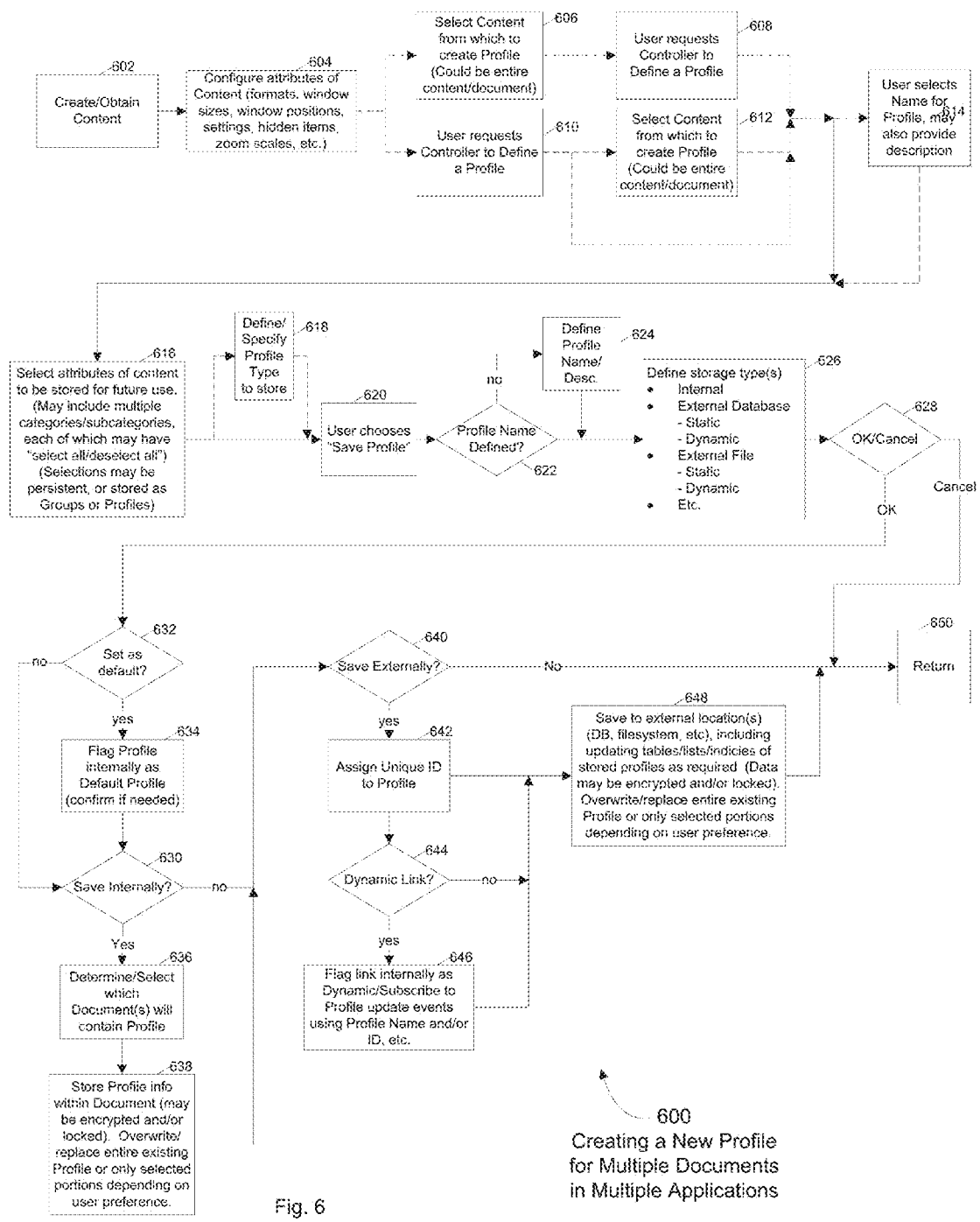
FIG. 6 is a flow diagram illustrating a process for creating a new profile for multiple documents in multiple applications.

FIG. 6 illustrates an embodiment of a process 600 for creating a new profile for multiple views into multiple documents in multiple applications. Multiple views into multiple documents in multiple applications can be useful for a wide variety of purposes, including the simple example of editing, viewing and/or comparing multiple sections of multiple types of documents simultaneously, such as editing or viewing multiple views of one or more Word documents, one or more Excel workbooks, one or more presentation documents, and one or more images. The new profile can save the complete layout, including which applications and documents are open, the associated window sizes, positions, zoom scales, etc., along with other settings related to each application, if desired. This will allow the user to re-create the desired environment very quickly and easily. At step 602, the content is either created or obtained. At step 604, the user configures the attributes of the content such as formatting, window sizes, settings, hidden items, zoom scales, etc. After step 604, the process can either proceed to step 606 or step 610. If the process proceeds to step 606, the user selects content from which to create a profile. The content could be the entire content of the documents or one or more selected portions of any of the documents. The process then proceeds to step 608 where the user requests the controller to define a profile. Alternatively, rather than proceeding to step 606, the process can proceed to step 610 where the user requests the controller to define a profile. The process then proceeds to step 612 to select the content from which to create the profile. Again, this could be the entire content for the entire document or a selected portion, such as one or more paragraphs of a document. If the user desires to create a generic profile without selecting specific content, the user may effectively skip step 612 by not selecting any content. The process then may optionally proceed to step 614 to select a name for the profile and, if desired, a description of the profile. The process then proceeds to step 616 where the user selects attributes of the content to be stored for future use.

These attributes may be provided in categories and subcategories, each of which may include an option to "select all" or "deselect all." The selection of attributes may be persistent, i.e., remembered between reboots/restarts, and may be stored and recalled as groups or profiles. In the case of multiple views into multiple documents in multiple applications, the user would typically select items in categories dealing with window configuration and sizes, document positions, zoom scales (perhaps on a per-window basis), etc., as well as any other desired attributes. The process may then optionally proceed to step 618 to define the profile type that the user desires to store. Again, the profile types are defined by the user. For example, one or more profiles may have already been created and stored in the system. As described in FIG. 1B, a user or multiple users may have multiple profiles which can be classified into profile types. The creation of profile types and the use of these profile types are described above with respect to FIG. 1B.

The process of FIG. 6 then proceeds to step 620 where the user is prompted to save the profile. At step 622, it is determined whether a profile name has been defined. If not, the user defines a profile name and (optional) description at step 624. If a profile name has been defined, the process proceeds directly to step 626. At step 626 of FIG. 6, the user defines the storage type or types for the profile. For example, the profile may be stored internally in one or more of the document files and may be retrieved when one of the document files containing the profile is opened. Further, the profile can be stored in an external file that may be linked to the document file. Still further, the profile may be stored in an external database, as described above, with respect to FIG. 1A. The process then proceeds to step 628 where the user accepts storage of the profile or cancels that storage. If the user cancels storage, the process ends at step 650. If the user accepts the storage of the profile, as the user defines that storage in step 626, the process proceeds to step 632. At step 632, it is determined whether the profile should be set as the default profile. If the profile should not be set as the default profile, the process then proceeds directly to step 630. If the profile is to be set as the default profile, the process proceeds to step 634 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 630. At step 630, the system determines if the profile is to be internally stored. If the profile is not to be internally stored, the process proceeds to directly to step 640. If the profile is to be internally stored, the process proceeds to step 636, where the destination document(s), or in other words, the documents which are to contain the profile information, are selected based on configuration options. In this case, the profile attributes are stored as part of the selected document file(s). The process then proceeds to step 638 where the system stores the profile information within the document(s). For each selected document, if the selected profile has previously been stored within the document, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage. The process then proceeds to step 640 to determine if the profile should be externally saved. If it is determined that the profile is not to be externally stored, the process proceeds to step 650 and ends. If it is determined that the profile is to be externally stored, the system assigns a unique ID to the profile at step 642.

The process of FIG. 6 then proceeds to step 644. At step 644, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 648. If a dynamic link has been requested, the process proceeds to step 646 where the system internally flags the link as a dynamic link that is accessed using the profile name and/or identifier. At step 648, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 650.

Figure 7:
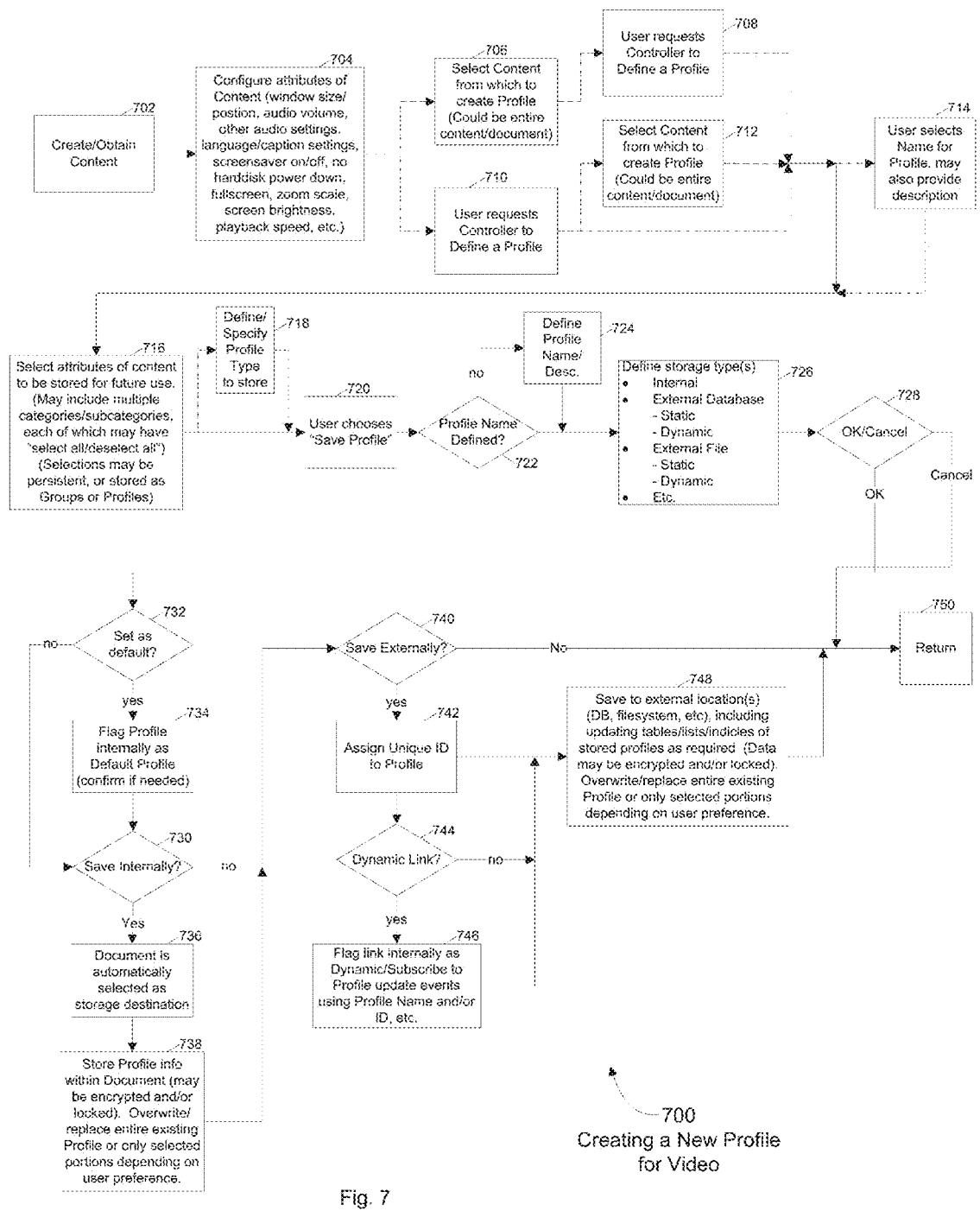
FIG. 7 is a flow diagram illustrating an embodiment of a process for creating a new profile for video media.

FIG. 7 illustrates an embodiment of a process 700 for creating a new profile for video playback. This type of profile can apply to video playback on a variety of devices, including handheld video players, computer screens, multimedia projection systems, theater projectors, etc. This type of profile can save the entire environment, including (if applicable) lighting, power settings, audio settings, zoom scale, window size and position, language and captioning settings, playlists, etc. This will allow the user to re-create the desired environment very quickly and easily. At step 702, the content is either created or obtained. At step 704, the user configures the attributes of the content such as power settings, audio settings, window size(s), zoom scales, etc. After step 704, the process can either proceed to step 706 or step 710. If the process proceeds to step 706, the user selects content from which to create a profile. The content could be the entire content of the documents or one or more selected portions of the document, such as one or more portions of a video file. The process then proceeds to step 708 where the user requests the controller to define a profile. Alternatively, rather than proceeding to step 706, the process can proceed to step 710 where the user requests the controller to define a profile. The process then proceeds to step 712 to select the content from which to create the profile. As before, this could be the entire content for the entire video file or one or more selected portions, such as portions of a video file. If the user desires to create a generic profile without selecting specific content, the user may effectively skip step 712 by not selecting any content. The process then may optionally proceed to step 714 to select a name for the profile and, if desired, a description of the profile. The process then proceeds to step 716 where the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. In the case of multiple views into a single document, the user would typically select items in categories dealing with window configuration and sizes, document positions, zoom scales (perhaps on a per-window basis), etc., as well as any other desired attributes. The process may then optionally proceed to step 718 to define the profile type to store. Again, the profile types are defined by the user. For example, one or more profiles may have already been created and stored in the system. As described in FIG. 1B, a user or multiple users may have multiple profiles which can be classified into profile types. The creation of profile types and the use of these profile types is described above with respect to FIG. 1B.

The process of FIG. 7 then proceeds to step 720 where the user is prompted to save the profile. At step 722, it is determined whether a profile name has been defined. If not, the user defines a profile name and (optional) description at step 724. If a profile name has been defined, the process proceeds directly to step 726. At step 726 of FIG. 7, the user defines the storage type or types for the profile. For example, the profile may be stored internally in the document file and may be retrieved when the document file is opened. Further, the profile may be stored in an external file that may be linked to the document file. Still further, the profile may be stored in an external database, as described above, with respect to FIG. 1A. The process then proceeds to step 728 where the user accepts storage of the profile or cancels that storage. If the user cancels storage, the process ends at step 750. If the user accepts the storage of the profile, as the user defines that storage in step 726, the process proceeds to step 732. At step 732, it is determined whether the profile should be set as the default profile. If the profile should not be set as the default profile, the process then proceeds directly to step 730. If the profile is to be set as the default profile, the process proceeds to step 734 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 730. At step 730, the system determines if the profile is to be internally stored. If the profile is not to be internally stored, the process proceeds to directly to step 740. If the profile is to be internally stored, the process proceeds to step 736, where the system automatically selects the document as the storage destination. In other words, the profile attributes are stored as part of the document file. The process then proceeds to step 738 where the system stores the profile information within the document. If the selected profile has previously been stored within the document, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage.

The process then proceeds to step 740 to determine if the profile should be externally stored. If it is determined that the profile is not to be externally stored, the process proceeds to step 750 and ends. If it is determined that the profile is to be externally stored, the system assigns a unique ID to the profile at step 742.

The process of FIG. 7 then proceeds to step 744. At step 744, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 748. If a dynamic link has been requested, the process proceeds to step 746 where the system internally flags the link as a dynamic link that is accessed using the profile name and/or identifier. At step 748, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 750.

Figure 8:
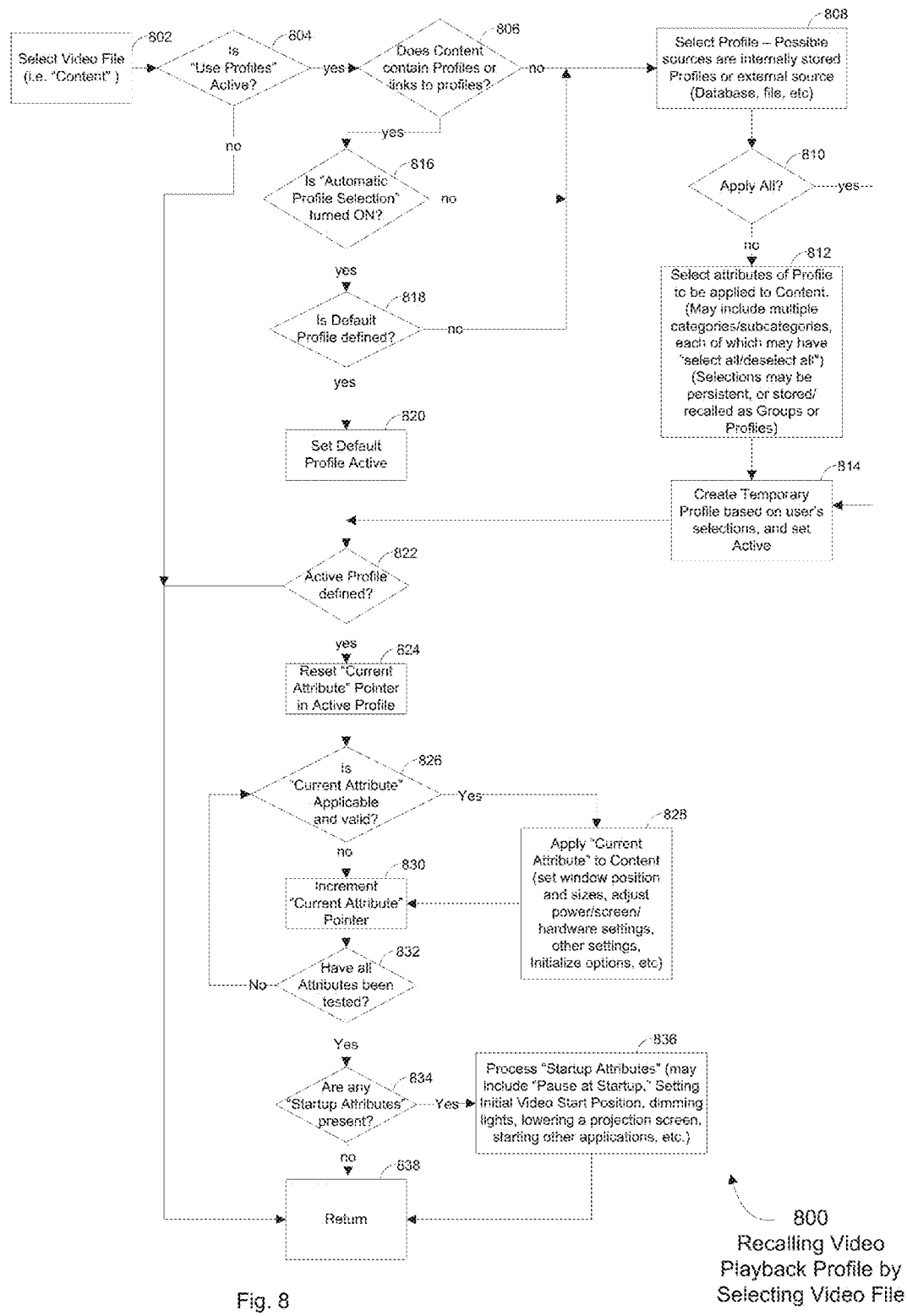
FIG. 8 is a flow diagram illustrating an embodiment of a process for recalling a video playback profile by selecting a video file.

FIG. 8 is an embodiment of a process 800 for recalling a video playback profile by selecting a file containing the video content. At step 802, the user selects the desired video file (the "content"). At step 804, the system determines if the content or controlling environment (such as the application containing the content) is configured to "use profiles." If the content is not programmed to use a profile at step 804, or if the user has chosen not to "use profiles," the process proceeds directly to step 838 to end the process. If the content is programmed with an instruction to "use profiles" and the controlling environment is configured to "use profiles," the process proceeds to step 806 to determine if the content contains profiles or links to profiles. If the content does not contain profiles or links to profiles, the process proceeds to step 808. If the content does contain profiles or links to profiles, the process proceeds to step 816 to determine if an automatic profile selection is activated. If the automatic profile selection is not activated, the process proceeds directly to step 808. If the automatic profile selection is activated, the process proceeds to step 818 to determine if a default profile has been defined. If a default profile has not been defined, the process proceeds to step 808. If a default profile, which may be a linked profile, has been defined, the process proceeds to step 820 to activate a default profile. The process then proceeds to step 822.

At step 808 of FIG. 8, a profile is selected by the user. This profile may come from a variety of sources, including internally stored profiles or externally stored profiles, such as those stored in databases, files and other sources. For this example of a video file, a likely source would be other video files (though other file types could certainly be used). The process then proceeds to step 810 where the user can decide whether to apply all of the profile or only a portion of the profile. If the entire profile is to be applied, the process proceeds directly to step 814. If only a portion of the profile or none of the profile is to be applied, the process proceeds to step 812. At step 812, the desired attributes of the profile are selected by the user. The attributes may be organized into multiple categories and subcategories. Categories are similar to groups as discussed above, but constitute a collection of related attributes. The multiple categories and subcategories allow the user to "select all" or "deselect all" for increased efficiency and flexibility when configuring a profile. The selections may be persistent, i.e., settings may be remembered between reboots/restarts, and may be stored and recalled as groups or profiles, as described above.

The process of FIG. 8 then proceeds to step 814 where the system creates a temporary profile based on user selections and sets the profile active. The process then proceeds to step 822 where the system determines if an active profile has been defined. If an active profile has not been defined, or in other words, if the temporary profile was not successfully created or if the default profile is not present or is corrupted, the process proceeds directly to step 838 and the process ends. If an active profile has been defined, the process proceeds to step 824 to reset the current attribute pointer in the active profile. In other words, a pointer is set in the profile to point to the current attribute in the profile. The process then proceeds to step 826 to determine if the current attribute is applicable and valid. This verification enables profiles to be applied to various types of content that may not be identical to the content from which the original profile was generated, such as, in the case of a video playback profile, having a video environment different from the environment in which the profile was defined, i.e., no surround sound system, no video projection screen to lower, etc. The verification operation determines if the current attribute can be applied to the content, and if so, if the attribute data is valid for the content. If the current attribute is applicable and valid, the process proceeds to step 828 to apply the current attribute to the content. For the example of a video playback profile, some of the settings that might be adjusted could include power settings, screen saver being turned off and brightness adjustment for desktop playback, lighting settings and screen position for the projection room, audio settings such as surround sound and volume, and other initializing options, perhaps such as sending a signal for all cell phones, pagers, etc. to automatically switch into "Silent" mode. The process then proceeds to step 830. If it is determined at step 826 that the current attribute is not applicable and valid, such as an attribute for projection screen position adjustment when the current environment does not include a projection screen, the process proceeds directly to step 830. At step 830, the current attribute pointer is incremented, meaning that the next attribute is accessed. The process then proceeds to step 832 to determine if all of the attributes have been accessed and applied to the content. If not, the process loops back to step 826. If all of the attributes have been processed and either applied or skipped, the process proceeds to step 834 to determine if any startup attributes are present. If startup attributes are present, the process proceeds to step 836 to process the startup attributes which may include setting window size(s) and zoom scale (s), setting the starting position of the video, pausing the video to wait for user input, starting additional applications, activating control functions (such as sending a signal for all cell phones, pagers, etc. to automatically switch into "Silent" mode, as above), etc. The process then ends at step 838. If it is determined at step 834 that there are no startup attributes present, the process ends at step 838.

Figure 9:
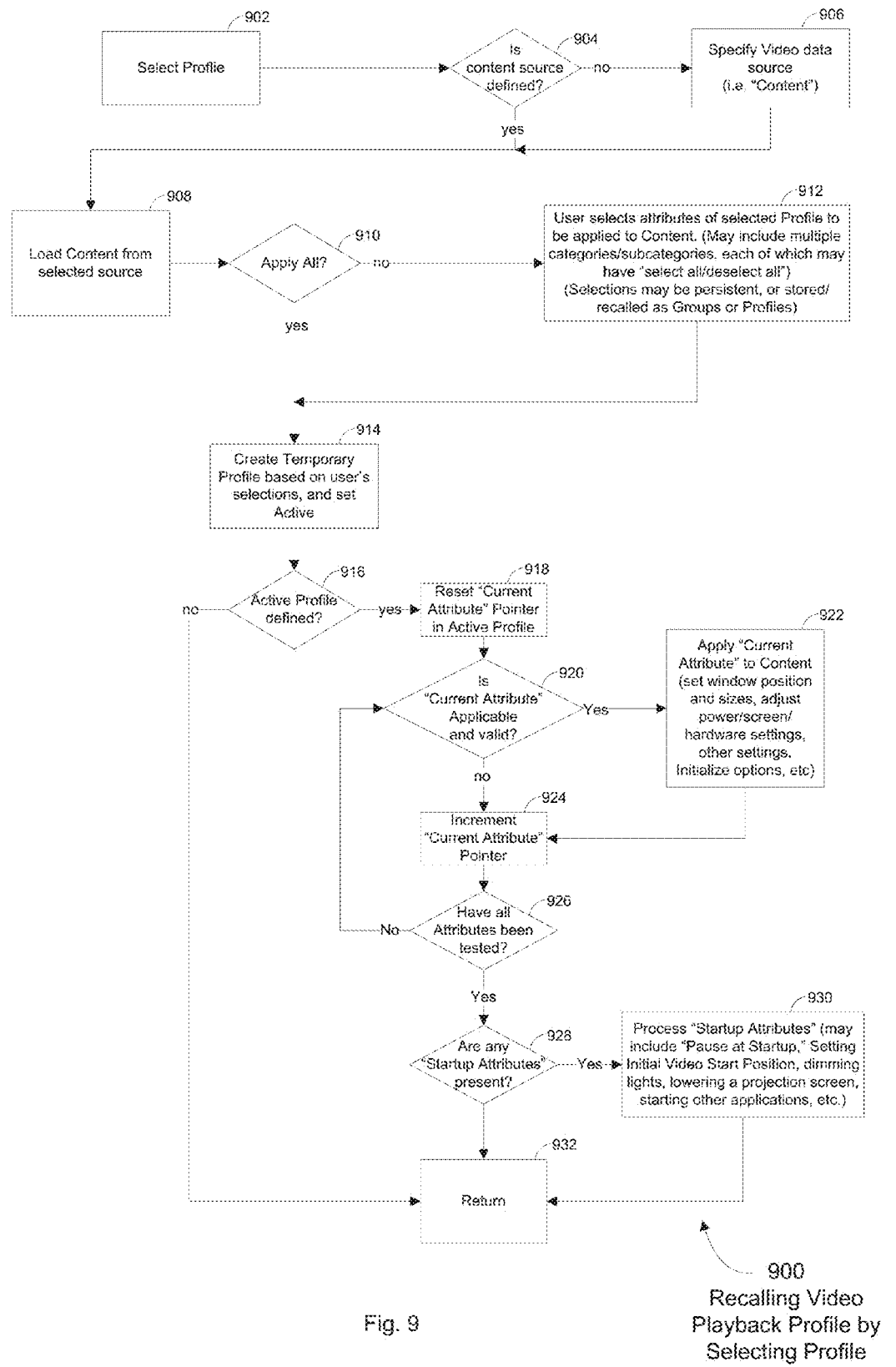
FIG. 9 is a flow diagram illustrating an embodiment of a process for recalling a video playback profile by selecting a profile.

FIG. 9 is an embodiment of a process 900 for recalling a video playback profile by selecting the profile. At step 902, the profile is selected. The process then proceeds to step 904 to determine if a video file (i.e. "content source") has been defined. If the content source has been defined, the process proceeds to step 908. If the content source has not been defined, the process proceeds to step 906 to specify the content source, such as a video file or portion of a video file (though other sources may be used). At step 908, content is loaded from the selected source, if necessary. The process then proceeds to step 910 to determine if the entire profile should be applied to the content. If so, the process proceeds directly to step 914. If the entire profile is not to be applied to the content, the process proceeds to step 912 where the user selects attributes of the selected profile to be applied to the content. The user may use categories and subcategories each of which may have a "select all" and a "deselect all" to increase efficiency and flexibility, and to simplify the selection process. The selections may be persistent and may be stored and recalled as groups or profiles as defined previously. The process then proceeds to step 914 where the system creates a temporary profile using the selections of the user and sets the temporary profile active. The process then proceeds to step 916 where the system determines if an active profile has been defined. If an active profile has not been defined, or in other words, if the temporary profile was not successfully created (such as if the profile data is corrupted), the process proceeds to step 932 and ends. If it is determined at step 916 that an active profile has been defined, the process proceeds to step 918 where the system resets the current attribute pointer in the active profile. The process then proceeds to step 920 to determine if the current attribute is applicable and valid. This verification enables profiles to be applied to various types of content that may not be identical to the content from which the original profile was generated, as described above. The verification operation determines if the current attribute can be applied to the content, and if so, if the attribute data is valid for the content. If the current attribute is not applicable and valid, such as an attribute to start an application that is not installed on the destination computer, the process proceeds to step 924. If the current attribute is applicable and valid, the process proceeds to step 922 where the current attribute is applied to the content. For the example of a video playback profile, some of the settings that might be adjusted could include power settings, screen saver being turned off and brightness adjustment for desktop playback, lighting settings and screen position for the projection room, audio settings such as surround sound and volume, and other initializing options, perhaps such as sending a signal for all cell phones, pagers, etc. to automatically switch into "Silent" mode. The process then proceeds to step 924. At step 924, the current attribute pointer is incremented, meaning that the next attribute is accessed. At step 926, it is determined if all of the attributes have been processed. If not, the process loops back to step 920. If all of the attributes have been processed and either applied to the content or skipped, the process proceeds to step 928 to determine if any startup attributes are present. If no startup attributes are present, the process ends at step 932. If startup attributes are present, the process proceeds to step 930 where the system processes the startup attributes. The startup attributes for a video playback profile may include setting window size(s) and zoom scale(s), setting the starting position of the video, pausing the video to wait for user input, starting additional applications, etc. The process then ends at step 932.

Figure 10:
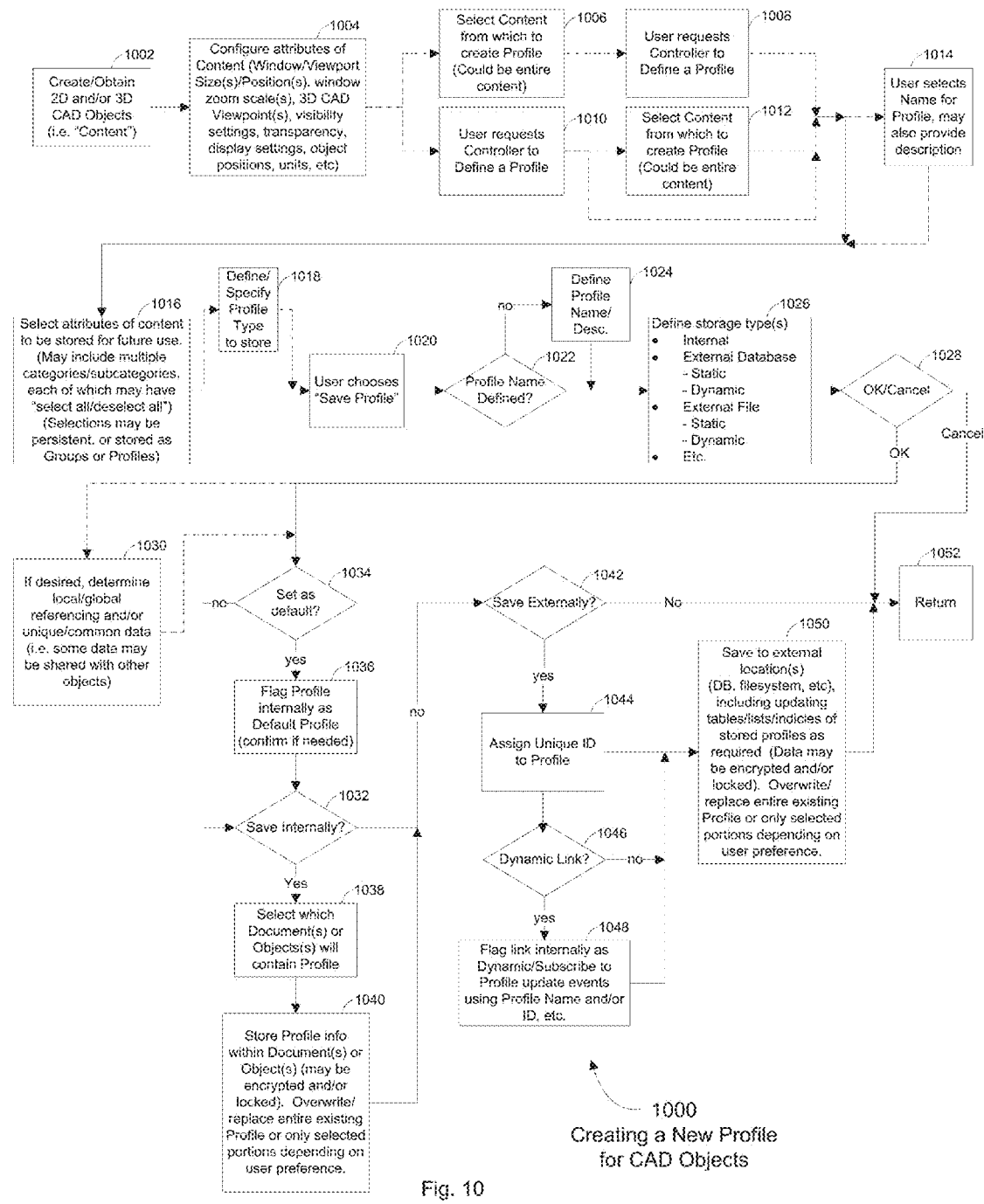
FIG. 10 is a flow diagram of an embodiment of a process for creating a new profile for an automobile.

FIG. 10 illustrates an embodiment of a process 1000 for creating a new profile for CAD objects. This type of profile can apply to a variety of CAD systems and objects (both 2-D and 3-D), as well as any non-CAD application that utilizes data as objects. One use of this type of profile is to store the window size(s) and position(s), view settings, zoom levels, lighting settings, transparency, wireframe settings, units, background color, screen saver/power settings, etc. An additional use is to store the positions of objects, both relative to each other and within the CAD window(s), as well as the viewpoint, i.e., what the user sees in the window, which takes into account the view angle, the view direction, the "up" direction (needed to determine correct view orientation), etc. This will allow the user to re-create the desired environment very quickly and easily. At step 1002, the content is either created or obtained. At step 1004, the user configures the attributes of the content such as window size(s), zoom scales, view settings, part positions, view positions, etc. After step 1004, the process can either proceed to step 1006 or step 1010. If the process proceeds to step 1006, the user selects content from which to create a profile. The content could be the entire content of the CAD application or one or more selected portions of the CAD data, such as one or more CAD objects. The process then proceeds to step 1008 where the user requests the controller to define a profile. Alternatively, rather than proceeding to step 1006, the process can proceed to step 1010 where the user requests the controller to define a profile. The process then proceeds to step 1012 to select the content from which to create the profile. As before, this could be the entire content of the CAD application or one or more selected portions, such as CAD objects. If the user desires to create a generic profile without selecting specific content, the user may effectively skip step 1012 by not selecting any content. The process then may optionally proceed to step 1014 to select a name for the profile and, if desired, a description of the profile. The process then proceeds to step 1016 where the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. In the case of a CAD application, the user might typically select items in categories dealing with window configuration and sizes, object positions, zoom scales (perhaps on a per-window basis), view positions and settings, etc., as well as any other desired attributes. The process may then optionally proceed to step 1018 to define the profile type to store. Again, the profile types are defined by the user. For example, one or more profiles may have already been created and stored in the system. As described in FIG. 1B, a user or multiple users may have multiple profiles which can be classified into profile types. The creation of profile types and the use of these profile types is described above with respect to FIG. 1B.

The process of FIG. 10 then proceeds to step 1020 where the user is prompted to save the profile. At step 1022, it is determined whether a profile name has been defined. If not, the user defines a profile name and (optional) description at step 1024. If a profile name has been defined, the process proceeds directly to step 1026. At step 1026 of FIG. 10, the user defines the storage type or types for the profile. For example, the profile may be stored internally in one or more of the document files and may be retrieved when one of the document files containing the profile is opened. Further, the profile can be stored in an external file that may be linked to the document file. Still further, the profile may be stored in an external database, as described above, with respect to FIG. 1A. The process then proceeds to step 1028 where the user accepts storage of the profile or cancels that storage. If the user cancels storage, the process ends at step 1052. If the user accepts the storage of the profile, as the user defines that storage in step 1026, the process may optionally proceed to step 1030 where the profile attributes may be transformed prior to storage. These transformations may include local and/or global referencing (such as modifying the attributes such as viewpoint position and zoom scale to be referenced in the coordinate system of each CAD object, if applicable, or adjusting attributes as needed if the CAD objects contain data that is shared with other objects). At the completion of step 1028 (or 1030, if desired), the process proceeds to step 1034. At step 1034, it is determined whether the profile should be set as the default profile. If the profile should not be set as the default profile, the process then proceeds directly to step 1032. If the profile is to be set as the default profile, the process proceeds to step 1036 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 1032. At step 1032, the system determines if the profile is to be internally stored. If the profile is not to be internally stored, the process proceeds directly to step 1042. If the profile is to be internally stored, the process proceeds to step 1038, where the system automatically selects the CAD object file(s) as the storage destination, or the user may specify which CAD object files should contain the profile information. In other words, the profile attributes are stored as part of the CAD document file(s). The process then proceeds to step 1040 where the system stores the profile information within the selected document(s). For each selected document, if the selected profile has previously been stored within the document, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage. The process then proceeds to step 1042 to determine if the profile should be externally saved. If it is determined that the profile is not to be externally stored, the process proceeds to step 1052 and ends. If it is determined that the profile is to be externally stored, the system assigns a unique ID to the profile at step 1044.

The process of FIG. 10 then proceeds to step 1046. At step 1046, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 1050. If a dynamic link has been requested, the process proceeds to step 1046 where the system internally flags the link as a dynamic link that is accessed using the profile name and/or identifier. At step 1050, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 1052.

Figure 11:
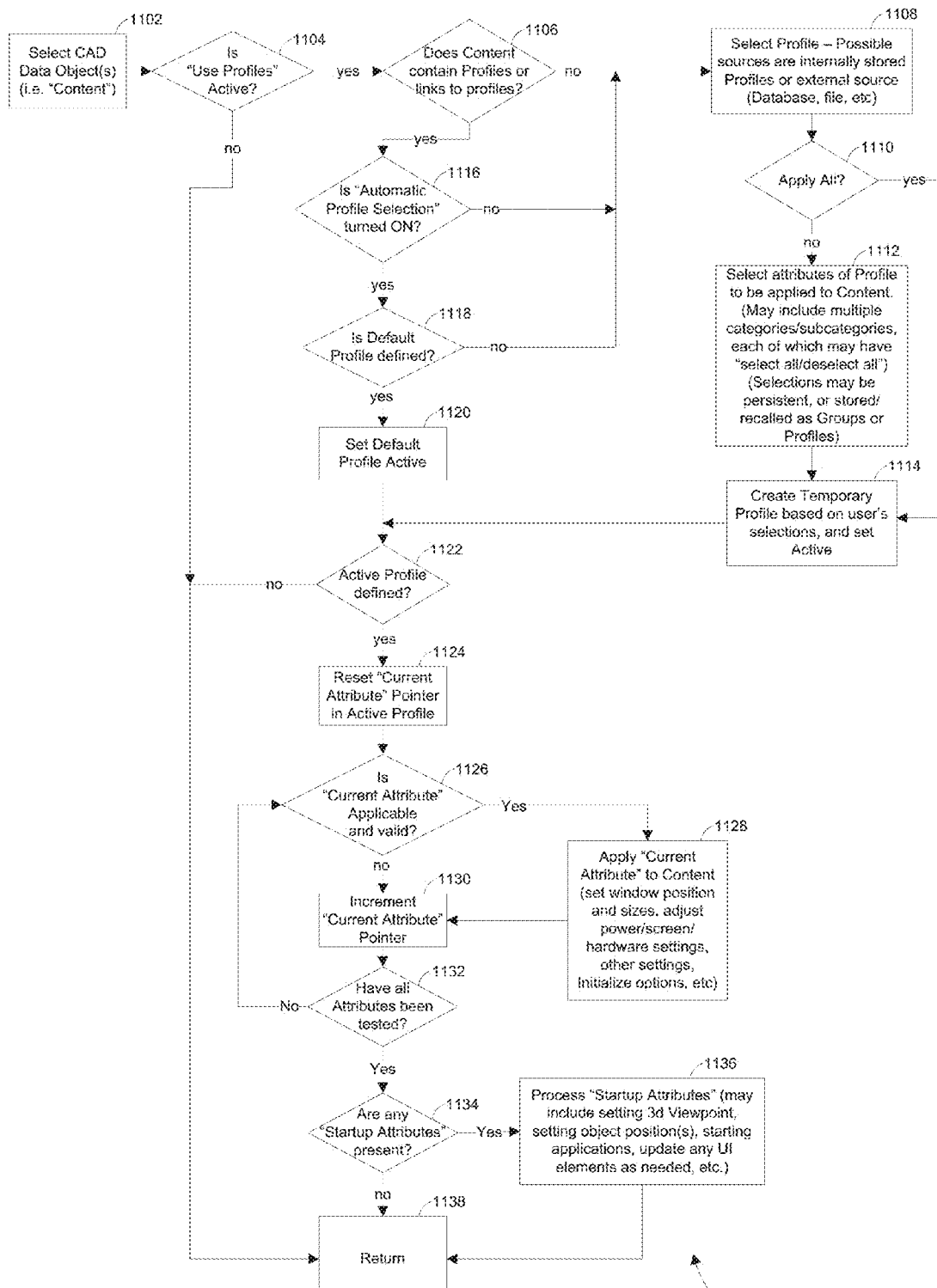
FIG. 11 is a flow diagram of an embodiment of a process for creating a new profile for 3-D CAD objects.

FIG. 11 is an embodiment of a process 1100 for recalling a profile for CAD objects by selecting the CAD content, which could be one or more CAD files, one or more CAD objects, etc. These objects could already be loaded in the system, or the process could be applied as the objects are loaded. At step 1102, the user selects the desired CAD data (the "content"). At step 1104, the system determines if the content or controlling environment (such as the application containing the content) is configured to "use profiles." If the content is not programmed to use a profile at step 1104, or if the user has chosen not to "use profiles," the process proceeds directly to step 1138 to end the process. If the content is programmed with an instruction to "use profiles" and the controlling environment is configured to "use profiles," the process proceeds to step 1106 to determine if the content contains profiles or links to profiles. If the content does not contain profiles or links to profiles, the process proceeds to step 1108. If the content does contain profiles or links to profiles, the process proceeds to step 1116 to determine if an automatic profile selection is activated. If the automatic profile selection is not activated, the process proceeds directly to step 1108. If the automatic profile selection is activated, the process proceeds to step 1118 to determine if a default profile has been defined. If a default profile has not been defined, the process proceeds to step 1108. If a default profile, which may be a linked profile, has been defined, the process proceeds to step 1120 to activate a default profile. The process then proceeds to step 1122.

At step 1108 of FIG. 11, a profile is selected by the user. This profile may come from a variety of sources, including internally stored profiles or externally stored profiles, such as those stored in databases, files and other CAD objects, as well as other sources. For this example of a CAD object, a likely source would be other CAD objects. The process then proceeds to step 1110 where the user can decide whether to apply all of the profile or only a portion of the profile. If the entire profile is to be applied, the process proceeds directly to step 1114. If only a portion of the profile or none of the profile is to be applied, the process proceeds to step 1112. At step 1112, the desired attributes of the profile are selected by the user. The attributes may be organized into multiple categories and subcategories. Categories are similar to groups as discussed above, but constitute a collection of related attributes. The multiple categories and subcategories allow the user to "select all" or "deselect all" for increased efficiency and flexibility when configuring a profile. The selections may be persistent, i.e., settings may be remembered between reboots/restarts, and may be stored and recalled as groups or profiles as described above.

The process of FIG. 11 then proceeds to step 1114 where the system creates a temporary profile based on user selections and sets the profile active. The process then proceeds to step 1122 where the system determines if an active profile has been defined. If an active profile has not been defined, or in other words, if the temporary profile was not successfully created or if the default profile is not present or is corrupted, the process proceeds directly to step 1138 and the process ends. If an active profile has been defined, the process proceeds to step 1124 to reset the current attribute pointer in the active profile. In other words, a pointer is set in the profile to point to the current attribute in the profile. The process then proceeds to step 1126 to determine if the current attribute is applicable and valid. This verification enables profiles to be applied to various types of content that may not be identical to the content from which the original profile was generated, such as, in the case of a CAD profile, having a visual environment different from the environment in which the profile was defined, i.e., a different screen resolution, different objects loaded, etc. The verification operation determines if the current attribute can be applied to the content, and if so, if the attribute data is valid for the content. If the current attribute is applicable and valid, the process proceeds to step 1128 to apply the current attribute to the content. For the example of a CAD profile, some of the settings that might be adjusted could include view position, lighting/shading, zoom scale, default drawing settings, etc. The process then proceeds to step 1130. If it is determined at step 1126 that the current attribute is not applicable and valid, the process proceeds directly to step 1130. At step 1130, the current attribute pointer is incremented, meaning that the next attribute is accessed. The process then proceeds to step 1132 to determine if all of the attributes have been accessed and applied to the content. If not, the process loops back to step 1126. If all of the attributes have been processed and either applied or skipped, the process proceeds to step 1134 to determine if any startup attributes are present. If startup attributes are present, the process proceeds to step 1136 to process the startup attributes which may include setting window size(s) and zoom scale(s), starting additional applications, etc. The process then ends at step 1138. If it is determined at step 1134 that there are no startup attributes present, the process ends at step 1138.

An example of how the process of FIG. 11 might be used is the generation of a parts list and/or bill of material, collectively referred to as parts list, for a collection of objects in a CAD system. In this rather common situation, the user may desire to have a list of objects currently being used (such as for manufacturing purposes). Further, the user may desire to have a picture of each object included in the list to know what each object looks like, particularly useful for people in manufacturing and/or purchasing roles.

Prior to generating the parts list, each the objects may have had a "preferred view" (i.e. which angle, view settings, etc should be used as a default when viewing said object) defined using a process such as the one shown in FIG. 10. The user may specify which objects should be included in the parts list, including selecting "All Objects." The parts list may then be generated, either by the CAD system itself or by an additional program or process, resulting in a list of objects, and perhaps additional information for each object such as object count, material, part number, etc. Before, during, or after the parts list generation, a picture, such as a screen shot or thumbnail may be generated for each object, with the picture using the preferred view for that object. If no valid preferred view is available for said object, such as if one was never stored, or the data has become corrupted, the preferred view of the parent object, if applicable, may be used, depending on system configuration and/or which options are set. Additionally, this option to use the preferred view of the parent object may be extended to include additional levels all the way up to the top-level object(s), if desired. In some instances, the user may specify how many levels to search, i.e., 2 levels would include the parent object and the grandparent object or the parent's parent. Further, if no preferred view is available for the object or its parents, the picture may be generated using a user-specified default view, the system default view, or no picture at all, depending on configuration options.

The pictures generated for each object may then be included in the parts list, such as in a document where each object is next to or references its associated picture, with the pictures embedded within the document. Further, if the type of parts list does not provide a means to embed the pictures, the pictures may be delivered either together with the parts list or separately, using any means desired, whether electronic or otherwise.

Figure 12:
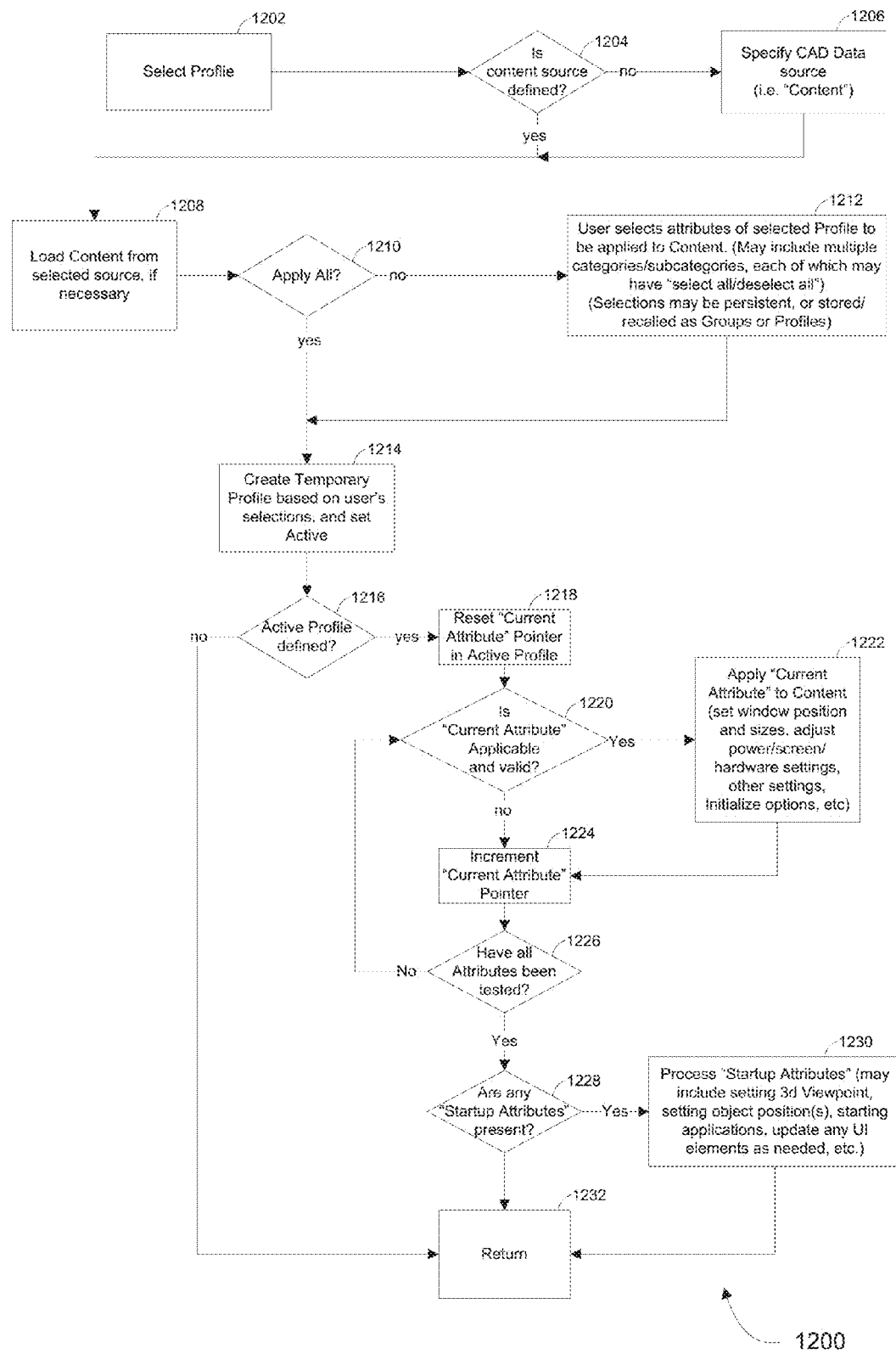
FIG. 12 is a flow diagram of an embodiment of a process for calling a profile by selecting CAD content.

FIG. 12 is an embodiment of a process 1200 for recalling a CAD profile by selecting the profile. At step 1202, the profile is selected. The process then proceeds to step 1204 to determine if a CAD object or objects (i.e. "content source") has been defined. If the content source has been defined, the process proceeds to step 1208. If the content source has not been defined, the process proceeds to step 1206 to specify the content source such as a CAD object or objects (which may or may not already be loaded). At step 1208, content is loaded from the selected source, if necessary. The process then proceeds to step 1210 to determine if the entire profile should be applied to the content. If so, the process proceeds directly to step 1214. If the entire profile is not to be applied to the content, the process proceeds to step 1212 where the user selects attributes of the selected profile to be applied to the content. The user may use categories and subcategories each of which may have a "select all" and a "deselect all" to increase efficiency and flexibility, and to simplify the selection process. The selections may be persistent and may be stored and recalled as groups or profiles as defined previously. The process then proceeds to step 1214 where the system creates a temporary profile using the selections of the user and sets the temporary profile active. The process then proceeds to step 1216 where the system determines if an active profile has been defined. If an active profile has not been defined, or in other words, if the temporary profile was not successfully created (such as if the profile data is corrupted), the process proceeds to step 1232 and ends. If it is determined at step 1216 that an active profile has been defined, the process proceeds to step 1218 where the system resets the current attribute pointer in the active profile. The process then proceeds to step 1220 to determine if the current attribute is applicable and valid. This verification enables profiles to be applied to various types of content that may not be identical to the content from which the original profile was generated, as described above. The verification operation determines if the current attribute can be applied to the content, and if so, if the attribute data is valid for the content. If the current attribute is not applicable and valid, such as an attribute to start an application that is not installed on the destination computer, the process proceeds to step 1224. If the current attribute is applicable and valid, the process proceeds to step 1222 where the current attribute is applied to the content. For the example of a CAD profile, some of the settings that might be adjusted could include view position, lighting/shading, zoom scale, default drawing settings, etc. The process then proceeds to step 1224. At step 1224, the current attribute pointer is incremented, meaning that the next attribute is accessed. At step 1226, it is determined if all of the attributes have been processed. If not, the process loops back to step 1220. If all of the attributes have been processed and either applied to the content or skipped, the process proceeds to step 1228 to determine if any startup attributes are present. If no startup attributes are present, the process ends at step 1232. If startup attributes are present, the process proceeds to step 1230 where the system processes the startup attributes. The startup attributes for a CAD profile could include setting window size(s) and zoom scale(s), starting additional applications, etc. The process then ends at step 1232.

Figure 13:
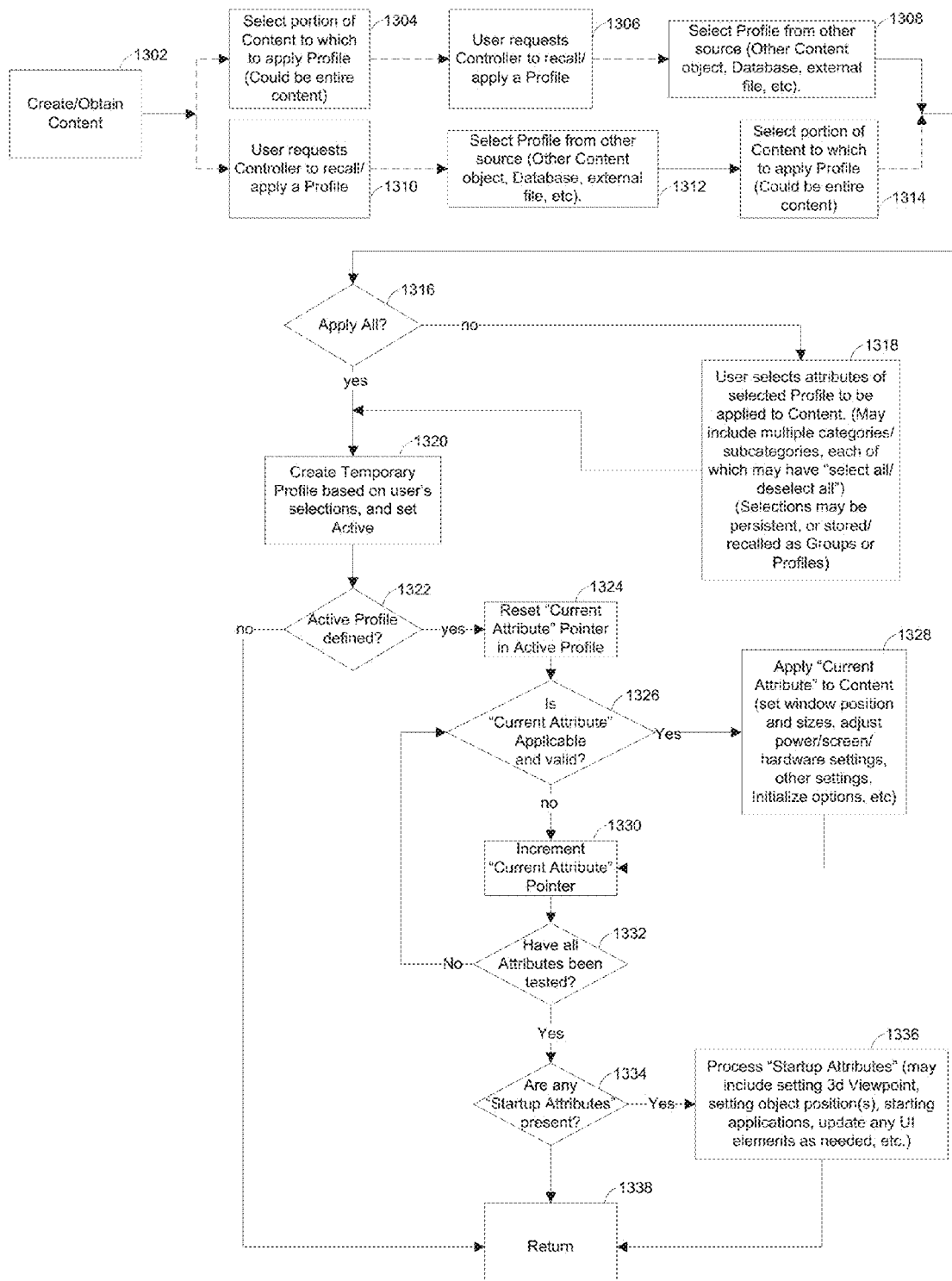
FIG. 13 is a flow diagram of an embodiment of a process for recalling a profile by selecting the profile.

FIG. 13 is an embodiment of a process 1300 for obtaining a profile from one source and applying it to data or content from a separate source. At step 1302, the user creates or obtains the content from the desired source (for example, the user might open a Word document). After step 1302 is complete, the process may proceed to either step 1304 or 1310. If the user proceeds to step 1304, the user may then select the desired portion of the content (which may include the entire content) to which the profile will be applied. The process then proceeds to step 1306 where the user requests the controller to recall or apply a profile. The process then proceeds to step 1308, where the user selects a profile from another source (such as another Word document or a profile stored in some other external location). The process then proceeds to step 1316. Alternatively, after step 1302, the user may proceed to step 1310. At step 1310, the user requests the controller to recall or apply a profile. The process then proceeds to step 1312 where the user selects a profile from another source (such as another Word document or a profile stored in an external location). The process then proceeds to step 1314 where the user specifies the portion of the content (possibly the entire content) to which the profile will be applied. The process then proceeds to step 1316.

At step 1316 of FIG. 13, the user chooses whether to apply all elements of the profile to the selected portion of the content. If the entire profile is to be applied, the process proceeds directly to step 1320. If only a portion or the profile (including none of the profile) is to be applied, the process proceeds to step 1318. At step 1318, the user specifies which attributes are to be applied to the content. The attributes may be organized into multiple categories and subcategories. Categories are similar to groups as discussed above, but constitute a collection of related attributes. The multiple categories and subcategories allow the user to "select all" or "deselect all" for increased efficiency and flexibility when configuring a profile. The selections may be persistent, i.e., settings may be remembered between reboots/restarts, and may be stored and recalled as groups or profiles as described above.

The process of FIG. 13 then proceeds to step 1320 where the system creates a temporary profile based on user selections and sets the profile active. The process then proceeds to step 1322 where the system determines if an active profile has been defined. If an active profile has not been defined, or in other words, if the temporary profile was not successfully created or is corrupted, the process proceeds directly to step 1338 and the process ends. If an active profile has been defined, the process proceeds to step 1324 to reset the current attribute pointer in the active profile. In other words, a pointer is set in the profile to point to the current attribute in the profile. The process then proceeds to step 1326 to determine if the current attribute is applicable and valid. This verification enables profiles to be applied to various types of content that may not be identical to the content from which the original profile was generated, such as recalling a Word document profile on a computer different from the computer on which the profile was defined, i.e., there may be different fonts installed, etc. The verification operation determines if the current attribute can be applied to the content, and if so, if the attribute data is valid for the content. If the current attribute is applicable and valid, the process proceeds to step 1328 to apply the current attribute to the content. The process then proceeds to step 1330. If it is determined at step 1326 that the current attribute is not applicable and valid, such as an attribute for a font that is not installed on the current computer, the process proceeds directly to step 1330. At step 1330, the current attribute pointer is incremented, meaning that the next attribute is accessed. The process then proceeds to step 1332 to determine if all of the attributes have been accessed and applied to the content. If not, the process loops back to step 1326. If all of the attributes have been processed and either applied or skipped, the process proceeds to step 1334 to determine if any startup attributes are present. If startup attributes are present, the process proceeds to step 1336 to process the startup attributes which may include starting additional applications, etc. The process then ends at step 1338. If it is determined at step 1334 that there are no startup attributes present, the process ends at step 1338.

Figure 14:
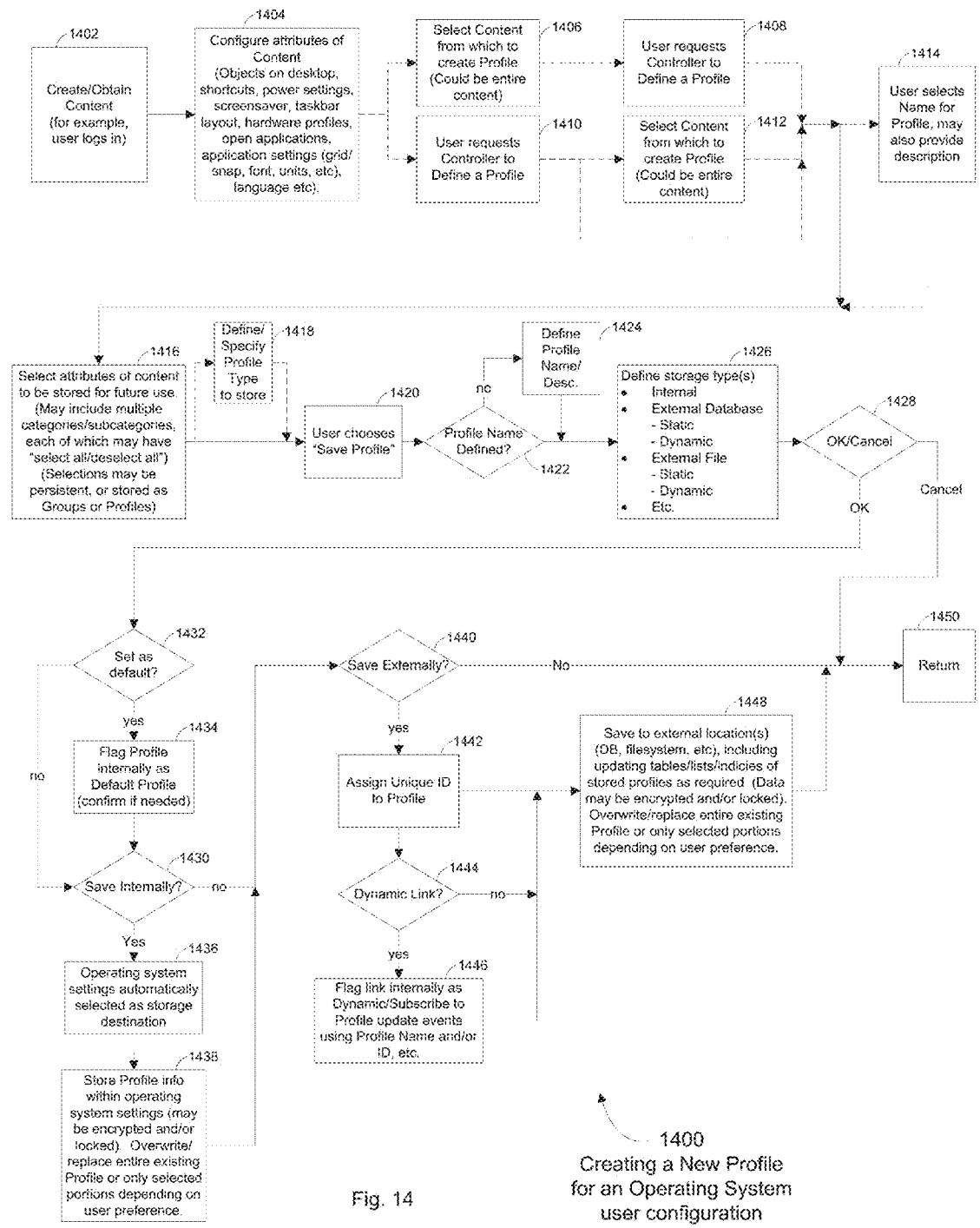
FIG. 14 is a flow diagram of an embodiment of a process for applying a profile from another source.

FIG. 14 illustrates an embodiment of a process 1400 for creating a new profile for an operating system user configuration. This type of profile can apply to any operating system and device combination, including computer desktops, portable computing and/or media devices, automobile controllers, building management systems, digital video recording devices, etc. This type of profile can store the entire environment, including (if applicable) security settings, screen resolution, brightness, power settings, screensaver settings, shortcuts, desktop layout, open applications, application settings for applications, etc. This will allow the user to re-create the desired environment very quickly and easily. At step 1402, the user creates and/or obtains the content environment (such as logging on to the system). At step 1404, the user configures the attributes of the operating system and environment as listed above. After step 1404, the process can either proceed to step 1406 or step 1410. If the process proceeds to step 1406, the user selects content from which to create a profile. The content could be the entire environment (open applications, power settings, etc.—virtually the entire configuration) or only selected portions (such as only screen and power settings). The process then proceeds to step 1408 where the user requests the controller to define a profile. Alternatively, rather than proceeding to step 1406, the process can proceed to step 1410 where the user requests the controller to define a profile. The process then proceeds to step 1412 to select the content from which to create the profile. As before, this could be the entire environment or only selected portions. If the user desires to create a generic profile without selecting specific content, the user may effectively skip step 1412 by not selecting any content. The process then may optionally proceed to step 1414 to select a name for the profile and, if desired, a description of the profile. The process then proceeds to step 1416 where the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. In the case of a desktop operating system configuration, the user would typically select items in categories dealing with power settings, security settings, window configuration and sizes, document positions, zoom scales (perhaps on a per-window basis), network settings, printer settings, etc., as well as any other desired attributes. The process may then optionally proceed to step 1418 to define the profile type to store. Again, the profile types are defined by the user. For example, one or more profiles may have already been created and stored in the system. As described in FIG. 1B, a user or multiple users may have multiple profiles which can be classified into profile types. The creation of profile types and the use of these profile types is described above with respect to FIG. 1B.

The process of FIG. 14 then proceeds to step 1420 where the user is prompted to save the profile. At step 1422, it is determined whether a profile name has been defined. If not, the user defines a profile name and (optional) description at step 1424. If a profile name has been defined, the process proceeds directly to step 1426. At step 1426 of FIG. 14, the user defines the storage type or types for the profile. For example, the profile may be stored internally in the operating system's settings and may be retrieved when the operating system loads or the user logs in. Further, the profile may be stored in an external file. Still further, the profile may be stored in an external database, as described above, with respect to FIG. 1A. The process then proceeds to step 1428 where the user accepts storage of the profile or cancels that storage. If the user cancels storage, the process ends at step 1450. If the user accepts the storage of the profile, as defined in step 1426, the process proceeds to step 1432. At step 1432, it is determined whether the profile should be set as the default profile. If the profile should not be set as the default profile, the process then proceeds directly to step 1430. If the profile is to be set as the default profile, the process proceeds to step 1434 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 1430. At step 1430, the system determines if the profile is to be internally stored. If the profile is not to be internally stored, the process proceeds to directly to step 1440. If the profile is to be internally stored, the process proceeds to step 1436, where the system automatically selects the operating system as the storage destination. In other words, the profile attributes are stored as part of the settings of the operating system. The process then proceeds to step 1438 where the system stores the profile information within the settings of the operating system. If the selected profile has previously been stored within the settings of the operating system, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage. The process then proceeds to step 1440 to determine if the profile should be externally stored. If it is determined that the profile is not to be externally stored, the process proceeds to step 1450 and ends. If it is determined that the profile is to be externally stored, the system assigns a unique ID to the profile at step 1442.

The process of FIG. 14 then proceeds to step 1444. At step 1444, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 1448. If a dynamic link has been requested, the process proceeds to step 1446 where the system internally flags the link as a dynamic link that is accessed using the profile name and/or identifier. At step 1448, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 1450.

Figure 15:
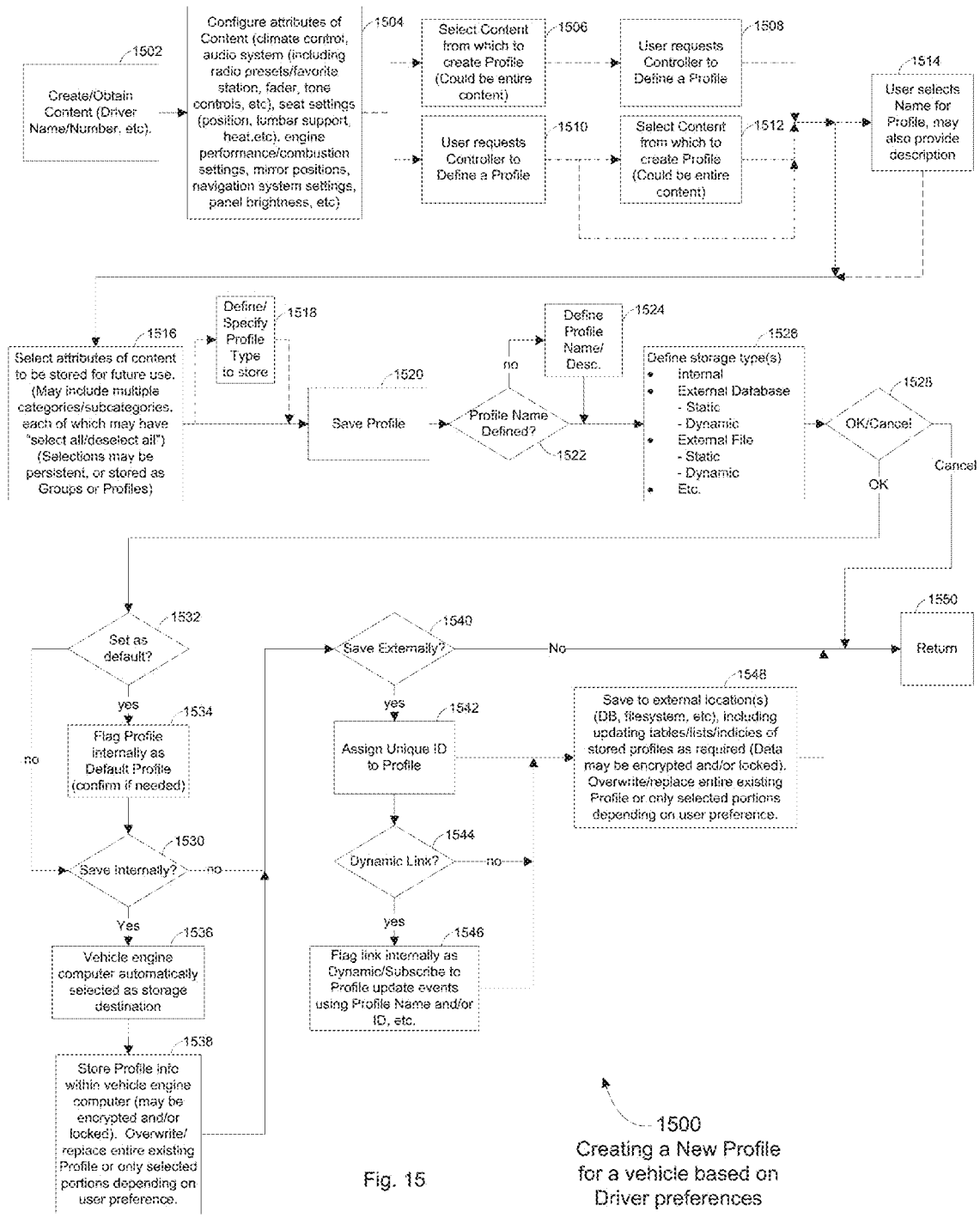
FIG. 15 is a flow diagram of an embodiment for creating a new profile from an operating system desktop configuration.

FIG. 15 illustrates an embodiment of a process 1500 for creating a new profile for a vehicle based on driver preferences. This type of profile can apply to any vehicle, including automobiles, trucks, buses, motorcycles, airplanes, etc. This type of profile can store the entire environment, including (if applicable) climate control, seat positions and settings, audio system settings and presets, engine performance settings, navigation system settings, mirror settings, etc. This will allow the user to re-create the desired environment very quickly and easily. At step 1502, the user creates and/or obtains the content environment (such as getting into the vehicle). At step 1504, the user configures the attributes of the content as listed above. After step 1504, the process can either proceed to step 1506 or step 1510. If the process proceeds to step 1506, the user selects content from which to create a profile. The content could be the entire environment or only selected portions (such as only audio system settings). The process then proceeds to step 1508 where the user requests the controller to define a profile. Alternatively, rather than proceeding to step 1506, the process can proceed to step 1510 where the user requests the controller to define a profile. The process then proceeds to step 1512 to select the content from which to create the profile. As before, this could be the entire environment or only selected portions. If the user desires to create a generic profile without selecting specific content, the user may effectively skip step 1512 by not selecting any content. The process then may optionally proceed to step 1514 to select a name for the profile and, if desired, a description of the profile. The process then proceeds to step 1516 where the user selects attributes of the content to be stored for future use. These attributes may be provided in categories and subcategories, each of which may include an option to "select all" or "deselect all." The selection of attributes may be persistent, i.e., remembered between reboots/restarts and/or different drivers/operators, and may be stored and recalled as groups or profiles. In the case of an automobile profile, the user would typically select items in categories dealing with audio settings, engine performance settings, seat and mirror positions, etc., as well as any other desired attributes. The process may then optionally proceed to step 1518 to define the profile type to store. Again, the profile types are defined by the user. For example, one or more profiles may have already been created and stored in the system. As described in FIG. 1B, a user or multiple users may have multiple profiles which can be classified into profile types. The creation of profile types and the use of these profile types are described above with respect to FIG. 1B.

The process of FIG. 15 then proceeds to step 1520 where the user is prompted to save the profile. At step 1422, it is determined whether a profile name has been defined. If not, the user defines a profile name and (optional) description at step 1524. If a profile name has been defined, the process proceeds directly to step 1526. At step 1526 of FIG. 15, the user defines the storage type or types for the profile. For example, the profile may be stored internally in the vehicle's internal engine computer settings and may be retrieved when the car is started or when the driver provides identification. Further, the profile may be stored in an external file, perhaps on a USB drive. Still further, the profile may be stored in an external database, as described above, with respect to FIG. 1A. This database may be located in a location geographically separate from the vehicle, and may be accessed via a wireless network, for instance. The process then proceeds to step 1528 where the user accepts storage of the profile or cancels that storage. If the user cancels storage, the process ends at step 1550. If the user accepts the storage of the profile, as the user defines that storage in step 1526, the process proceeds to step 1532. At step 1532, it is determined whether the profile should be set as the default profile. If the profile should not be set as the default profile, the process then proceeds directly to step 1530. If the profile is to be set as the default profile, the process proceeds to step 1534 to flag the profile as the default profile. This indicator of which profile is the default profile may be stored with the content. If a default profile is already defined, the user may (optionally, depending on configuration options) be prompted to confirm that the new profile should become the default profile, in which case the profile that was previously the default profile will no longer be the default profile. The process then proceeds to step 1530. At step 1530, the system determines if the profile is to be internally stored. If the profile is not to be internally stored, the process proceeds to directly to step 1540. If the profile is to be internally stored, the process proceeds to step 1536, where the system automatically selects the vehicle engine computer as the storage destination. In other words, the profile attributes are stored as part of the vehicle's settings. The process then proceeds to step 1538 where the system stores the profile information within the vehicle engine computer. If the selected profile has previously been stored within the vehicle engine computer, the user may be prompted to confirm that the profile information should be changed or updated, as well as to specify whether the profile should be completely overwritten or if only the attributes selected for storage should be updated (allowing the user to easily update a small number of settings without having to redefine the entire profile). The profile information may be encrypted and/or locked (such as with a password) to prevent unauthorized or unintentional changes and/or usage. The process then proceeds to step 1540 to determine if the profile should be externally stored.

If it is determined that the profile is not to be externally stored, the process proceeds to step 1550 and ends. If it is determined that the profile is to be externally stored, the system assigns a unique ID to the profile at step 1542.

The process of FIG. 15 then proceeds to step 1544. At step 1544, the system determines if a dynamic link has been requested. A dynamic link provides a "live" uni- or bi-directional link between the document and the stored profile, which means that if the stored profile changes (such as by another user), the user will be (optionally) notified of the change and (also optionally) prompted whether the changed profile should be applied to the content, or if the defining aspects of the profile change, the stored profile may be automatically updated (with or without prompting the user, depending on configuration options). Dynamic links are more fully described above. If a dynamic link has not been requested, the process proceeds to step 1548. If a dynamic link has been requested, the process proceeds to step 1546 where the system internally flags the link as a dynamic link that is accessed using the profile name and/or identifier. At step 1548, the profile is saved to an external location such as a database, file system, etc. If the selected profile has previously been stored in the external location, the user may be prompted to confirm that the profile information should be changed or updated, as well as to determine whether the profile should be completely overwritten or if only the attributes selected for storage should be updated (allowing the user to easily update a small number of settings without having to redefine the entire profile). Tables, lists and indices are updated from the stored profile as required. As with internal storage, the profile information may be encrypted and/or locked (such as with a password) to prevent unauthorized or unintentional modification and/or usage. The process then ends at step 1550.

Figure 16B:
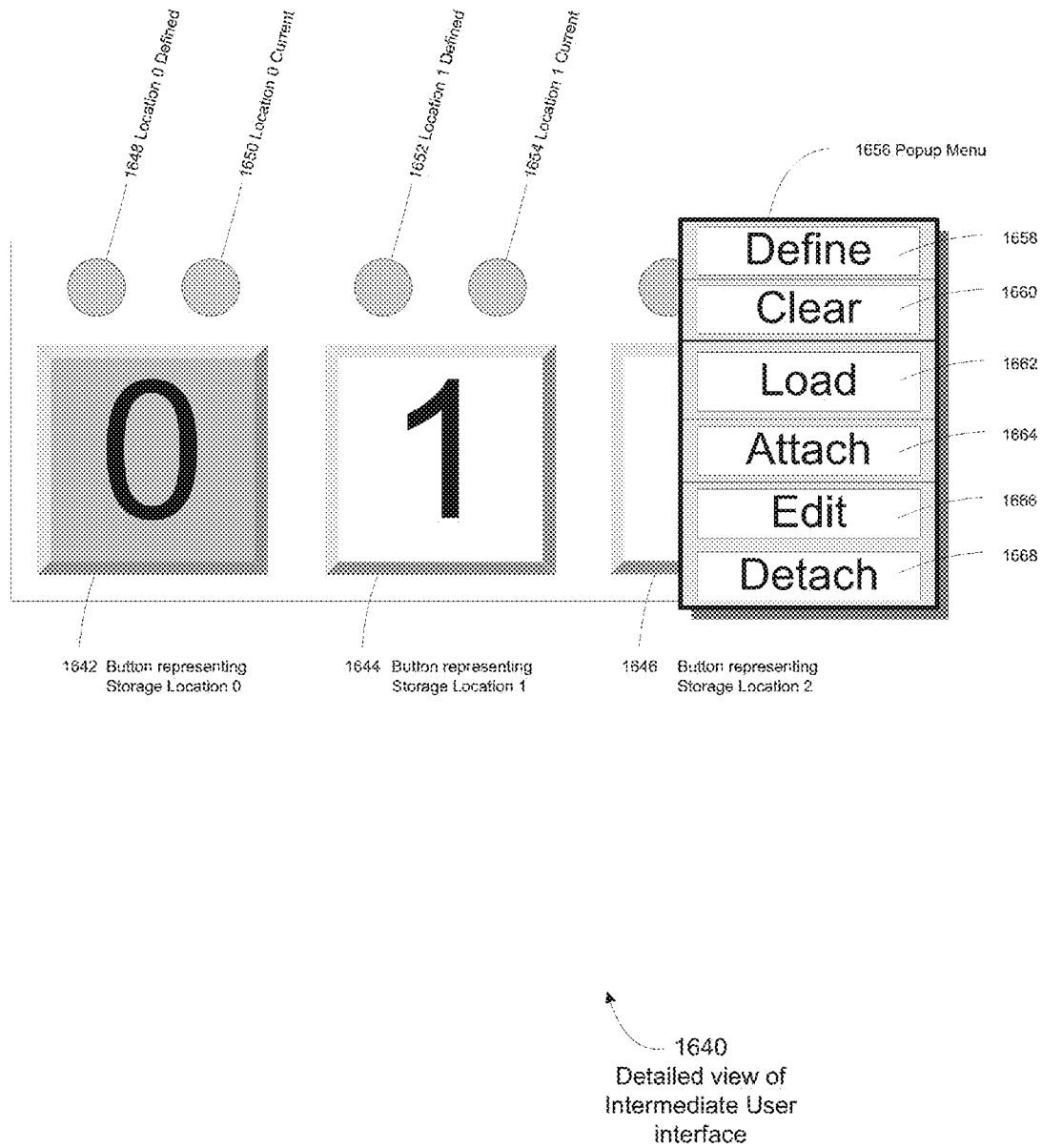
FIG. 16B is a detailed view of an intermediate user interface.

FIG. 16A illustrates an embodiment of a process 1600 for using an intermediate user interface (UI) to define and/or store multiple profiles. This type of interface could be used in many situations, including, for example, a CAD software package. In such an interface, the profile data may be temporarily maintained in memory (including volatile or non-volatile RAM, disk memory, etc.) or in another location prior to being stored in a more permanent location (such as with a data object or data file or in external storage as previously disclosed). A detailed view 1640 of such an intermediate UI is shown in FIG. 16B. The detailed view 1640 illustrates buttons 1642, 1644, and 1646 representing multiple storage locations, each with two indicators to identify if said storage location contains data and if said data is "current," i.e., if the stored data matches the current settings (whether user-specified or system-specified). These indicators are represented respectively by items 1648 and 1650 for storage location 0 and 1652 and 1654 for storage location 1. Of course, each pair of indicators could also be replaced by other indicators, including a single multi-color indicator, such as one that is grey or white when its associated storage location is empty, which changes to green when its associated storage location contains a profile, and which changes to red if the profile in its associated storage location matches the current settings. Clicking the buttons can automatically recall and apply (as previously disclosed) the profile data stored in the associated storage location. Button 1642, representing storage location 0, is a different color to indicate the "default profile" as described above, i.e., in this embodiment, any profile stored in position 0 will be assigned as a default profile when the profile data stored in the UI is attached to an object or otherwise stored. Further, if profile data is read from any profile data source, and the profile data contains a default profile, this default profile will be loaded into position 0. UI 1640 also contains a popup menu 1656 that can be displayed when the user clicks on a menu item or button (including right-clicking on one of the buttons, for example button 1646). Popup menu 1656 contains menu items (Define) 1658, (Clear) 1660, (Load) 1662, (Attach) 1664, (Edit) 1666, and (Detach) 1668, as well as any other menu items that may be appropriate, including items such as "Recall," etc. Such menu items (i.e. "Attach") may be used to initiate functions that will store the profile information in a more permanent manner (including storing multiple profiles simultaneously), as detailed above in the description of the various profile creation processes.

The process of FIG. 16A begins at step 1602, where the user configures the content. In the case of a CAD package, the user can adjust the lighting, shading, zoom scale, viewpoint, visible objects, etc. The indicators in the intermediate UI 1630 show that no profiles are stored in any of the 5 storage locations (numbered 0 through 4), and that none of the storage locations is current, which is the case with no stored profiles. The process then proceeds to step 1604, where the user requests the system to define a profile. This is accomplished via the sample UI by right-clicking on the button for storage location 0 and selecting "Define" from the popup menu. The process then proceeds to step 1606 where the system checks to see if any selection options have been defined previously, i.e., if a pre-defined set of attributes exists that will determine what will be contained in newly-defined profiles. If selection options have been defined the process proceeds to step 1610 where the system determines if the user has requested a manual override of the selection options. If the user has not requested a manual override, the process proceeds directly to step 1612. If at step 1606 it is determined that no selection options have been defined, or if at step 1610 the user has chosen to override the default selection options, the process proceeds to step 1608. At step 1608, the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. The process then proceeds to step 1612. At step 1612, if profile data already exists in the selected storage location, the user may be prompted whether to overwrite the existing data. The user may choose not to overwrite the existing data if it has not already been stored in a non-volatile location. If the user chooses to overwrite the existing data, or if no profile data is present in the selected storage location, the data is stored internally in the location from which the user initiated the "Define" operation (in this case, location 0). After step 1612, the indicators in intermediate UI 1632 show that location 0 has a profile defined and that said profile is current, and that locations 1 through 4 are still empty.

The process of FIG. 16A then proceeds to step 1614 where the user re-configures the content. As before, in the case of a CAD package, the user could adjust the lighting, shading, zoom scale, viewpoint, visible objects, etc. As the settings change, if the stored profile no longer matches the current settings, the "current" indicator in the intermediate UI 1634 turns off. The process then proceeds to step 1616, where the user again requests the system to define a profile. As before, this is done via a right-click on the button representing the desired storage location and selecting "Define" from the popup menu, though in this case the user selects location 2 as the desired storage location (leaving location 1 empty). The process then proceeds to step 1618 where the system checks to see if any selection options have been defined. If selection options have been defined the process proceeds to step 1622 where the system determines if the user has requested a manual override of the selection options. If the user has not requested a manual override, the process proceeds directly to step 1624. If at step 1618 it is determined that no selection options have been defined, or if at step 1622 the user has chosen to override the default selection options, the process proceeds to step 1620. At step 1620 the user selects attributes of the content to be stored for future use. These attributes may be provided in categories and subcategories, each of which may include an option to "select all" or "deselect all." The selection of attributes may be persistent, i.e., remembered between reboots/restarts, and may be stored and recalled as groups or profiles. The process then proceeds to step 1624. At step 1624, if profile data already exists in the selected storage location, the user may be prompted whether to overwrite the existing data. If the user chooses to overwrite the existing data, or if no profile data is present in the selected storage location, the data is stored internally in the location from which the user initiated the "Define" operation (location 2 in this case). After step 1624, the indicators in intermediate UI 1636 show that locations 0 and 2 each have a profile defined and that the profile stored in location 2 is current, and that locations 1, 3 and 4 are still empty. The process then proceeds to step 1626 and ends.

FIG. 17 illustrates an embodiment of a process 1700 for using an intermediate user interface (UI) to recall a profile. As detailed previously, this type of interface can be used in many situations, including, for example, a CAD software package. Using the interface, the profile data may be temporarily maintained in memory (including volatile or non-volatile RAM, disk memory, etc.) prior to being stored in a more permanent location, such as with a data object or data file or in external storage as previously disclosed. Further, the profile data may be either created by the user or loaded from a profile source including both internal and external data sources. An example of such an intermediate UI is shown in FIG. 16B and is detailed above.

As the process of FIG. 17 begins, the indicators in intermediate UI 1720 show that locations 1, 3, and 4 are empty, and that locations 0 and 2 each have a profile defined, with the profile in location 2 marked as current, meaning that the settings of the profile stored in location 2 match the current settings. At step 1702, the user requests the system to recall the profile stored in location 0. This may be done in multiple ways. Using the UI illustrated in FIG. 16B, this is accomplished by simply clicking on the button representing storage location 0. If the popup menu 1656 in FIG. 16B contains an option to "Recall" a profile, the user can also right-click on the button representing storage location 0 and select "Recall" from the popup menu. The process then proceeds to step 1704 where the system checks to see if any selection options have been defined. If selection options have been defined the process proceeds to step 1708 where the system determines if the user has requested a manual override of the selection options. If the user has not requested a manual override, the process proceeds directly to step 1710. If at step 1704 it is determined that no selection options have been defined, or if at step 1708 the user has chosen to override the default selection options, the process proceeds to step 1706. At step 1706 the user selects attributes of the content to be recalled. These attributes may be provided in categories and subcategories, each of which may include an option to "select all" or "deselect all." The selection of attributes may be persistent, i.e., remembered between reboots/restarts, and may be stored and recalled as groups or profiles. The process then proceeds to step 1710, where the system recalls the profile data from storage location 0 and applies it to the current settings based on the user's selection options. The indicators in intermediate UI 1722 will then indicate that storage locations 1, 3, and 4 are still empty, that storage locations 0 and 2 contain profile data, and that the profile stored in location 0 is current. It is important to note that when a profile is recalled, if the selection options result in the entire profile not being applied, the "current" indicator for the chosen location may not be activated since the stored settings may not match the current settings. The process then proceeds to step 1712 and ends.

Figure 18:
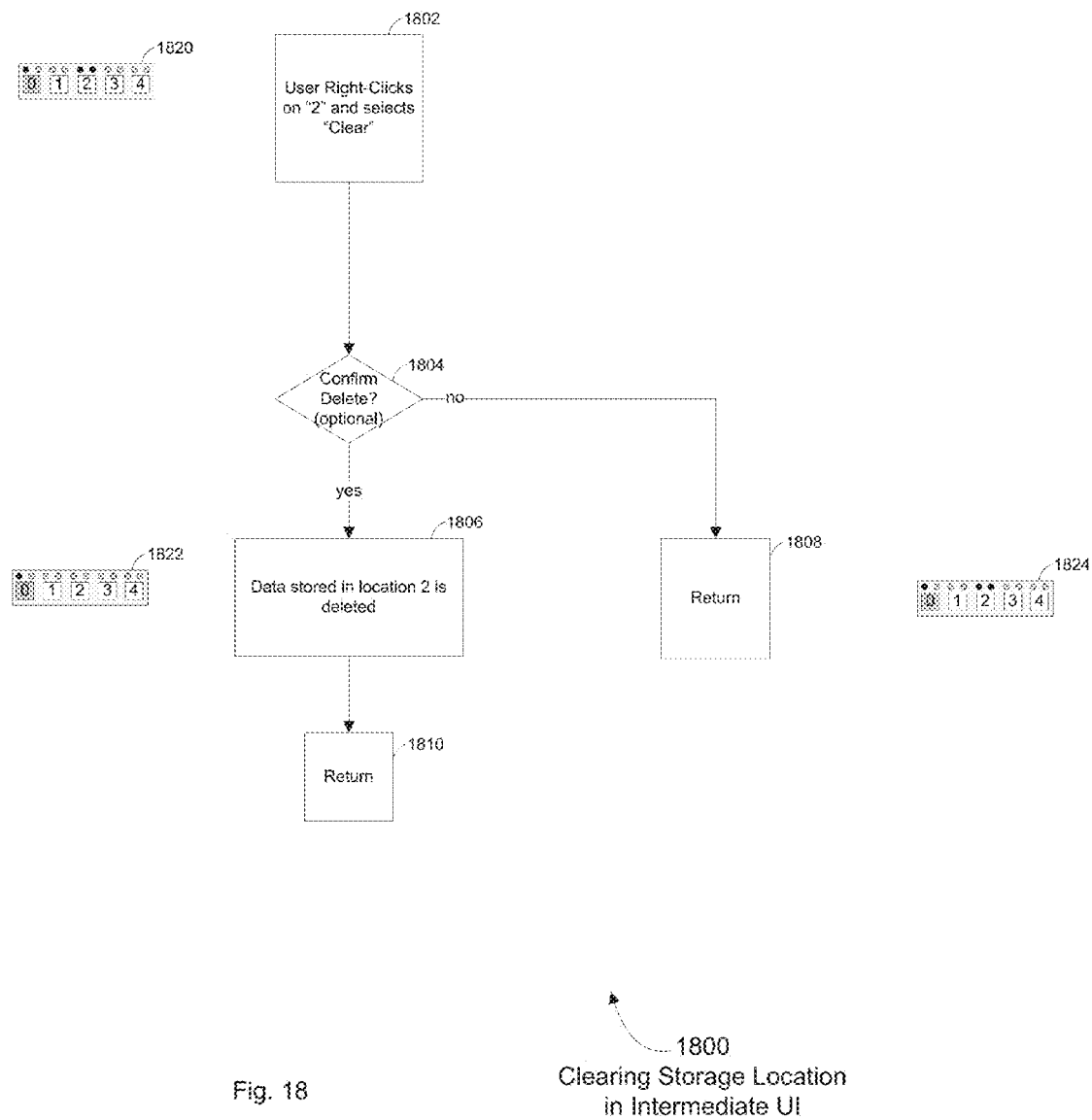
FIG. 18 is a flow diagram of an embodiment for clearing profiles using an intermediate user interface.

FIG. 18 illustrates an embodiment of a process 1800 for using the invention via an intermediate user interface (UI) to remove a stored profile from the intermediate UI. As detailed previously, this type of interface can be used in many situations, including, for example, a CAD software package. In such an interface, the profile data may be temporarily maintained in memory (including volatile or non-volatile RAM, disk memory, etc.) prior to being stored in a more permanent location, such as with a data object or data file or in external storage as previously disclosed. Further, the profile data may be either created by the user or loaded from a profile source including both internal and external data sources. An example of such an intermediate UI is shown in FIG. 16B and is detailed above.

As the process of FIG. 18 begins, the indicators in intermediate UI 1820 show that locations 1, 3, and 4 are empty, and that locations 0 and 2 each have a profile defined, with the profile in location 2 marked as current, meaning that the settings of the profile stored in location 2 match the current settings. At step 1802, the user requests the system to clear the profile stored in location 2. This may be done in multiple ways. Using the UI of FIG. 16B, this is accomplished by simply right-clicking on the button representing storage location 2 and selecting "Clear" from the popup menu. The process then proceeds to step 1804 where the system may optionally (based on configuration options) prompt the user to confirm deletion of the profile data. If the user confirms deletion of the profile, or if the system is configured not to confirm profile deletion, the process proceeds to step 1806, where the data stored in location 2 is deleted. At this point, the indicators in intermediate UI 1822 show that storage locations 1 through 4 are now empty, and that only location 0 contains profile data. The profile stored in location 0 is not current, however as no action was taken to recall/apply this profile. The process then proceeds to step 1810 and ends. If the user does not confirm deletion of the profile, the process proceeds to step 1808 where the process ends with no action taken. In this case, since no action was taken, the indicators in intermediate UI 1824 are unchanged from those in intermediate UI 1820 as described above.

Figure 19:
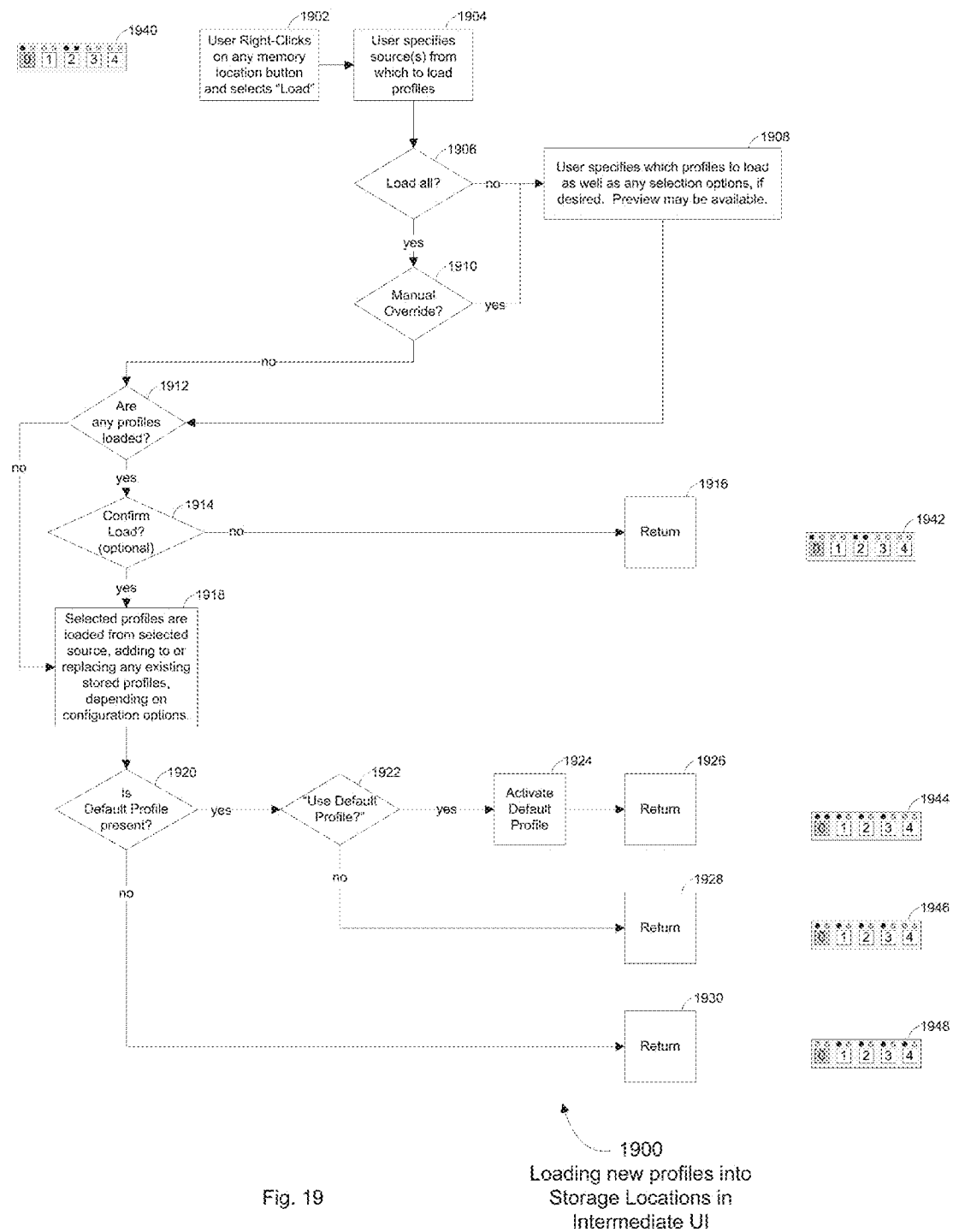
FIG. 19 is a flow diagram of an embodiment for loading profiles into an intermediate user interface.

FIG. 19 illustrates an embodiment of a process 1900 for loading one or more profiles into an intermediate user interface (UI) for profile management. As detailed previously, this type of interface could be used in many situations, including, for example, a CAD software package. In such an interface, the profile data may be temporarily maintained in memory (including volatile or non-volatile RAM, disk memory, etc.) prior to being stored in a more permanent location, such as with a data object or data file or in external storage as previously disclosed. Further, said profile data may be either created by the user or loaded from a profile source including both internal and external data sources. An example of such an intermediate UI is shown in FIG. 16B and is detailed above.

As the process of FIG. 19 begins, the indicators in intermediate UI 1940 show that locations 1, 3, and 4 are empty, and that locations 0 and 2 each have a profile defined, with the profile in location 2 marked as current, meaning that the settings of the profile stored in location 2 match the current settings. At step 1902, the user requests the system to load profiles from an internal or external source. This may be done in multiple ways. In the sample UI of FIG. 16B, this is accomplished by simply right-clicking on any of the buttons representing storage locations and clicking "Load" from the popup menu. The process then proceeds to step 1904 where the user specifies the source(s) from which to load the profile(s). The process then proceeds to step 1906 where the system checks to see if the user has chosen to load all data from all profiles. If the user has chosen to load all data from all profiles, the process proceeds directly to step 1910. If the user has chosen not to load all data from all profiles, the process proceeds to step 1908. At step 1910, the system determines if the user has requested a manual override of the load and selection options. If the user has not requested a manual override, the process proceeds directly to step 1912. If at step 1906 it is determined that the user does not wish to load all data from all profiles, or if at step 1910 the system determines that the user has chosen to override the default selection options, the process proceeds to step 1908. At step 1908 the user selects which profiles from the selected source(s) to load, as well as which of the stored profile attributes should be loaded. These attributes may be provided in categories and subcategories, each of which may include an option to "select all" or "deselect all." The selection of attributes may be persistent, i.e. remembered between reboots/restarts, and may be stored and recalled as groups or profiles. The process then proceeds to step 1912. At step 1912, the system determines if any of the storage locations are currently storing profile data. If so, the process proceeds to step 1914 where the user is optionally (based on configuration options) prompted to confirm that the new profile data should be loaded, and may also be prompted (again, based on configuration options) as to whether the new profile data should replace the existing profile data or be added to it. If the user does not confirm that the new profile data should be loaded, the process proceeds to step 1916 and ends, in which case the indicators in intermediate UI 1942 are unchanged from those in intermediate UI 1940, as described above. If the user confirms that the new data should be loaded, the process proceeds to step 1918 where the selected profile(s) are loaded from the selected source(s), either replacing the existing profile data or being added to the existing profile data, possibly as additional profiles. In this example, the user has chosen a profile source containing 4 profiles, and these profiles are loaded into storage locations 0 through 3, though the locations may vary depending on configuration options. For example, if none of the 4 profiles was marked as a default profile, the profile data might be loaded into storage locations 1 through 4, reserving location 0 for a default profile. The process then proceeds to step 1920 where the system checks to see if a default profile has been loaded, which in this example would be loaded into storage location 0. If a default profile is present, the process proceeds to step 1922 where the system checks to see if the system configuration is set to use the default profile. If the system is set up to use the default profile, the process proceeds to step 1924 where the default profile is recalled and applied as previously disclosed. The process then proceeds to step 1926 and the process ends. The indicators in intermediate UI 1944 will then indicate the status of the new profile information, which in this case shows that storage locations 0 through 3 contain profile data, and storage location 4 is empty, with the default profile (stored in location 0) currently active. If the system is not set up to use a default profile, the process proceeds to step 1928 and the process ends. The indicators in intermediate UI 1946 will then indicate the status of the new profile information, which in this case shows that storage locations 0 through 3 contain profile data, and storage location 4 is empty, with no profile currently active. If, at step 1920, a default profile is not present, such as if none of the loaded profiles was marked as a default profile, the process proceeds to step 1930 and the process ends. The indicators in intermediate UI 1948 will then indicate the status of the new profile information, which in this case shows that storage location 0 (the default profile) is empty, and storage locations 1 through 4 contain profile data, with no profile currently active.

Figure 20A:
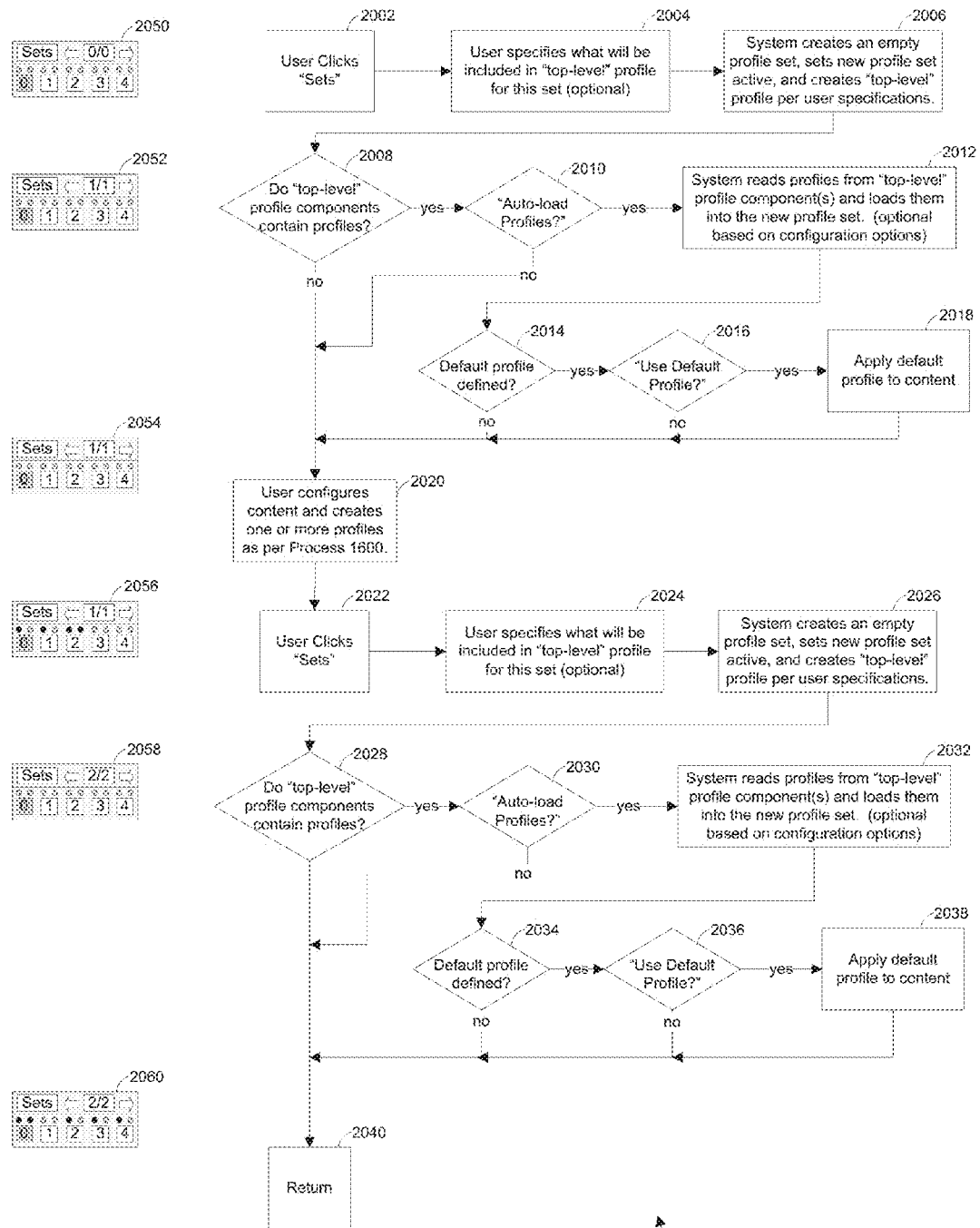
FIG. 20A is a flow diagram of an embodiment for working with multiple sets of profiles using an enhanced intermediate user interface.
Figure 20B:
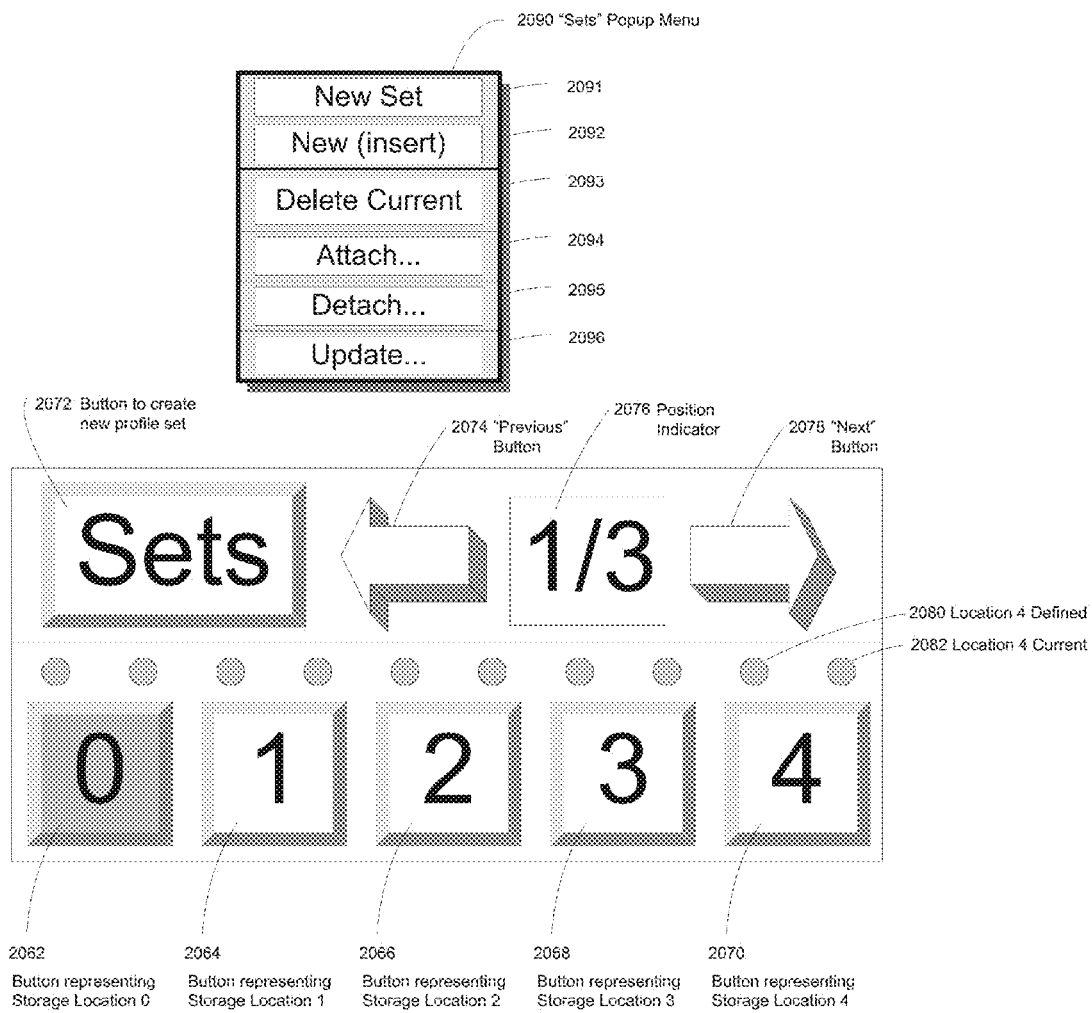
FIG. 20B is a detailed view of an enhanced intermediate user interface.

FIG. 20A illustrates an embodiment of a process 2000 for using an enhanced intermediate user interface (UI) to define and work with multiple sets of profiles. This type of interface could be used in many situations, including, for example, a CAD software package. In such an interface, the sets of profile data may be temporarily maintained in memory, including volatile or non-volatile RAM, disk memory, etc., prior to being stored in a more permanent location, such as with a data object or data file or in external storage as previously disclosed. An example of such an intermediate UI is shown in FIG. 20B. This UI is very similar to the UI detailed in FIG. 16B, with the addition of components to facilitate working with multiple sets of profile data. This sample UI comprises buttons representing multiple storage locations (represented by buttons 2062, 2064, 2066, 2068, and 2070), each with two indicators to identify if said storage location contains data and if said data is "current," i.e., if the stored data matches the current settings (whether user-specified or system-specified). These indicators are represented respectively by items 2080 and 2082 for storage location 4, with corresponding indicators for each of the other storage locations. Of course, each pair of indicators could also be replaced by other indicators, including a single multi-color indicator as previously described. Clicking any of the buttons representing the storage locations automatically recalls and applies the profile data stored in the associated storage location. Button 2062, representing storage location 0, is a different color to indicate the "default profile" as described above. This UI also may contain a popup menu similar in form and function to menu 1656 shown in FIG. 16B and discussed previously. Such a menu can be used to initiate functions to work with and modify profile information, including loading and storing multiple profiles simultaneously as disclosed previously.

The UI shown in FIG. 20B also contains buttons 2072, 2074, and 2078, as well as position indicator 2076. These UI elements allow use of multiple sets of profile data. In this embodiment, the sets of profile data may be accessed as a list, with each set of profile data as one element of the list. Further, each set of profile data may have its own "top-level" profile that may be associated with each of its data components as detailed below. Button 2072 may be used to create a new set of profile data (i.e. a new item in the list), and buttons 2074 "Previous" and 2078 "Next" may be used to move to the previous or next items in the list, respectively, functioning similarly to the "Back" and "Forward" buttons that are commonly found in web browsing applications. When no sets of profile data are defined, the "Back" and "Forward" buttons 2074 and 2078 may be disabled, just as the "Back" button 2074 may be disabled when the current set of profile data is at the beginning of the list, and the "Forward" button 2078 may be disabled when the current set of profile data is at the end of the list. Position indicator 2076 shows the current position of the "active" set of profile data in the list, and may also show the total number of sets of profile data in the list. Buttons 2074 and 2078 and position indicator 2076 each provides a method, via a popup or pulldown menu to facilitate direct access to sets of profile data located at any position in the list. Button 2072 automatically creates a new set of profile data when clicked, and may also have an associated menu such as item 2090, which can provide an interface to operations which may include: adding a new set of profile data, deleting a set of profile data, attaching or detaching one or more sets of profile data (such as for storage purposes) to one or more objects, updating the "top-level" profile, etc. When adding a new set of profile data, the user may specify whether to replace an existing set of profile data or to add the set of profile data to the list. If the new set of profile data is to be added to the list, the location in which it is added may be determined by configuration options, determined by the user's selections, etc.

As the process of FIG. 20A begins, the indicators in intermediate UI 2050 show that all storage locations 0 through 4 are empty, and the "0/0" in the position indicator shows that no sets of profile data have been defined. In an alternative embodiment, this "empty set" may be considered as the first set in the list, i.e., the position indicator may show "1/1" even with no profile sets defined (since the user may define profiles, which would be part of the current set). The process of FIG. 20A begins at step 2002, where the user requests the system to create a new set of profile data by clicking on the "Sets" button. The process then proceeds to step 2004, where the user may optionally specify what will be included in the top-level profile for the new set of profile data. In the case of a CAD package, the user might specify which objects are visible on the screen, etc. The process then proceeds to step 2006, where the system creates a new set of empty profile data, makes the newly created set active, and creates (if specified) the top-level profile for the newly created set of profile data. After step 2006, the position indicator shows "1/1" in intermediate UI 2052, meaning that the current set of profile data is in position 1 and that the total number of sets is 1. Also, intermediate UI 2052 shows that storage locations 0 through 4 are empty, i.e., no profiles have been defined for the current (in this case newly-defined) set of profile data. The process then proceeds to step 2008, where the system determines if the components of the top-level profile contain profiles or links to profiles. If these components do not contain profiles or links to profiles, the process proceeds directly to step 2020. If the components contain profiles or links to profiles, the process proceeds to step 2010. At step 2010, if the system is not configured to automatically load profiles, the process proceeds directly to step 2020, otherwise the process proceeds to step 2012. At step 2012, the system reads the profiles as specified by the top-level profile components, and loads them into the appropriate storage locations for the newly defined profile set. The process then proceeds to step 2014. At step 2014, if a default profile is not defined, the process proceeds directly to step 2020, otherwise the process proceeds to step 2016. At step 2016, if the system is not configured to use the default profile, the process proceeds directly to step 2020, otherwise the process proceeds to step 2018. At step 2018, the default profile (which would be stored in location 0 in this example) is applied to the content, and the process proceeds to step 2020. In this case, if no profiles were loaded from the top-level profile components, the intermediate UI 2054 remains unchanged from item 2052 since no changes were made to the set of profile data.

At step 2020, the user may re-configure the content and create one or more new profiles using a process similar to process 1600 as disclosed above. After these profile definitions are complete, intermediate UI 2056 shows that the current set of profile data is still the only one ("1/1"), that storage locations 3 and 4 are still empty, and that in the current profile set, profiles have been defined for storage locations 0, 1, and 2, and that the profile in location 2 is now current.

The process of FIG. 20A then proceeds to step 2022, where the user again requests the system to create a new set of profile data by clicking on the "Sets" button. The process then continues to step 2024, where the user may optionally specify what will be included in the top-level profile for the new set of profile data. As before, in the case of a CAD package, the user might specify which objects are visible on the screen (such as a different set of objects than was specified for the previous set), etc. The process then proceeds to step 2026, where the system creates a new set of empty profile data, makes the newly created set active, and creates (if specified) the top-level profile for the newly created set of profile data. After step 2026, intermediate UI 2058 shows that the current set of profile data is in position 2 out of a total of 2 sets, and that all of the storage locations for the current set of profile data are empty. The process then proceeds to step 2028, where the system determines if the components of the top-level profile contain profiles or links to profiles. If these components do not contain profiles or links to profiles, the process proceeds directly to step 2040 and ends. If the components contain profiles or links to profiles, the process proceeds to step 2030. At step 2030, if the system is not configured to automatically load profiles, the process proceeds directly to step 2040 and ends, otherwise the process proceeds to step 2032. At step 2032, the system reads the profiles as specified by the top-level profile components, and loads them into the appropriate storage locations for the newly defined profile set. The process then proceeds to step 2034. At step 2034, if a default profile is not defined, the process proceeds directly to step 2040 and ends, otherwise the process proceeds to step 2036. At step 2036, if the system is not configured to use the default profile, the process proceeds directly to step 2040, otherwise the process proceeds to step 2038. At step 2038, the default profile (which would be stored in location 0 in this example) is applied to the content, and the process proceeds to step 2040 and ends. In this example, if the user specifies top-level components that contain profiles, and these profiles are loaded from the top-level profile components into storage locations 0, 2, 3, and 4, and if the system is configured to use the default profile (stored in location 0), then the intermediate UI 2060 shows that the current set of profile data is the second of a total of 2 ("2/2"), that in the current profile set, storage location 1 is empty and profiles have been defined for storage locations 0, 2, 3, and 4, and that the default profile (stored in location 0) is now current. The process then proceeds to step 2040 and ends.

Figure 21:
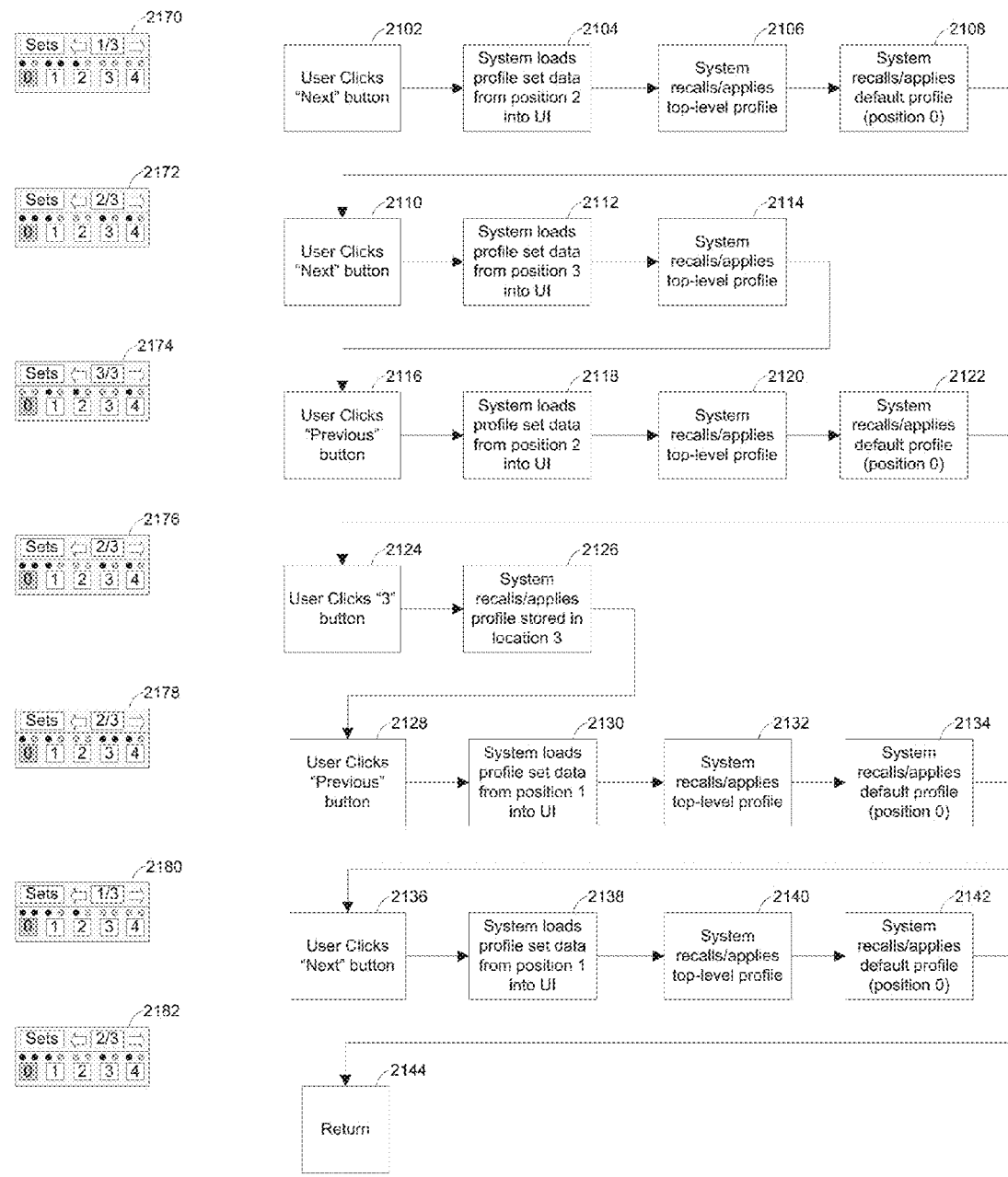
FIG. 21 is a flow diagram of an embodiment for recalling and applying multiple sets of data using an enhanced intermediate user interface.

FIG. 21 shows the embodiment of a process 2100 to use the invention via the intermediate user interface (UI) of FIG. 20B to recall profiles and sets of profiles such as those described in Process 2000 above. This example process is simplified by assuming that "use default profile" is turned on, i.e., if a default profile exists then it will be automatically recalled/applied when its corresponding set of profile data is activated. This simplification is intended to show how the multiple sets of profile data can be used in a working environment. This type of process could be used in many situations, including, for example, a CAD environment. In this example environment, Process 2100 assumes that 3 sets of profile data have been defined (as shown by the "3" in the position indicator "1/3") of intermediate UI 2170. Each set of profile data may also have its own top-level profile information, which in the case of a CAD environment might contain the list of objects displayed on the screen. For example, the top-level profile associated with the set of profile data in position 1 might contain a list "AA" of objects. Similarly, the top-level profiles associated with the sets of profile data in positions 2 and 3 might respectively contain lists of objects "BB" and "CC." In this simple example, the profiles which make up each set in the list may be configured to store only viewpoint data and zoom scale, i.e., applying a profile changes the angle and zoom scale at which the on-screen objects are viewed. This UI and associated settings might be used to allow a user to easily build a presentation using the actual CAD data where the user may easily move between defined sets of objects (the sets of profile data with their top-level profiles), with each set having its own pre-defined sets of viewpoints and zoom scales (the profiles stored in each set of profile data).

The process of FIG. 21 begins with intermediate UI 2170 showing that 3 sets of profile data are defined, and that the set of profile data stored in position 1 is active. UI 2170 also indicates that the current set of profile data has profiles stored in locations 0, 1, and 2, and that the profile stored in location 1 is current. In other words, the current set of profile data (set 1) and its top-level profile will display the "AA" list of objects on the screen, and the viewpoint and zoom scale (the "view") is as defined by the profile information stored in location 1. The process begins at step 2102, where the user requests the system to move to the next set of profile data by clicking on the "Next" button 2078. The process then proceeds to step 2104, where the system loads the set of profile data from position 2 into the UI. The process then proceeds to step 2106, where the system recalls/applies the top-level profile for this set of profile data i.e. changes the displayed objects to the "BB" list of objects. The process then proceeds to step 2108, where the system recalls/applies the default profile (stored in position 0), which changes the viewpoint and zoom scale to match the stored data. At this point, UI 2172 shows that the set of profile data in position 2 is active, has profiles stored in locations 0, 1, 3, and 4, and that the profile stored in location 0 is current. The process then proceeds to step 2110, where the user again requests the system to move to the next set of profile data by clicking the "Next" button 2078. The process proceeds as above to steps 2112 and 2114, where the system loads the set of profile data from position 3 and applies the top-level profile (setting the displayed objects to the "CC" list of objects). However, since there is no default profile in the set of profile data stored in position 3, no default profile is applied i.e. the view may not change unless affected by other settings. At this point, UI 2174 shows that the set of profile data in position 3 is active, has profiles stored in locations 1, 2, and 4, and that none of the stored profiles is current.

The process of FIG. 21 then proceeds to step 2116, where the user requests the system to move to the previous set of profile data by clicking the "Previous" button 2074. The process then proceeds to steps 2118, 2120, and 2122 just as above in steps 2104, 2106 and 2108, at which point UI 2176 is identical to UI 2172 since none of the profile information changed for the set of profile data stored in position 2. The process then proceeds to step 2124, where the user requests the system to recall the profile stored in location 3 by clicking on the "3" button 2068. The process then proceeds to step 2126, where the system recalls/applies the profile data stored in location 3, which sets the viewpoint and zoom scale to the values stored in the profile in location 3. UI 2178 then shows that the set of profile data in position 2 is active, has profiles stored in locations 0, 1, 3, and 4, and that the profile stored in location 3 is current. The process then proceeds to step 2128, where the user again requests the system to move to the previous set of profile data by clicking the "Previous" button 2074. The process then proceeds to steps 2130, 2132, and 2134, where the set of profile data in location 1 is loaded into the UI, its top-level profile is activated (displaying object list "AA"), and its default profile is recalled/applied. UI 2180 then shows that the set of profile data in position 1 is active, has profiles stored in locations 0, 1, and 2, and that the default profile (stored in location 0) is current. This UI 2180 is very similar to UI 2170, except that in UI 2180 the profile stored in location 0 is current due to the "Use default profile" setting. The process then proceeds to step 2136, where the user again requests the system to move to the next set of profile data by clicking the "Next" button 2078. The process then proceeds to steps 2138, 2140, and 2142, just as above in steps 2118, 2120, and 2122, at which point UI 2182 is identical to UI 2176 since no changes were made to the profile information. UI 2182 is also very similar to UI 2178 (the previous UI for position 2, when the profile stored in location 3 was current), but the current profile in UI 2182 is the default profile due to the "Use default profile" setting. The process the proceeds to step 2144 and ends.

Figure 22:
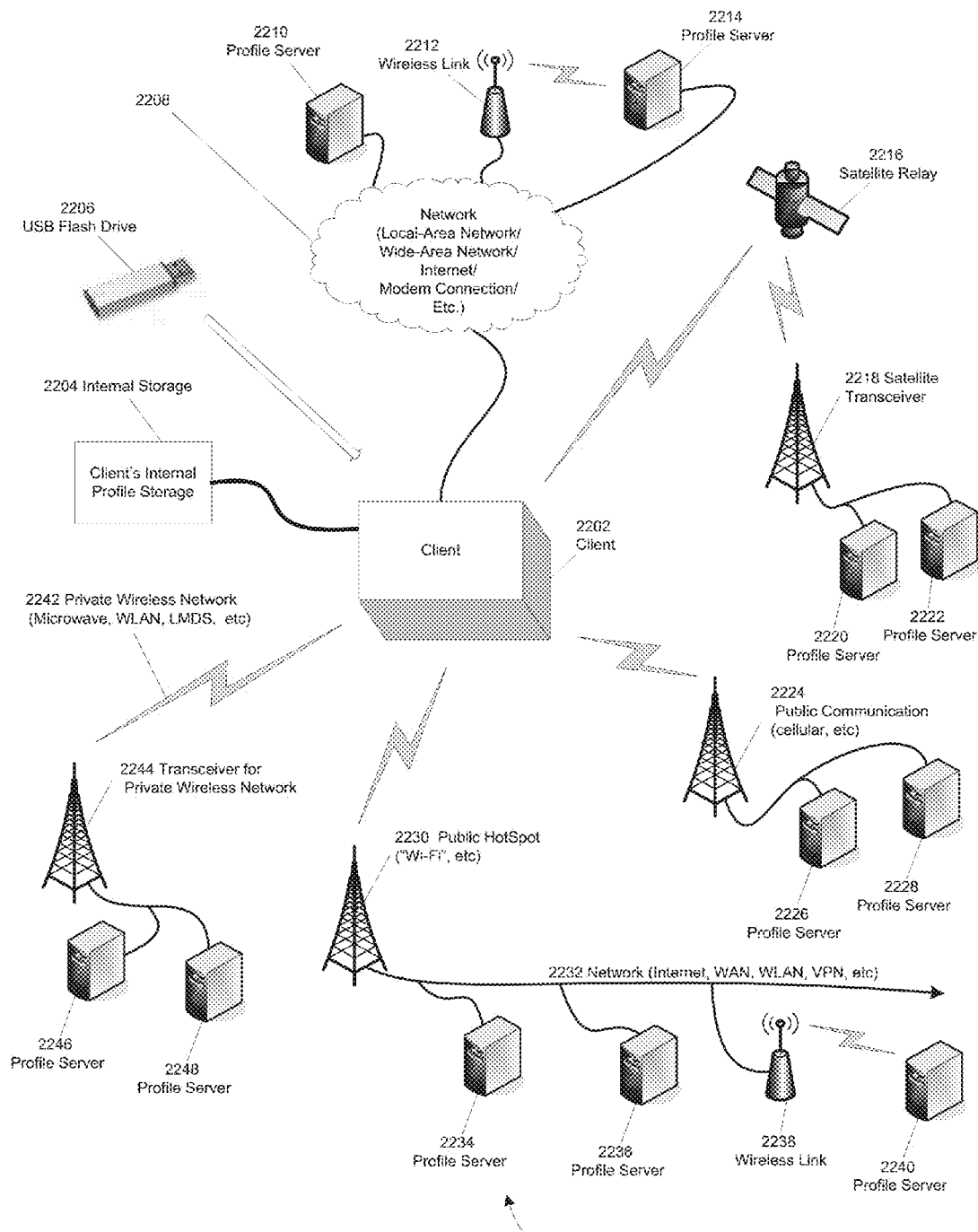
FIG. 22 is a schematic diagram of a system for connecting to profile servers.

FIG. 22 is a schematic diagram illustrating the systems 2200 for connecting a client to access and store profile data. FIG. 22 shows several embodiments illustrating various connection possibilities. Client 2202, which could be any type of client such as a car, boat, other vehicle, desktop or mobile computer, PDA, mobile phone, etc, which is otherwise referred to herein as a client processing unit, configured for using profiles, may be connected to one or more sources of profiles. These connections may be (but are not required to be) simultaneous. Further, these sources of profiles may include any type of device capable of data storage, such as computers, USB flash drives, removable or fixed hard disk drives, data files, databases, etc, as well as any subsystem thereof, otherwise referred to herein as source processing units.

For example, client 2202 could obtain and/or store profile information over direct connections to its own internal profile storage 2204. Further, client 2202 could obtain and/or store profile information over a direct connection to a removable storage device such as USB Flash Drive 2206 and/or other removable devices (such as writable media, removable media, external hard disk drives, etc). Still further, client 2202 could obtain and/or store profile information over a direct (wired, optical, etc) connection to a network 2208. This network 2208 may comprise any type or combination of types of networks, including LAN, WAN, Wireless LAN, Virtual Private Networks, the Internet, etc, and may further comprise any type or combination of types of connections and/or network interfaces such as modem, Ethernet, etc, as well as any type or combination of types of wired or wireless connections 2212 such as Wireless LAN, RF link, etc. This network may further utilize any protocol or combination of protocols for transferring information to and from one or more profile repository or repositories such as profile servers 2210 and 2214. Network 2208 may also utilize encryption, data compression, and/or error correction to secure and enhance communications between the client and the profile repository or repositories. The repositories may include any type of data storage, including simple files, databases, documents, files or objects with embedded profile information, etc, and this data may be stored using any desired method and using any desired media or storage device or technology that are currently known to those skilled in the art.

Further, client 2202 can obtain and/or store profile information to or from one or more profile sources using a wireless link to satellite 2216, which relays the information to and from satellite transceiver 2218. In turn, satellite transceiver 2218, which can be any device capable of communicating directly with a satellite, such as a broadcast tower, a personal or commercial satellite dish, a handheld satellite receiver/transmitter, etc, relays the information to and from one or more profile repositories such as profile servers 2220 and 2222. These communications from satellite transceiver 2218 to the profile repositories may be accomplished using any desired type or combination of types of communications links, including direct (wired, optical, etc) and/or wireless communications links. The communications along the entire path from the client 2202 to a profile repository may be accomplished using any protocol or combination of protocols for transferring information, and may utilize encryption, data compression and/or error correction to secure and enhance communications between the client and repository or repositories. The repositories of profile information may include any type of data storage, including simple files, databases, documents, files or objects with embedded profile information, etc, and this data may be stored using any desired method and using any desired media or storage device or technology.

Client 2202 can also obtain and/or store profile information in one or more profile sources using one or more public communication links 2224, such as a cellular or other wireless links, that are connected to one or more profile repositories, such as profile servers 2226 and 2228. These public communication links 2224 to the profile repositories may be accomplished using any type or combination of types of communications links, including direct (wired, optical, etc) and/or wireless communications links. The communications along the entire path from client to profile repository may be accomplished using any protocol or combination of protocols for transferring information, and may utilize encryption, data compression and/or error correction to secure and enhance communications between the client and repository or repositories. The repositories may include any type of data storage, including simple files, databases, documents, files or objects with embedded profile information, etc, and this data may be stored using any desired method and using any desired media or storage device or technology.

Further, client 2202 can store and/or obtain profile information to and from one or more profile sources using a public wireless "HotSpot" such as public hotspot 2230. This hotspot could be a public Internet café, or some other publicly-accessible network connection. In this example, client 2202 obtains and/or stores profile information over the wireless link at the public hotspot 2230, which is connected to a network 2232. Network 2232 may be any network or combination of networks including LAN, WAN, Wireless LAN, Virtual Private Networks, the Internet, etc, and may utilize any type or combination of types of communications links, including direct (wired, optical, etc) and/or wireless communications links. Network 2232 may further use any protocol or combination of protocols for transferring information, and may also utilize encryption, data compression and/or error correction to secure and enhance communications between the client and repository or repositories. The repositories may include any type of data storage, including simple files, databases, documents, files or objects with embedded profile information, etc, and this data may be stored using any desired method and using any desired media or storage device or technology. Network 2232 may be connected to one or more profile repositories, such as profile servers 2234, 2236, and 2240. As described above, these connections may utilize wired and/or wireless connections, including those such as wireless link 2238.

Client 2202 may also store and/or obtain profile information to and from one or more profile sources such as profile servers 2244 and 2246 using a private wireless network 2242 connected to a transceiver 2244. This network may utilize any type of wireless communication, including microwave, Local Multipoint Distribution Services (LMDS), Multipoint to Multipoint Distribution Services (MMDS), commercial or residential wireless LAN, other RF communications, etc. Transceiver 2244 may be connected to one or more profile repositories, such as profile servers 2246 and 2248. These connections may be accomplished using any desired type of communication including LAN, WAN, Wireless LAN, Virtual Private Networks, the Internet, etc, and may utilize any type or combination of types of communications links, including direct (wired, optical, etc) and/or wireless communications links. Network 2242, as well as the communications links from transceiver 2244 to its profile repositories, may utilize any protocol or combination of protocols for transferring information, and may also utilize encryption, data compression and/or error correction to secure and enhance communications between the client and repository or repositories. The repositories may include any type of data storage, including simple files, databases, documents, files or objects with embedded profile information, etc, and this data may be stored using any desired method and using any desired media or storage device or technology.

Figure 23:
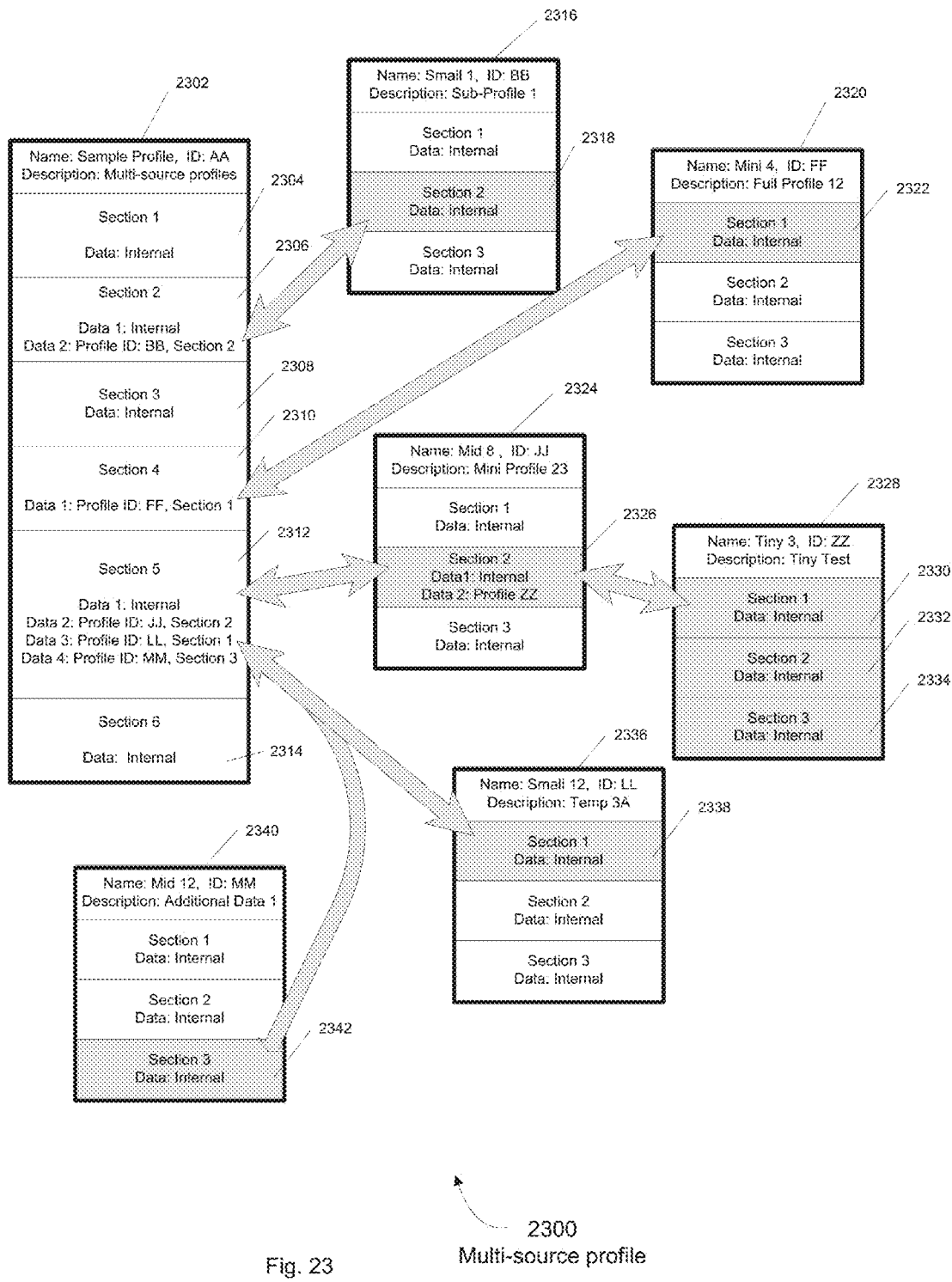
FIG. 23 is a schematic diagram of a multi-source profile.

FIG. 23 illustrates one embodiment of a multi-source profile showing how a profile can incorporate data from other profiles. Profile 2302 comprises six sections, each of which may contain data of a similar nature, although the data contained in each section need not be related. All of the data from section 2304 of profile 2302 is stored within the profile 2302. Section 2306 contains data that is stored internally, and also contains an additional link to profile data stored externally (i.e. external to profile 2302) in a different profile. This additional link information may include a profile ID (i.e. a unique identifier that may be assigned to a profile when said profile is defined and stored), file name, etc, and/or any additional information that may be used to specify the location of the linked data and which portions, including which sections and/or subsections, of said data should be included. The external reference in Section 2306 specifies that some or all of the data in a profile with a profile ID of "BB" should be included as if it were natively included in section 2306. In a typical use model, the profile IDs will be significantly more complex to ensure uniqueness. However, for the sake of simplicity, this example uses very simple Profile IDs. When the profile data is read from section 2306 of profile 2302, the reference to external data will cause the profile controller to attempt to find the referenced profile. The referenced profile could be located locally and/or remotely, including being stored in one or more profile repositories which may be accessed using a wide variety of methods, such as those shown in FIG. 22. In this case, profile ID "BB" references profile 2316. Therefore, the profile controller reads the data from section 2318 of profile 2316, and interprets section 2318 as though this data had been internally stored in section 2306 of profile 2302.

All of the data for section 2308 of profile 2302 is stored internally within profile 2302. Section 2310 of profile 2302 does not have any internal data, but does have an additional link to external profile data stored in a profile with an ID of "FF." Thus, when profile data is read from section 2310 of profile 2302, the reference to external profile data causes the profile controller to attempt to locate the referenced profile. As above, the referenced profile can be located locally and/or remotely, including being stored in one or more profile repositories which may be accessed using a wide variety of methods, such as those shown in FIG. 22. In this case, profile ID "FF" references profile 2320. As such, the profile controller reads the data from section 2322 of profile 2320, and interprets section 2322 as though this data had been internally stored in Profile 2302.

Section 2312 of profile 2302 has data located in a variety of locations, including its own internal storage. When the profile controller reads the data for section 2312, the reference to a profile with an ID of "JJ" causes the controller to search for the referenced profile. Again, the profile could be located locally and/or remotely, including being stored in one or more profile repositories which may be accessed using a wide variety of methods, such as those shown in FIG. 22. In this case, profile ID "JJ" references profile 2324, which is read by the profile controller to obtain the data in section 2326. The profile data stored in section 2326 has both internal data and a reference to external data stored in a profile with an ID of "ZZ." In this instance, no section is specified, which may indicate that the entire contents of the profile with an ID of "ZZ" may be included. Thus, when the profile controller reads the data from section 2326, the controller will attempt to locate a profile with an ID of "ZZ" and read the entire contents of that profile. Again, the profile could be located locally and/or remotely, including being stored in one or more profile repositories which may be accessed using a wide variety of methods, such as those shown in FIG. 22. In this case, profile ID "ZZ" references profile 2328. Hence, the profile controller reads the data from sections 2330, 2332 and 2334 of profile 2328, interprets the data as though this data had been internally stored in section 2326 of profile 2324, and the resulting combined internal and referenced data from section 2326 is then interpreted by the profile controller as though the data had all been internally stored in section 2312.

Section 2312 of profile 2302 also contains a reference to a profile with an ID of "LL." As above, the reference to external data causes the profile controller to attempt to locate the referenced profile, which could be located locally and/or remotely, including being stored in one or more profile repositories which may be accessed using a wide variety of methods, such as those shown in FIG. 22. In this case, profile ID "LL" references profile 2336. Hence, the profile controller reads the data from section 2338 of profile 2336, and interprets it as though this data had been internally stored in Profile 2302.

Section 2312 of profile 2302 also contains a reference to a profile with an ID of "MM." As above, the reference to external data causes the profile controller to attempt to locate the referenced profile, which could be located locally and/or remotely, including being stored in one or more profile repositories which may be accessed using a wide variety of methods, such as those shown in FIG. 22. In this case, profile ID "MM" references profile 2340. As such, the profile controller reads the data from section 2342 of profile 2340, and interprets the data as though this data had been internally stored in profile 2302.

Section 2314 of profile 2302 also has components of the profile data, and all of these components are stored internally within profile 2032.

The profile controller's ability to access the remote profile data allows great flexibility and configurability to the top-level profile, e.g., profile 2302, as the resulting data associated with profile 2302 appears to have all been internally stored. If any of the referenced profile information is changed or updated, profile 2302 can benefit from these changes as well, depending on configuration options. For instance, the user may be presented with the changes, and may also be informed what effect those changes could have, including a "preview" of the effects, and may then have the option whether accept or reject the changes; if all or some of the changes are rejected, those portions of the profile data that the user does not wish to overwrite with the new profile information may be kept intact and moved to internal storage, optionally replacing and/or removing the link to the external data source.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of configuring a profile for a vehicle using settings from a first vehicle for use with at least one additional vehicle, using a profile controller, and making said profile available for use by said at least one additional vehicle, said method comprising:

receiving a request at a profile controller to define a vehicle user profile;

determining a selection of items for the profile based on a first vehicle, each of the items having an at least one user-configurable setting;

determining at least one attribute of the at least one user-configurable setting for each item of the selection of items of the profile;

combining the determined attributes to form said profile;

assigning a unique identifier to said profile using said profile controller when said profile has not previously been assigned a unique identifier;

storing said profile with said unique identifier using said profile controller in a profile repository; and sending a notification that said profile with said unique identifier is available for application to a vehicle, said application including:

setting an attribute pointer to an attribute from said profile;

validating said attribute to determine if said attribute can be applied to a corresponding user-configurable setting of an item in said vehicle;

dynamically applying said attribute to the corresponding user-configurable setting of the item in said vehicle to modify the user-configurable setting of the item when said attribute is validated; and incrementing said attribute pointer such that each attribute of said profile is dynamically applied to a corresponding user-configurable setting of an item in said vehicle if said attribute is validated.

2. The method of claim 1 wherein the profile is formed as part of storing said profile in a profile repository.

3. The method of claim 1 wherein storing said profile in a profile repository further comprises:
updating an existing profile prior to storing it.

4. The method of claim 3 wherein updating an existing profile comprises:
automatically updating all attributes within said profile to reflect their current user-configurable settings; and
storing said updated profile in said profile repository using said profile controller.

5. The method of claim 3 wherein updating an existing profile comprises:
automatically updating all attributes of said profile to reflect their current user-configurable settings whenever at least one of the user-configurable settings associated with any of the attributes within said profile changes.

6. The method of claim 1 wherein said user-configurable settings comprise one or more of:
climate control settings, seat settings, audio system settings, engine performance settings, navigation system settings, sun/moonroof settings, display brightness settings, and/or mirror settings.

7. The method of claim 1 wherein determining a selection of items for the profile comprises:
automatically selecting all available items that have at least one user-configurable setting; and
automatically selecting all attributes of said available items.

8. The method of claim 7 wherein automatically selecting all attributes of said available items further comprises:
deselecting one or more attributes that are not to be included in the profile.

9. The method of claim 1 wherein storing said profile with said unique identifier using said profile controller in the profile repository comprises:
storing said profile with said unique identifier in the profile repository wherein said profile repository is located within said vehicle.

10. The method of claim 1 wherein storing said profile with said unique identifier using said profile controller in the profile repository comprises:
storing said profile with said unique identifier in the profile repository wherein said profile repository is located on a removable storage device.

11. The method of claim 1 wherein storing said profile with said unique identifier using said profile controller in the profile repository comprises:
storing said profile using said unique identifier in a profile repository wherein said profile repository is an external profile repository.

12. The method of claim 11 wherein said external profile repository is accessed through a network.

13. A method for modifying vehicle settings, comprising:
receiving a profile at a profile controller in a first vehicle, said profile including a plurality of user content presentation attributes for one or more user-configurable content settings for one or more items, said profile having been defined in a second vehicle different from said first vehicle;
said profile controller applying the profile to said first vehicle, said applying including:
setting a current attribute pointer to a current user content presentation attribute from said plurality of user content presentation attributes in said profile;
validating said current user content presentation attribute to determine if said current user content presentation attribute can be applied to a corresponding content setting of an item in said first vehicle;
dynamically applying said current user content presentation attribute to the corresponding content setting of the item in said first vehicle to modify the content setting of the item when said current user content presentation attribute is validated; and
incrementing said current attribute pointer so that each attribute of said plurality of user content presentation attributes is dynamically applied to its corresponding content setting if said current user content presentation attribute is validated.

14. The method of claim 13 wherein the profile defined in said second vehicle different from said first vehicle is based on:
a request received at a profile controller to define a profile for a user at the second vehicle;
a selection of items determined for the profile based on said second vehicle, each item of the selection of items having an at least one user-configurable setting; and
at least one attribute of the at least one user-configurable setting determined for each item of the selection of items of the profile.

15. The method of claim 13, wherein the user configurable content settings include: climate control settings, seat settings, audio settings, engine settings, and/or navigation settings.

16. The method of claim 13, wherein the user configurable content settings include display brightness settings and/or phone settings.

17. A non-transitory computer readable medium having computer readable instructions stored thereon that, when executed by a processor of a computer, cause the computer to:
receive a profile, the profile including a plurality of vehicle attributes for one or more user-configurable settings for one or more vehicle items; and
apply the received profile to a first vehicle, the application including instructions to:
set an attribute pointer to a vehicle attribute from the plurality of vehicle attributes in the profile;
validate the vehicle attribute to determine if the vehicle attribute can be applied to a corresponding user-configurable setting of one or more vehicle items of the first vehicle;
dynamically apply the vehicle attribute to the corresponding user-configurable setting of the one or more vehicle items in the first vehicle to modify the user-configurable setting of the one or more vehicle items when the vehicle attribute is validated; and
increment said attribute pointer so that at least one further vehicle attribute of the plurality of vehicle attributes is dynamically applied to a corresponding user-configurable setting of one or more vehicle items in the first vehicle if the at least one further vehicle attribute is validated.

18. The non-transitory computer readable medium of claim 17, wherein the profile is defined in a second vehicle different from said first vehicle.

19. The non-transitory computer readable medium of claim 18, wherein the profile is defined in the second vehicle based on:
- a request to define a profile for a user at the second vehicle;
- a selection of vehicle items determined for the profile based on said second vehicle, each vehicle item of the selection of vehicle items having an at least one user-configurable setting; and
- at least one vehicle attribute of the at least one user-configurable setting determined for each vehicle item of the selection of vehicle items of the profile.

20. The non-transitory computer readable medium of claim 17, wherein the user configurable content settings include: climate control settings, seat settings, audio settings, engine settings, display settings, and/or navigation settings.

* * * * *